US011996044B2

(12) United States Patent
Yamamoto et al.

(10) Patent No.: US 11,996,044 B2
(45) Date of Patent: May 28, 2024

(54) DISPLAY DEVICE AND METHOD FOR DRIVING SAME

(71) Applicant: SHARP KABUSHIKI KAISHA, Sakai (JP)

(72) Inventors: Kaoru Yamamoto, Sakai (JP); Kohhei Tanaka, Sakai (JP); Ryo Yonebayashi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/029,897

(22) PCT Filed: Oct. 1, 2020

(86) PCT No.: PCT/JP2020/037432
§ 371 (c)(1),
(2) Date: Mar. 31, 2023

(87) PCT Pub. No.: WO2022/070386
PCT Pub. Date: Apr. 7, 2022

(65) Prior Publication Data

US 2023/0368730 A1 Nov. 16, 2023

(51) Int. Cl.
*G09G 3/3233* (2016.01)
*G09G 3/3266* (2016.01)
*G09G 3/3275* (2016.01)

(52) U.S. Cl.
CPC ......... *G09G 3/3233* (2013.01); *G09G 3/3266* (2013.01); *G09G 3/3275* (2013.01);
(Continued)

(58) Field of Classification Search
CPC .. G09G 3/3233; G09G 3/3266; G09G 3/3275; G09G 2320/0247;
(Continued)

(56) References Cited

U.S. PATENT DOCUMENTS

2013/0141316 A1* 6/2013 Lee ...................... G09G 3/3233 345/76
2017/0352328 A1 12/2017 Jeong et al.
(Continued)

FOREIGN PATENT DOCUMENTS

JP 2017227880 A 12/2017
JP 2020112795 A 7/2020

*Primary Examiner* — Temesghen Ghebretinsae
*Assistant Examiner* — Ivelisse Martinez Quiles
(74) *Attorney, Agent, or Firm* — ScienBiziP, P.C.

(57) ABSTRACT

A display device includes a display control circuit configured to control a data-side drive circuit and a scanning-side drive circuit such that a drive period and a pause period alternate between one another. The display control circuit, in the pause period, such that voltage of corresponding data signal line is applied to first conduction terminal of drive transistor as bias voltage when light emission control transistor is in an off state and current corresponding to holding voltage of holding capacitor flows through display element when light emission control transistor is in an on state, causes the data-side drive circuit to output the bias voltage and apply the bias voltage to data signal lines and causes the scanning-side drive circuit to stop driving first scanning signal lines and selectively drive second scanning signal lines and selectively make light emission control lines inactive.

16 Claims, 30 Drawing Sheets

(52) U.S. Cl.
CPC ............... *G09G 2320/0247* (2013.01); *G09G 2330/021* (2013.01)

(58) Field of Classification Search
CPC ..... G09G 2330/021; G09G 2300/0819; G09G 2300/0842; G09G 2300/0861; G09G 2310/0251; G09G 2310/0262; G09G 2310/08; G09G 2340/0435
See application file for complete search history.

(56) References Cited

U.S. PATENT DOCUMENTS

| | | | | |
|---|---|---|---|---|
| 2019/0057646 | A1 | 2/2019 | Lin et al. | |
| 2020/0118487 | A1* | 4/2020 | Kim ..................... | G09G 3/3275 |
| 2020/0175913 | A1* | 6/2020 | Kang ................... | G09G 3/3266 |
| 2020/0226978 | A1 | 7/2020 | Lin et al. | |
| 2021/0020109 | A1 | 1/2021 | Lin et al. | |
| 2021/0287628 | A1 | 9/2021 | Jeong et al. | |
| 2022/0180812 | A1 | 6/2022 | Lin et al. | |
| 2022/0358898 | A1 | 11/2022 | Jeong et al. | |

* cited by examiner

DISPLAY DEVICE AND METHOD FOR DRIVING SAME

TECHNICAL FIELD

The disclosure relates to a display device, and more particularly to a current-driven display device including a display element driven by a current, such as an organic electro luminescence (EL) element, and a driving method for the display device.

BACKGROUND ART

The last few years have seen the implementation of organic EL display devices provided with a pixel circuit including organic EL elements (also referred to as organic light-emitting diodes (OLEDs)). The pixel circuit in such an organic EL display device includes a drive transistor, a write control transistor, and a holding capacitor in addition to the organic EL elements. A thin film transistor is used for the drive transistor and the write control transistor. The holding capacitor is connected to a gate terminal that serves as a control terminal of the drive transistor. A voltage corresponding to an image signal representing an image to be displayed (more specifically, a voltage indicating the gradation values of pixels to be formed by the pixel circuit) is applied as data voltage to the holding capacitor from the drive circuit via a data signal line. The organic EL element is a self-luminous display element that emits light with luminance according to an electric current flowing through the organic EL element. The drive transistor is connected to the organic EL element in series and controls the electric current passing through the organic EL element according to a voltage held by the holding capacitor.

Variation and fluctuation occur in characteristics of the organic EL element and the drive transistor. Thus, variation and fluctuation in characteristics of these elements need to be compensated in order to perform higher picture quality display in the organic EL display device. For the organic EL display device, a method for compensating the characteristics of the elements inside the pixel circuits and a method for compensating the characteristics of the elements outside the pixel circuit are known. One known pixel circuit corresponding to the former method is a pixel circuit configured to charge the holding capacitor with the data voltage via the drive transistor in a diode-connected state after initializing voltage at the gate terminal of the drive transistor, that is, the voltage held in the holding capacitor. In such a pixel circuit, variation and fluctuation of the threshold voltage in the drive transistor are compensated for within the pixel circuit (hereinafter, the compensation of variation and fluctuation of such a threshold voltage is referred to as "threshold compensation" and the method of performing threshold compensation within the pixel circuit in this manner is referred to as the "internal compensation method").

A known pixel circuit of an organic EL display device using the internal compensation method uses a P-channel thin film transistor with a channel layer formed of low-temperature polysilicon (LTPS). Also, a known configuration for a gate driver configured to control the operation of a pixel circuit uses a P-channel thin film transistor (for example, JP 2017-227880 A). Since low-temperature polysilicon has high mobility, when a thin film transistor with a channel layer formed of low-temperature polysilicon (hereinafter referred to as "LTPS-TFT") is used as a drive transistor, driving capability for an organic EL element in a pixel circuit is improved, and when used as a switching element, on-resistance is reduced.

In recent years, a thin film transistor with a channel layer formed of an oxide semiconductor (hereinafter referred to as an "oxide TFT") has attracted attention. Since the oxide TFT has a small off-leak current, it is suitable as a switching element in a pixel circuit or the like. As the oxide TFT, typically, a thin film transistor including indium gallium zinc oxide (InGaZnO) (hereinafter referred to as "IGZO-TFT") is used.

Also, a display device configured to perform pause driving is a known display device with low power consumption. Pause driving is a driving method referred to as "intermittent driving" or "low-frequency driving" with a drive period (refresh period) in which the same image is continuously displayed and a pause period (non-refresh period). In pause driving, a drive circuit is activated in the drive period and operations of the drive circuit are paused in the pause period.

Pause driving can be used when the off-leak current of the transistor in the pixel circuit is small. For this reason, utilizing the advantages of LTPS-TFT and oxide TFT (IGZO-TFT) described above, an organic EL display device has been proposed that is configured to perform pause driving of a display portion constituted by a pixel circuit, wherein in the pixel circuit, LTPS-TFT is used as a drive transistor and IGZO-TFT is used as a switching element (for example, see US 2020/0118487 A).

CITATION LIST

Patent Literature

PTL 1: JP 2017-227880 A
PTL 2: US 2019/0057646 A
PTL 3: US 2020/0118487 A
PTL 4: JP 2020-112795 A

SUMMARY

Technical Problem

When the organic EL display device performs pause driving, in the drive period, the organic EL element in each pixel circuit is turned off by a light emission control transistor in a non-light emission period provided in each frame period, and in the pause period, the operations of the drive circuit are stopped, and light is continuously emitted at a luminance corresponding to the data voltage written in the previous drive period. In general, the pause period is much longer than the drive period (the drive period includes 1 or a few frame periods and the pause period includes tens of frame periods), and a pause driving method organic EL display device alternates between the drive period and the pause period when activated. For this reason, when performing pause driving, the organic EL elements of the drive period turning off may be noticeable as a flicker.

Regarding this, in US 2019/0057646 A, a pixel circuit and a driving method for the same are described. To remove noticeable flicker when performing pause driving (low-frequency driving), the pixel circuit is configured such that a decrease in luminance occurs at an appropriate frequency in a pause period (extended blanking period T_blank) in addition to a decrease in luminance being caused by an organic EL element (light-emitting diode 304) turning off in the drive period (data refresh period T_refresh) (see paragraphs [0049] to [0052] and FIGS. 8A, 8B, 9A, and 9B).

However, even with a configuration in which a decrease in luminance occurs at an appropriate frequency in the pause period (hereinafter, such a configuration is referred to as a "periodic turn-off configuration", because the thin film transistor functioning as the drive transistor in the pixel circuit has a hysteresis characteristic, flicker remains noticeable at low-frequency driving (pause driving). That is, in this periodic turn-off configuration, since the voltage stress applied to the thin film transistor functioning as the drive transistor is different between the drive period and the pause period, the turn-off waveform is slightly different between the drive period and the pause period due to the hysteresis characteristic of the drive transistor, which causes a noticeable flicker.

In order to suppress the occurrence of flicker caused by the hysteresis characteristic of such a drive transistor, intentionally applying a bias stress voltage (hereinafter, referred to as a "on-bias stress voltage" or simply as a "bias voltage") to the drive transistor in the pause period has been considered (for example, see US 2020/0118487 A and JP 2020-112795 A). In order to apply the on-bias stress voltage, an appropriate configuration is needed on the scanning-side drive circuit, leading to an increase in the amount of circuits. This prevents frame narrowing of the display device.

Thus, there is a demand for a current-driven display device such as an organic EL display device with a good display without noticeable flicker even when pause driving is performed. Also, there is a demand for a circuit with a simple configuration for applying an on-bias voltage for suppressing flicker caused by the hysteresis characteristic of a drive transistor in such a current-driven display device.

Solution to Problem

A display device according to some embodiments of the disclosure, using a display element driven by a current, includes:

a plurality of data signal lines;

a plurality of first scanning signal lines;

a plurality of second scanning signal lines;

a plurality of light emission control lines;

a plurality of pixel circuits;

a data-side drive circuit configured to generate a plurality of data signals and apply the plurality of data signals to the plurality of data signal lines;

a scanning-side drive circuit configured to selectively drive the plurality of first scanning signal lines, the plurality of second scanning signal line, and the plurality of light emission control lines; and a display control circuit configured to control the data-side drive circuit and the scanning-side drive circuit such that a drive period and a pause period alternate between one another, the drive period including a refresh frame period in which voltage of the plurality of data signals is written to the plurality of pixel circuits as data voltage and the pause period including a non-refresh frame period in which writing of data voltage to the plurality of pixel circuits is stopped, wherein each one of the plurality of pixel circuits corresponds to one of the plurality of data signal lines, corresponds to one of the plurality of first scanning signal lines, corresponds to one of the plurality of second scanning signal lines, and corresponds to one of the plurality of light emission control lines, each one of the plurality of pixel circuits includes a display element configured to be driven by a current, a drive transistor including a control terminal, a first conduction terminal, and a second conduction terminal, the drive transistor being provided in series with the display element, a holding capacitor connected at one end to the control terminal of the drive transistor, the holding capacitor being configured to hold voltage of the control terminal of the drive transistor, a write control transistor configured to function as a switching element including a control terminal connected to a corresponding second scanning signal line, a first conduction terminal connected to a corresponding data signal line, and a second conduction terminal connected to the first conduction terminal of the drive transistor, a threshold compensation transistor configured to function as a switching element including a control terminal connected to a corresponding first scanning signal line, a first conduction terminal connected to the second conduction terminal of the drive transistor, and a second conduction terminal connected to the control terminal of the drive transistor, and at least one light emission control transistor configured to function as a switching element including a control terminal connected to a corresponding light emission control line, the at least one light emission control transistor being provided in series with the display element and the drive transistor, and the display control circuit, in the drive period, such that voltage of the corresponding data signal line is written to the holding capacitor as data voltage when the light emission control transistor is in an off state and a current corresponding to a holding voltage of the holding capacitor flows through the display element when the light emission control transistor is in an on state, causes the data-side drive circuit to apply the plurality of data signals to the plurality of data signal lines and causes the scanning-side drive circuit to selectively drive the plurality of first scanning signal lines and the plurality of second scanning signal lines and selectively make the plurality of light emission control lines inactive, and in the pause period, such that voltage of the corresponding data signal line is applied to the first conduction terminal of the drive transistor as bias voltage when the light emission control transistor is in an off state and a current corresponding to a holding voltage of the holding capacitor flows through the display element when the light emission control transistor is in an on state, causes the data-side drive circuit to output the bias voltage and apply the bias voltage to the plurality of data signal lines and causes the scanning-side drive circuit to stop driving the plurality of first scanning signal lines and selectively drive the plurality of second scanning signal lines and selectively make the plurality of light emission control lines inactive.

In a display device according to some other embodiments of the disclosure based on the display device according to some embodiments described above, the scanning-side drive circuit includes a plurality of unit circuits connected in cascade operating as a shift register based on a two phase clock signal, even-numbered unit circuits are input with a first clock signal as a first control clock signal and a second clock signal as a second control clock signal, the first clock signal and the second clock signal forming the two phase clock signal, odd-numbered unit circuits are input with the second clock signal as the first control clock signal and the first clock signal as the second control clock signal, and each unit circuit is a bistable circuit corresponding to one of the plurality of first scanning signal lines and corresponding to one of the plurality of second scanning signal lines, is configured to receive an input signal of a logic level sent from a unit circuit of a preceding stage or outside and to receive a mode signal indicating whether a period in which the shift register is operated is the drive period or the pause period, and includes a first internal node configured to selectively hold two logic levels, a second internal node, a first control circuit configured to receive the input signal and send the input signal to the first internal node at a timing according to the first control clock signal, a first output circuit configured to output a signal with a logic level changing according to a logic level of the first internal node to a corresponding first scanning signal line when the mode signal indicates the drive period and to output a non-active signal to the corresponding first scanning signal line when the mode signal indicates the pause period, a second control circuit configured to generate a signal of a logic level inverted to a logic level of the first internal node and to send the signal of the logic level inverted to the logic level of the first internal node to the second internal node, and a second output circuit configured to output a signal of a logic level identical to a logic level of the second control clock signal to a corresponding second scanning signal line when the first internal node is a first logic level of the two logic levels and to output a signal of a logic level inverted to a logic level of the second internal node to the corresponding second scanning signal line when the first internal node is a second logic level of the two logic levels.

A driving method according to yet other embodiments of the disclosure is a driving method for a display device using a display element driven by a current, the display device including a plurality of data signal lines, a plurality of first scanning signal lines, a plurality of second scanning signal lines, a plurality of light emission control lines, and a plurality of pixel circuits, wherein each one of the plurality of pixel circuits corresponds to one of the plurality of data signal lines, corresponds to one of the plurality of first scanning signal lines, corresponds to one of the plurality of second scanning signal lines, and corresponds to one of the plurality of light emission control lines, and each one of the plurality of pixel circuits includes a display element configured to be driven by a current, a drive transistor including a control terminal, a first conduction terminal, and a second conduction terminal, the drive transistor being provided in series with the display element, a holding capacitor connected at one end to the control terminal of the drive transistor, the holding capacitor being configured to hold voltage of the control terminal of the drive transistor, a write control transistor configured to function as a switching element including a control terminal connected to a corresponding second scanning signal line, a first conduction terminal connected to a corresponding data signal line, and a second conduction terminal connected to the first conduction terminal of the drive transistor, a threshold compensation transistor configured to function as a switching element including a control terminal connected to a corresponding first scanning signal line, a first conduction terminal connected to the second conduction terminal of the drive transistor, and a second conduction terminal connected to the control terminal of the drive transistor, and at least one light emission control transistor configured to function as a switching element including a control terminal connected to a corresponding light emission control line, the at least one light emission control transistor being provided in series with the display element and the drive transistor, the driving method including:

performing pause driving on the plurality of data signal lines, the plurality of first scanning signal lines, and the plurality of second scanning signal lines such that a drive period and a pause period alternate between one another, the drive period including a refresh frame period in which voltage of the plurality of data signals is written to the plurality of pixel circuits as data voltage and the pause period including a non-refresh frame period in which writing of data voltage to the plurality of pixel circuits is stopped, wherein the performing of the pause driving includes in the drive period, such that voltage of the corresponding data signal line is written to the holding capacitor as data voltage when the light emission control transistor is in an off state and a current corresponding to a holding voltage of the holding capacitor flows through the display element when the light emission control transistor is in an on state, applying the plurality of data signals to the plurality of data signal lines, selectively driving the plurality of first scanning signal lines and the plurality of second scanning signal lines, and selectively making the plurality of light emission control lines inactive, and in the pause period, such that voltage of the corresponding data signal line is applied to the first conduction terminal of the drive transistor as bias voltage when the light emission control transistor is in an off state and a current corresponding to a holding voltage of the holding capacitor flows through the display element when the light emission control transistor is in an on state, generating the bias voltage and applying the bias voltage to the plurality of data signal lines, stopping driving of the plurality of first scanning signal lines, selectively driving the plurality of second scanning signal lines, and selectively making the plurality of light emission control lines inactive.

Advantageous Effects of Disclosure

According to some embodiments of the disclosure, in an internal compensation method display device using a pixel circuit including a display element driven by a current, a drive transistor, a write control transistor, a threshold compensation transistor, a light emission control transistor, and a holding capacitor configured to hold data voltage, when pause driving is performed in which a drive period including a refresh frame period and a pause period including a non-refresh frame period alternates between one another, not only in the drive period but also in the pause period, the plurality of light emission control lines are selectively made inactive, providing a non-light emission period. Also, in the pause period, the driving of the first scanning signal lines for controlling the threshold compensation transistor is stopped, and the second scanning signal lines for controlling the write control transistor are driven as in the drive period. Thus, in each pixel circuit, in the non-light emission period in which the light emission control transistor is in the off state, by maintaining the threshold compensation transistor in the off state, without affecting the holding voltage (written data voltage) in the holding capacitor, the voltage of the data signal line corresponding to the pixel circuit is applied to the first conduction terminal of the drive transistor as the bias voltage via the write control transistor. By applying the bias voltage in this manner, a threshold shift caused by the hysteresis characteristic of the drive transistor can be suppressed. When the threshold shift of the drive transistor is suppressed in this manner, the turn-off waveform (waveform portion corresponding to the non-light emission period) included in the luminance waveform of each pixel circuit has a similar shape in the pause period as in the drive period. Accordingly, even when performing pause driving to achieve low power consumption, good display without noticeable flicker is achieved.

According the some embodiments of the disclosure, the unit circuit forming the shift register inside the scanning-side drive circuit includes the first output circuit configured to output a signal to be applied to the first scanning signal line for controlling the threshold compensation transistor inside the pixel circuit and the second output circuit configured to output a signal to be applied to the second scanning signal line for controlling the write control transistor inside the pixel circuit and further includes a first control circuit configured to send the input signal to the first internal node at a timing according to the first control clock signal and a second control circuit configured to generate a logic level inverted to a logic level of the first internal node and sent the logic level generated to the second internal node. When pause driving is performed with the drive period including the refresh frame period and the pause period including the non-refresh frame period alternating between one another, the first output circuit, in the drive period, outputs a signal with a logic level changing according to the logic level of the first internal node to the corresponding first scanning signal line and, in the pause period, outputs a non-active signal to the first scanning signal line. Irrespective of whether it is in the drive period or the pause period, the second output circuit outputs a signal of a logic level based on the logic level of the first internal node and the second internal node to the corresponding second scanning signal line. According to such a configuration, by going through the first internal node where the logic level is controlled by the first control circuit, a large increase in the amount of circuits is avoided and two types of scanning signals to be applied to the first and the second scanning signal lines are generated. That is, when pause driving is performed, in the pixel circuit, in the drive period, the write control transistor and the threshold compensation transistor are controlled as in normal driving, and in the non-light emission period in the pause period, the off state of the threshold compensation transistor is maintained and the write control transistor is turned to an on state so that two types of scanning signals for driving the first and the second scanning signal lines can be achieved with a relatively low amount of circuits.

DESCRIPTION OF EMBODIMENTS

Embodiments will be described below with reference to the accompanying drawings. Note that in each of the transistors referred to below, the gate terminal corresponds to a control terminal, one of a drain terminal and a source terminal corresponds to a first conduction terminal, and the other corresponds to a second conduction terminal. The transistor according to the following embodiments is, for example, a thin film transistor, but the disclosure is not limited to this. Still further, the term "connection" used herein means "electrical connection" unless otherwise specified, and without departing from the spirit and scope of the disclosure, the term includes not only a case in which direct connection is meant but also a case in which indirect connection with another element therebetween is meant.

1. First Embodiment

1.1 Overall Configuration

Figure 1:
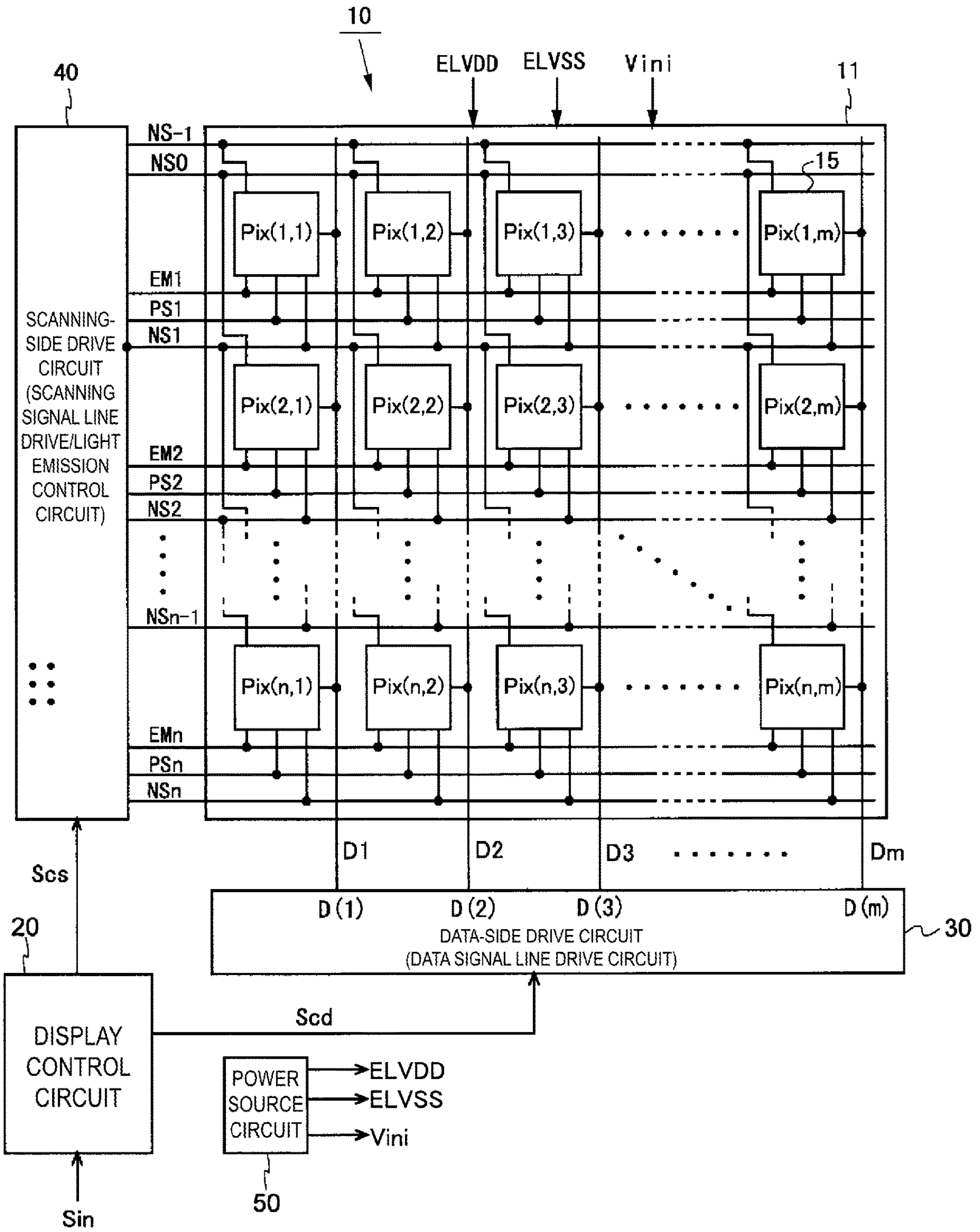
FIG. 1 is a block diagram illustrating an overall configuration of a display device according to a first embodiment.

FIG. 1 is a block diagram illustrating an overall configuration of a display device 10 according to the first embodiment. The display device 10 is an organic EL display device that performs internal compensation. That is, in the display device 10, each pixel circuit has a function of compensating for variations and fluctuations of the threshold voltage of a drive transistor inside the pixel circuit. Also, the display device 10 has two operation modes, a normal driving mode and a pause driving mode. That is the display device 10 operates such that, in the normal driving mode, a refresh frame period Trf for rewriting image data (data voltage in each pixel circuit) of a display portion continues, and in the pause driving mode, a drive period TD including only the refresh frame period Trf and a pause period TP including a plurality of non-refresh frame periods Tnrf for stopping rewriting of image data of the display portion alternate between one another (see FIG. 11 described later).

As illustrated in FIG. 1, the display device 10 includes a display portion 11, a display control circuit 20, a data-side drive circuit 30, a scanning-side drive circuit 40, and a power supply circuit 50. The data-side drive circuit 30 functions as a data signal line drive circuit (also referred to as a "data driver"). The scanning-side drive circuit 40 functions as a scanning signal line drive circuit (also referred to as a "gate driver") and a light emission control circuit (also referred to as an "emission driver"). These two circuits on the scanning side are configured as one scanning-side drive circuit 40 in the configuration illustrated in FIG. 1, but a configuration where the two circuits are separated as needed, or a configuration where the two circuits are disposed separately on different sides of the display portion 11 may be adopted. At least part of the scanning-side drive circuit and data signal line drive circuit may be integrally formed with the display portion 11. The same applies to subsequent embodiments and modified examples. The power supply circuit 50 generates a high-level power supply voltage ELVDD, a low-level power supply voltage ELVSS, and an initialization voltage Vini, which will be described later, to be supplied to the display portion 11, and generates power supply voltages (not illustrated) to be supplied to the display control circuit 20, the data-side drive circuit 30, and the scanning-side drive circuit 40.

The display portion 11 is provided with m (m is an integer of 2 or greater) data signal lines D1, D2 to Dm, n+2 (n is an integer of 2 or greater) first scanning signal lines NS−1, NS0, NS1 to NSn and n second scanning signal lines PS1, PS2 to PSn that intersect the data signal lines D1, D2 to Dm, and n light emission control lines (emission lines) EM1 to EMn disposed along the n second scanning signal lines PS1, PS2 to PSn, respectively. Also, in the display portion 11, m×n pixel circuits 15 are arranged in a matrix shape along the m data signal lines D1 to Dm and the n second scanning signal lines PS1 to PSn. Each pixel circuit 15 corresponds to one of the m data signal lines D1 to Dm and to one of the n second scanning signal lines PS1 to PSn (hereinafter, when distinguishing between each pixel circuit 15, a pixel circuit corresponding to an i-th second scanning signal line PS1 and a j-th data signal line Dj will also be referred to as an "i-th row, j-th column pixel circuit", and will be denoted by the reference sign "Pix(i, j)"). Also, each pixel circuit 15 also corresponds to one of the n first scanning signal lines NS1 to NSn and to one of the n light emission control lines EM1 to EMn.

The display portion 11 is also provided with a power source line (not illustrated) common to each pixel circuit 15. In other words, a first power source line (hereinafter, referred to as a "high-level power source line" and designated by the reference sign "ELVDD" similar to the high-level power supply voltage) used for supplying the high-level power supply voltage ELVDD for driving the organic EL element described later, and a second power source line (hereinafter, referred to as a "low-level power source line" and designated by the reference sign "ELVSS" similar to the low-level power supply voltage) used for supplying the low-level power supply voltage ELVSS for driving the organic EL element are provided. More specifically, the low-level power source line ELVSS is a cathode common to the plurality of pixel circuits 15. The display portion 11 also includes a not illustrated initialization voltage line (denoted by the same reference sign "Vini" as that of the initialization voltage) for supplying the initialization voltage Vini used in a reset operation (also referred to as an "initialization operation") for initializing each pixel circuit 15. The high-level power supply voltage ELVDD, the low-level power supply voltage ELVSS, and the initialization voltage Vini are supplied from the power supply circuit 50.

The display control circuit 20 receives an input signal Sin including image information representing an image to be displayed and timing control information for image display from outside of the display device 10 and, based on the input signal Sin, generates a data-side control signal Scd and a scanning-side control signal Scs, and outputs the data-side control signal Scd to the data-side drive circuit 30 and outputs the scanning-side control signal Scs to the scanning-side drive circuit 40.

The data-side drive circuit 30 drives the data signal lines D1 to Dm based on the data-side control signal Scd output from the display control circuit 20. More specifically, the data-side drive circuit 30 generates m data signals D(1) to D(m) representing the image to be displayed, and applies the data signals D(1) to D(m) to the data signal lines D1 to Dm, respectively, based on the data-side control signal Scd.

The scanning-side drive circuit 40 functions, based on the scanning-side control signal Scs from the display control circuit 20, as a scanning signal line drive circuit that drives the n+2 first scanning signal lines NS−1 to NSn and the n second scanning signal lines PS1 to PSn and a light emission control circuit that drives the light emission control lines EM1 to EMn.

Figure 3:
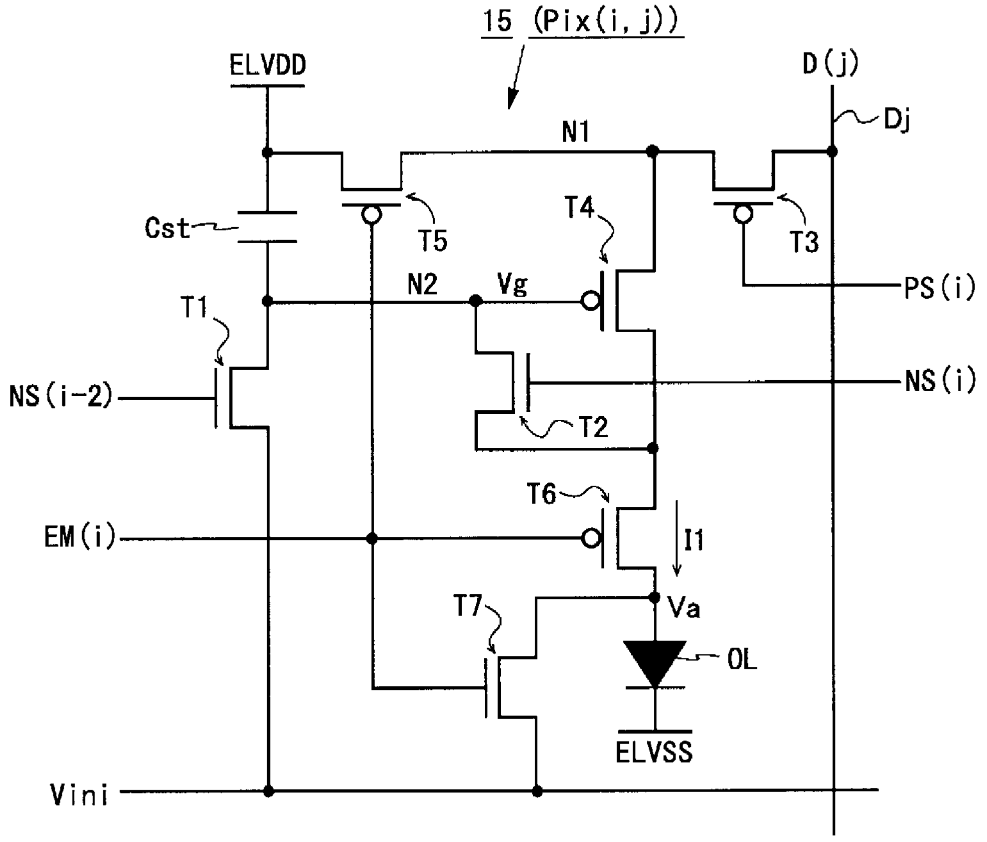
FIG. 3 is a circuit diagram illustrating a configuration of a pixel circuit according to the first embodiment.

More specifically, the scanning-side drive circuit 40, in the refresh frame period Trf, functioning as the scanning signal line drive circuit, based on the scanning-side control signal Scs, sequentially selects the n+2 first scanning signal lines NS−1 to NSn each predetermined period corresponding to one horizontal period and sequentially selects the n second scanning signal lines PS1 to PSn each predetermined period corresponding to one horizontal period, applies an active signal to the selected first scanning signal line NSs (s is an integer satisfying $-1 \leq s \leq n$) and applies an active signal to the selected second scanning signal line PSk (k is an integer satisfying $1 \leq k \leq n$), and applies a non-active signal to the non-selected first scanning signal lines and applies a non-active signal to the non-selected second scanning signal lines. With this, m pixel circuits Pix(k, 1) to Pix(k, m) corresponding to the selected second scanning signal line PSk are collectively selected. As a result, in the select period of the second scanning signal line PSk (hereinafter referred to as a "kth scanning select period"), the voltages of the m data signals D(1) to D(m) applied to the data signal lines D1 to Dm from the data-side drive circuit 30 (hereinafter also referred to as simply "data voltages" when not distinguished from each other) are written as pixel data to the pixel circuits Pix(k, 1) to Pix(k, m), respectively. Note that as illustrated in FIG. 3 described later, in the present embodiment, a first scanning signal line NSi1 is connected to a gate terminal of an N-channel (hereinafter also referred to as "N-type") transistor in the pixel circuits 15 (i1=−1 to n), and a second scanning signal line PS12 is connected to a gate terminal of a P-channel (hereinafter also referred to as "P-type") transistor in the pixel circuit 15 (i2=1 to n). Thus, a high-level voltage is applied to the selected first scanning signal line NSi1 as an active signal, and a low-level voltage is applied to the selected second scanning signal line PS12 as an active signal.

In addition, in the refresh frame period Trf, the scanning-side drive circuit 40 drives the light emission control lines EM1 to EMn so that the light emission control lines EM1 to EMn are selectively inactivated in conjunction with the driving of the first and second scanning signal lines NS−1 to NSn and PS1 to PSn. That is, when functioning as the light emission control circuit, based on the scanning-side control signal Scs, the scanning-side drive circuit 40 applies a light emission control signal (high-level voltage) indicating non-light emission to an i-th light emission control line EM1 in a predetermined period including the i-th horizontal period and applies a light emission control signal (low-level voltage) indicating light emission to the i-th light emission control line EM1 in other periods (i=1 to n). Organic EL elements in pixel circuits (hereinafter also referred to as "i-th row pixel circuits") Pix(i, 1) to Pix(i, m) corresponding to the i-th second scanning signal line PS1 emit light at a luminance corresponding to the data voltages written to the i-th row pixel circuits Pix(i, 1) to Pix(i, m), respectively, while the voltage of the light emission control line EM1 is at a low level (activated state).

1.2 Schematic Operations

As described above, the display device 10 according to the present embodiment has two operation modes, the normal driving mode and the pause driving mode. First, schematic operations of the display device 10 in the normal driving mode will be described.

Figure 2:
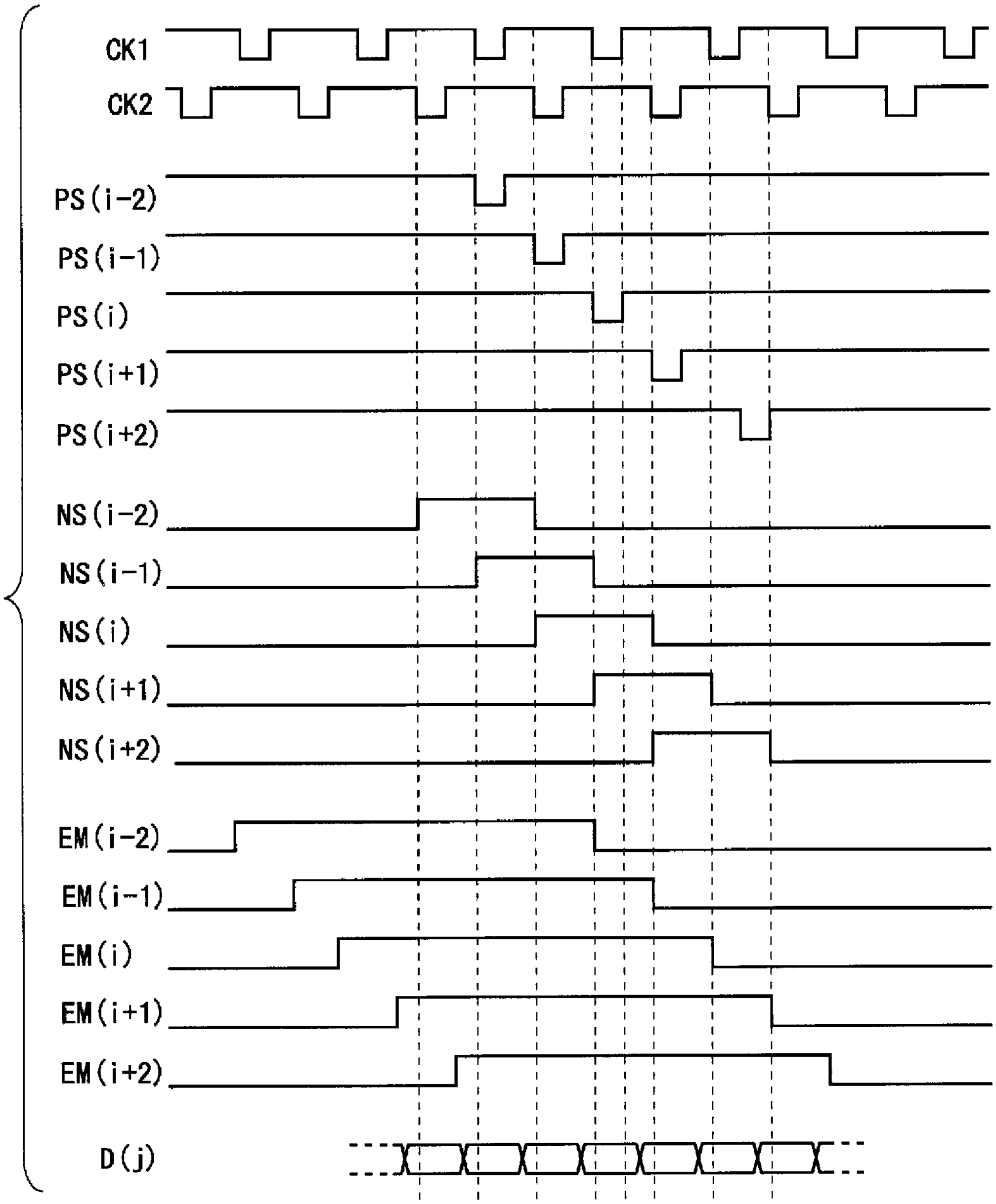
FIG. 2 is a timing chart for describing the schematic operation in a normal driving mode of the display device according to the first embodiment.

FIG. 2 is a timing chart for describing schematic operations of the display device 10 in the normal driving mode. The scanning-side control signal Scs sent from the display control circuit 20 to the scanning-side drive circuit 40 includes a two phase clock signal including first and second gate clock signals CK1 and CK2. In the normal driving mode, the scanning-side drive circuit 40, based on a two phase clock signal, generates first scanning signals NS(−1), NS(0), NS(1) to NS(n) and second scanning signals PS(1) to PS(n) as illustrated in FIG. 2, applies the first scanning signals NS(−1) to NS(n) to the first scanning signal lines NS−1 to NSn, and applies the second scanning signals PS(1) to PS(n) to the second scanning signal lines PS1 to PSn. In addition, the scanning-side drive circuit 40, based on the two phase clock signal (the first and second gate clock signal CK1 and CK2), generates light emission control signals EM(1) to EM(n) as illustrated in FIG. 2 and applies the light emission control signals EM(1) to EM(n) to the light emission control lines EM1 to EMn. On the other hand, based on the data-side control signal Scd from the display control circuit 20, the data-side drive circuit 30 generates the data signals D(1) to D(m) that change in conjunction with the second scanning signals PS(1) to PS(n) as illustrated in FIG. 2 and applies the data signals D(1) to D(m) to the data signal lines D1 to Dm. In this manner, by driving the first scanning signal lines NS−1 to NSn, the second scanning signal lines PS1 to PSn, the light emission control lines EM1 to EMn, and the data signal lines D1 to Dm in the display portion 11, in a non-light emission period, initialization and data voltage writing is performed on each pixel circuit Pix(i, j) and, in a light emission period, the pixel circuits emit light at a luminance corresponding to the written data voltage.

In the normal driving mode, by driving, as described above, the first scanning signal lines NS−1 to NSn, the second scanning signal lines PS1 to PSn, the light emission control lines EM1 to EMn, and the data signal lines D1 to Dm via the various signals illustrated in FIG. 2, in one frame period, the first scanning signal lines NS−1 to NSn and the second scanning signal lines PS1 to PSn are sequentially selected, and the refresh frame period (hereinafter also referred to as the "RF frame period") Trf for writing image data to (the pixel circuits Pix(1,1) to Pix(n, m) of) the display portion 11 is repeated.

Figure 11:
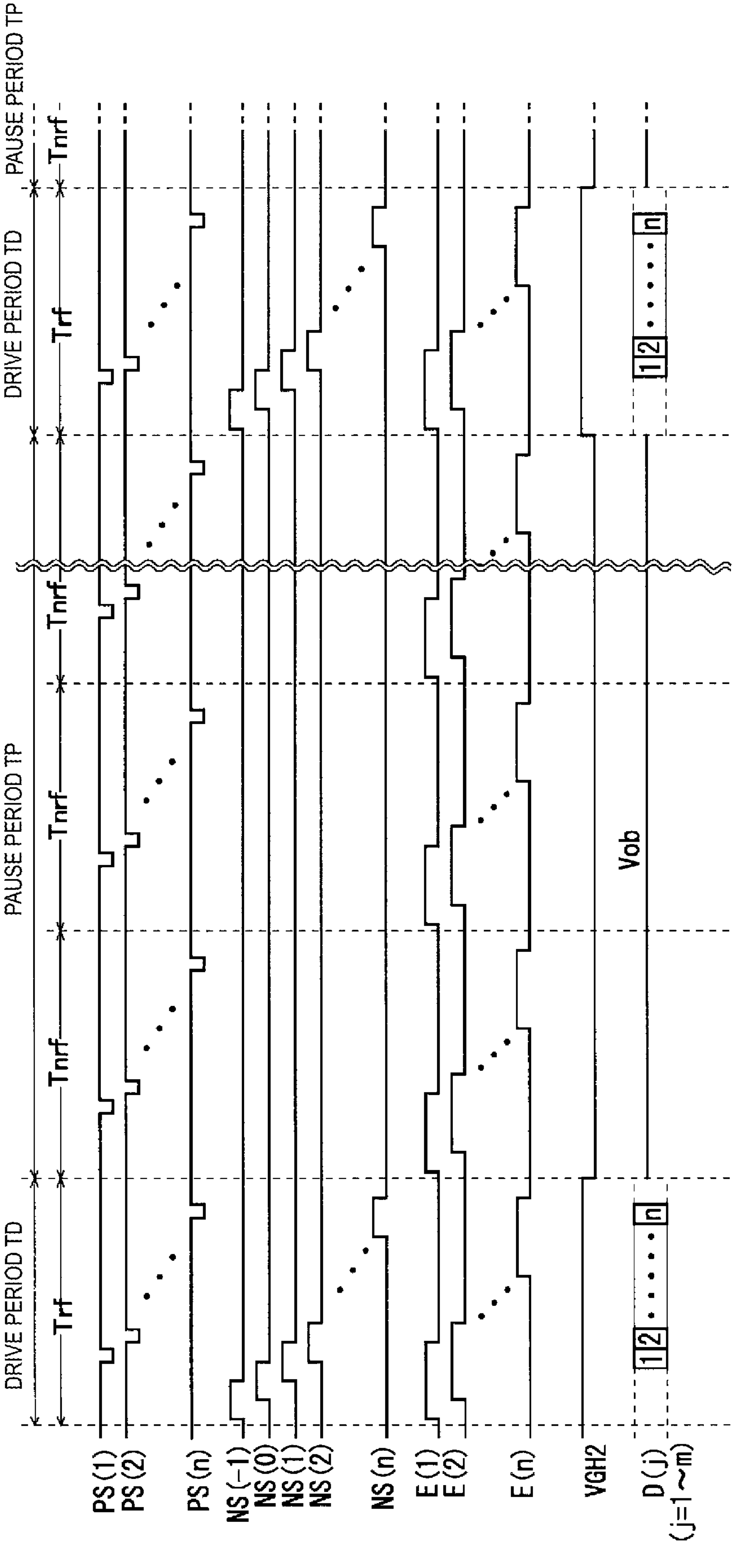
FIG. 11 is a timing chart for describing a driving method in a pause driving mode for the display device according to the first embodiment.

On the other hand, in the pause driving mode, as illustrated in FIG. 11 described below, the drive period TD and the pause period TP alternate repeatedly. The drive period TD includes only the RF frame period Trf, and the pause period TP includes the plurality of non-refresh frame periods (hereinafter also referred to as "NRF frame" periods") Tnrf for stopping the writing of image data to the display portion 11 in which sequential selection of the second scanning signal lines PS1 to PSn is continued but a non-select state of the first scanning signal lines NS-1 to NSn is maintained. In the pause driving mode, the driving of the first scanning signal lines NS-1 to NSn by the scanning-side drive circuit 40 and the data signal lines D1 to Dm by the data-side drive circuit 30 in the pause period TP is stopped, and display using image data written in the preceding drive period TD (RF frame period Trf) continues. Thus, the pause driving mode is effective in reducing the power consumption of the display device when a still image is displayed. Note that in the example of FIG. 11, the drive period TD includes only one RF frame period Trf but may include two or more RF frame periods Trf.

The input signal Sin from the outside includes an operation mode signal Sm indicating which operation mode, from among the normal driving mode and the pause driving mode as described above, to drive the display portion 11 with. The operation mode signal Sm is sent to the scanning-side drive circuit 40 as a part of the scanning-side control signal Scs and sent to the data-side drive circuit 30 as a part of the data-side control signal Scd. The scanning-side drive circuit 40 drives the first scanning signal lines NS−1 to NSn according to the operation mode indicated by the operation mode signal Sm, and the data-side drive circuit 30 drives the data signal lines D1 to Dn according to the operation mode indicated by the operation mode signal Sm (see FIG. 11 described below). The second scanning signal lines PS1 to PSn and the light emission control lines EM1 to EMn are driven in a similar manner (the same period and the same duty ratio) irrespective of whether the normal driving mode or the pause driving mode is used. Note that since the normal driving mode is not relevant to the object of the present application, operations in the pause driving mode will be focused on when describing the operations of the display device 10 or the pixel circuits thereof (the same applies to other embodiments as will be described below).

Figure 4:
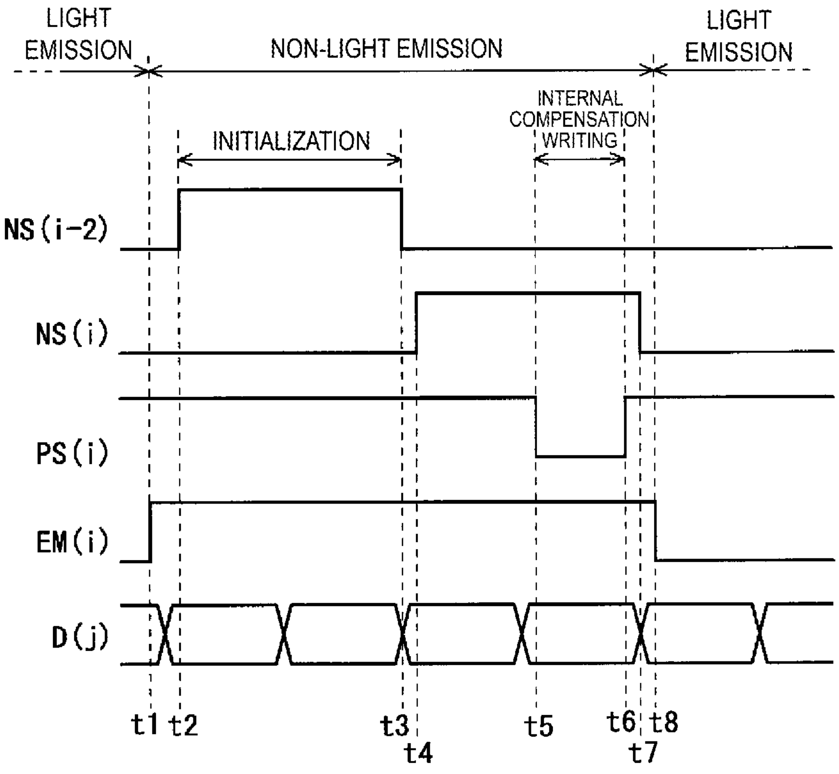
FIG. 4 is a timing chart for describing operations of the pixel circuit in a drive period (refresh frame period) according to the first embodiment.

In the present embodiment, in the drive period TD (RF frame period Trf), at each pixel circuit Pix(i, j), when the corresponding first and second scanning signal lines NSi and PS1 are in a select state, a data write operation is performed, when the second previous first scanning signal line NSi−2 of the first scanning signal line NSi is in a select state, a reset operation is performed, and the light emission control line EM1 is driven such that each pixel circuit Pix(i, j) is put in a non-light emission state in the period in which the data write operation and the reset operation is performed (i=1 to n) (see FIG. 4 described below). As described below, in the pixel circuit Pix(i, j) according to the present embodiment, a P-channel transistor is used as first and second light emission control transistors T5 and T6 (see FIG. 3 described below). Thus, each light emission control line EM1 is put in an activated state when a low-level (L level) voltage is applied and put in an inactivated state when a high-level (H level) voltage is applied. As described above, in each NRF frame period Tnrf in the pause period TP also, the light emission control lines EM1 to EMn are driven in a similar manner as in the RF frame period Trf.

1.3 Configuration of Pixel Circuit

Next, the configuration and operations of the pixel circuit 15 in the present embodiment will be described with reference to FIGS. 3 to 9.

FIG. 3 is a circuit diagram illustrating a configuration of the pixel circuit 15 in the present embodiment, and more specifically, a pixel circuit 15 corresponding to the i-th second scanning signal line PS1 and the j-th data signal line Dj, i.e., a pixel circuit representing the configuration of the i-th row, j-th column pixel circuit Pix(i, j) (1≤i≤n, 1≤j≤m). The configuration of the pixel circuit 15 illustrated herein is merely an example, and the configuration is not limited thereto. The pixel circuit 15 illustrated in FIG. 3 includes one organic EL element (organic light-emitting diode) OL as a display element, seven transistors (typically, thin film transistors) T1 to T7 (hereinafter referred to as a first initialization transistor T1, a threshold compensation transistor T2, a write control transistor T3, a drive transistor T4, a first light emission control transistor T5, a second light emission control transistor T6, and a second initialization transistor T7), and one holding capacitor Cst. The transistors T1, T2, and T7 are N-type transistors. The transistors T3 to T6 are P-type transistors. The N-type transistors T1, T2, and T7 are, for example, IGZO-TFTs, and the P-type transistors T3 to T6 are, for example, LTPS-TFTs. However, the configuration is not limited thereto. The holding capacitor Cst is a capacitance element including two electrodes (first electrode and second electrode). Note that in the pixel circuit 15, the transistors T1 to T3 and T5 to T7 other than the drive transistor T4 function as switching elements.

To the pixel circuit Pix(i, j), the first scanning signal line NSi corresponding thereto (hereinafter, also referred to as the "corresponding first scanning signal line" in the description focusing on the pixel circuit), the corresponding second scanning signal line (hereinafter also referred to as "corresponding second scanning signal line" in the description focusing on the pixel circuit) PS1 connected to the second previous first scanning signal line (the second previous scanning signal line in the scanning order from among the first scanning signal lines NS−1 to NSn, hereinafter referred to simply as "preceding first scanning signal line" in the description focusing on the pixel circuit) of the corresponding first scanning signal line NSi, in other words the i−2th the first scanning signal line NSi−2, the light emission control line EM corresponding thereto (hereinafter, also referred to as the "corresponding light emission control line" in the description focusing on the pixel circuit), the data signal line Dj corresponding thereto (hereinafter also referred to as the "corresponding data signal line" in the description focusing on the pixel circuit), the initialization voltage line Vini, the high-level power source line ELVDD, and the low-level power source line ELVSS are connected. In another configuration, instead of the preceding first scanning signal line NSi−2, the immediately preceding first scanning signal line NSi−1 may be connected to the pixel circuit Pix(i, j).

The gate terminal of the first initialization transistor T1 is connected to the second previous first scanning signal line, that is the preceding first scanning signal line NSi−2, and the drain terminal is connected to the second electrode of the holding capacitor Cst, the gate terminal of the drive transistor T4, and the source terminal of the threshold compensation transistor T2.

The gate terminal of the threshold compensation transistor T2 is connected to the corresponding first scanning signal line NSi, the drain terminal is connected to the drain terminal of the drive transistor T4 and the source terminal of the second light emission control transistor T6, and the source terminal is connected to the gate terminal of the drive transistor T4.

The gate terminal of the write control transistor T3 is connected to the corresponding second scanning signal line PS1, the source terminal is connected to the corresponding data signal line Dj, and the drain terminal is connected to the source terminal of the drive transistor T4 and the drain terminal of the first light emission control transistor T5. The gate terminal of the drive transistor T4 is connected to the second electrode of the holding capacitor Cst, the source terminal is connected to the drain terminal of the write control transistor T3 and the drain terminal of the first light emission control transistor, and the drain terminal is connected to the source terminal of the second light emission control transistor T6. The gate terminal of the first light emission control transistor T5 is connected to the corresponding light emission control line EM1, the source terminal is connected to the high-level power source line ELVDD, and the drain terminal is connected to the source terminal of the drive transistor T4. The gate terminal of the second light emission control transistor T6 is connected to the corresponding light emission control line EM1, the source terminal is connected to the drain terminal of the drive transistor T4, and the drain terminal is connected to the anode electrode of the organic EL element OL. The gate terminal of the second initialization transistor T7 is connected to the corresponding light emission control line EM1, the source terminal is connected to the initialization voltage line Vini, and the drain terminal is connected to the anode electrode of the organic EL element OL. The first electrode of the holding capacitor Cst is connected to the high-level power source line ELVDD, and the second electrode is connected to the gate terminal of the drive transistor T4. The anode electrode of the organic EL element OL is connected to the drain terminal of the second light emission control transistor T6, and the cathode electrode is connected to the low-level power source line ELVSS.

1.4 Operation of Pixel Circuit in Drive Period

Figure 5:
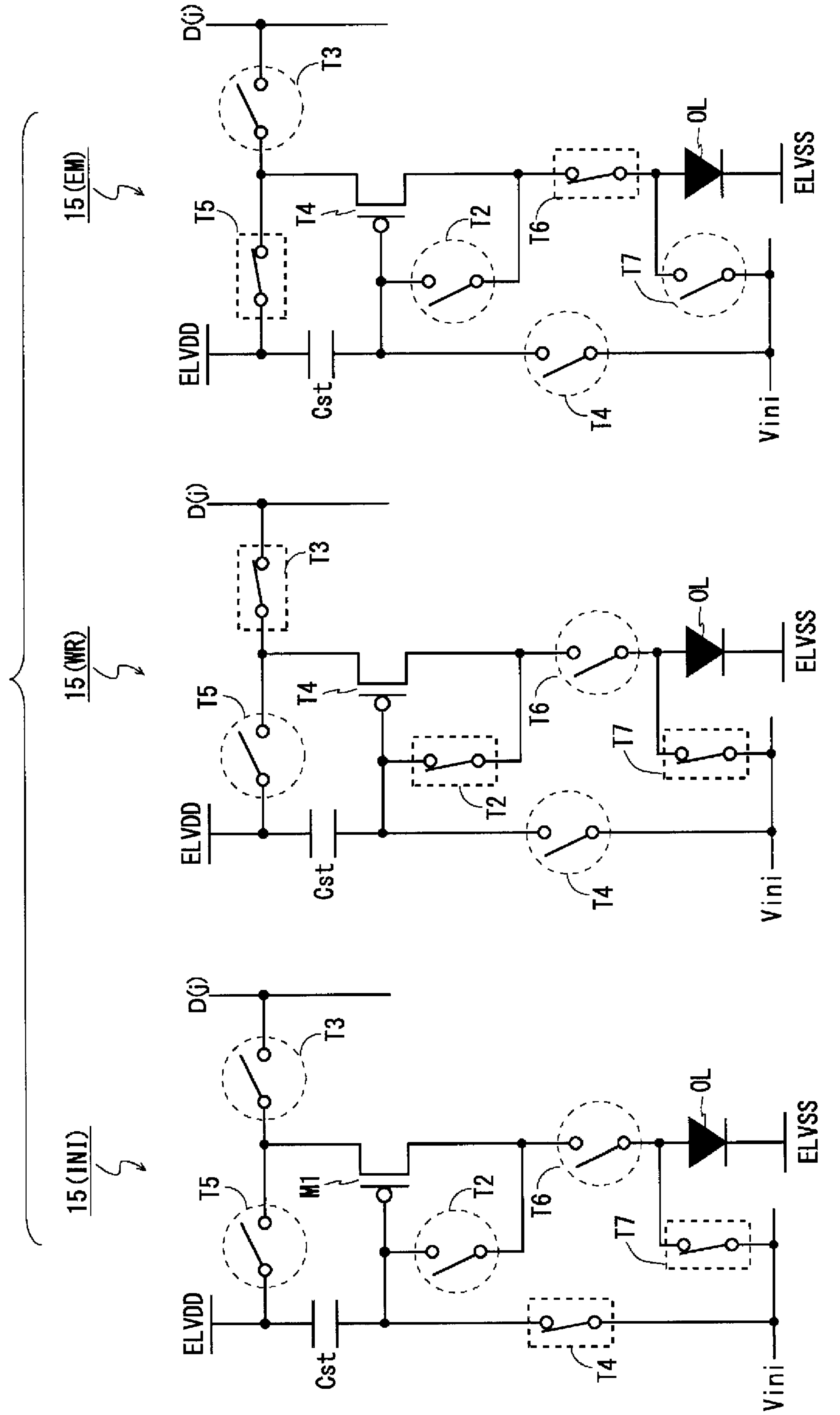
FIG. 5 is a circuit diagram for describing an initialization operation, a data write operation, and a lighting operation of the pixel circuit according to the first embodiment.

Next, the operations of the pixel circuit 15 illustrated in FIG. 3, that is the i-th row, j-th column pixel circuit Pix(i, j) according to the present embodiment, in the drive period TD (RF frame period Trf) will be described with reference to FIGS. 3, 4, and 5. FIG. 4 is a timing chart for describing the operations of the pixel circuit Pix(i, j) in a non-light emission period included in the drive period TD (RF frame period Trf). FIG. 5 is a circuit diagram for describing the initialization operation, the data write operation, and the lighting operation of the pixel circuits 15 according to the present embodiment, with the pixel circuit 15 for the initialization operation being denoted by the reference sign 15(INI), the pixel circuit 15 for the data write operation being denote by the reference sign 15(WR), and the pixel circuit 15 for the lighting operation being denoted by the reference sign 15(EM).

When the light emission control signal EM(i) sent to the pixel circuit Pix(i, j) in FIG. 3 via the corresponding light emission control line EM1 changes from the L level to the H level at time t1, the P-type first and second light emission control transistors T5 and T6 change from an on state to an off state and stay in the off state while the light emission control signal EM(i) is the H level. Accordingly, In the period t1 to t8 in which the light emission control signal EM(i) is the H level, a current does not flow to the organic EL element OL and the pixel circuit Pix(i, j) is in a non-light emission state. In addition, in the period (non-light emission period) t1 to t8 in which the pixel circuit Pix(i, j) is in a non-light emission state, the N-type second initialization transistor T7 is turned to the on state. Thus, voltage (hereinafter referred to as "anode voltage") Va of the anode electrode of the organic EL element OL is initialized.

In the non-light emission period t1 to t8, the first scanning signal (hereinafter also referred to as the "preceding first scanning signal") NS(i−2) sent to the pixel circuit Pix(i, j) via the preceding first scanning signal line NSi−2 is changed at time t2 from L level to H level. Accordingly, the N-type first initialization transistor T1 changes from the off state to the on state and stays in the on state while the first scanning signal NS(i−2) is the H level. In period (hereinafter referred to as the "initialization period") t2 to t3 in which the first initialization transistor T1 is in the on state, the holding capacitor Cst is initialized, and a voltage (hereinafter referred to as the "gate voltage") Vg of the gate terminal of the drive transistor T4 becomes the initialization voltage Vini. FIG. 5 schematically illustrates the pixel circuit 15(INI) and the state of the pixel circuit Pix(i, j) at this time, that is the circuit state when performing the initialization operation. In the pixel circuit 15(INI) in FIG. 5, the dotted circles indicate that the transistors serving as switching elements in the pixel circuit are in the off state and the dotted rectangles indicate that the transistors serving as switching elements in the pixel circuit are in the on state. Such a representation is also employed for the pixel circuits 15(WR) and 15(EM) in FIG. 5 and also in FIGS. 8, 9, and 14 to 16. Hereinafter, the reference sign "15(INI)", the reference sign "15(WR)", and the reference sign "15(EN)" are also used as reference signs indicating the circuit state of the pixel circuit 15 (Pix(i, j)).

In the non-light emission period t1 to t8 of the pixel circuit Pix(i, j) in FIG. 3, after the preceding first scanning signal NS(i−2) has changed to the L level at time t3, the first scanning signal (hereinafter also referred to as the "corresponding first scanning signal") NS(i) sent via the corresponding first scanning signal line NSi changes from the L level to the H level at time t4. Accordingly, the N-type threshold compensation transistor T2 changes from the off state to the on state and stays in the on state while the corresponding first scanning signal NS(i) is the H level, and the drive transistor T4 is in the diode-connected state.

In the period t4 to t7 in which the threshold compensation transistor T2 is in the on state, the second scanning signal (hereinafter also referred to as the "corresponding second scanning signal") PS(i) sent to the pixel circuit Pix(i, j) via the corresponding second scanning signal line PS1 changes from the H level to the L level at time t5. Accordingly, the P-type write control transistor T3 changes from the off state to the on state and stays in the on state while the second scanning signal PS(i) is the L level. In the period (hereinafter referred to as the "data write period") t5 to t6 in which the write control transistor T3 is in the on state, the voltage of the data signal D(j) sent to the pixel circuit Pix(i, j) via the corresponding data signal line Dj is applied to the holding capacitor Cst via the drive transistor T4 in the diode-connected state as a data voltage Vdata. Accordingly, the data voltage post-threshold compensation is written and held in the holding capacitor Cst, and the voltage (gate voltage) Vg of the gate terminal of the drive transistor T4 is maintained at the voltage of the second electrode of the holding capacitor Cst. At this time, when the threshold value of the drive transistor T4 satisfies Vth (<0), the gate voltage Vg is the value obtained via the following formula.

$$Vg = \text{Vdata} + Vth \quad (1)$$

In this manner, in the data write period t5 to t6, internal compensation is performed and the data voltage is written. FIG. 5 schematically illustrates the pixel circuit 15(WR) and the state of the pixel circuit Pix(i, j) at this time, that is the circuit state when a data write operation is performed (together with the internal compensation operation). Note that the data signal D(j) changes as illustrated in FIG. 4 in conjunction with the changes in the second scanning signals PS(1) to PS(n) applied to the second scanning signal lines PS1 to PSn.

At time t7 after the data write period t5 to t6, the first scanning signal NS(i) changes from the H level to the L level, and the threshold compensation transistor T2 turns to the off state. Next, at time t8, the light emission control signal EM(i) changes from the H level to the L level. Accordingly, the first and second light emission control transistors T5 and T6 turn to the on state and the light emission period starts. FIG. 5 schematically illustrates the pixel circuit 15(EM) and the state of the pixel circuit Pix(i, j) in the light emission period, i.e., the circuit state during the lighting operation. In the light emission period, a current I1 of an amount corresponding to the voltage (voltage written in the data write period t5 to t6) held by the holding capacitor Cst flows from the high-level power source line ELVDD to the low-level power source line ELVSS via the first light emission control transistor T5, the drive transistor T4, the second light emission control transistor T6, and the organic EL element OL.

1.5 Operation of Pixel Circuit in Pause Period

Figure 6:
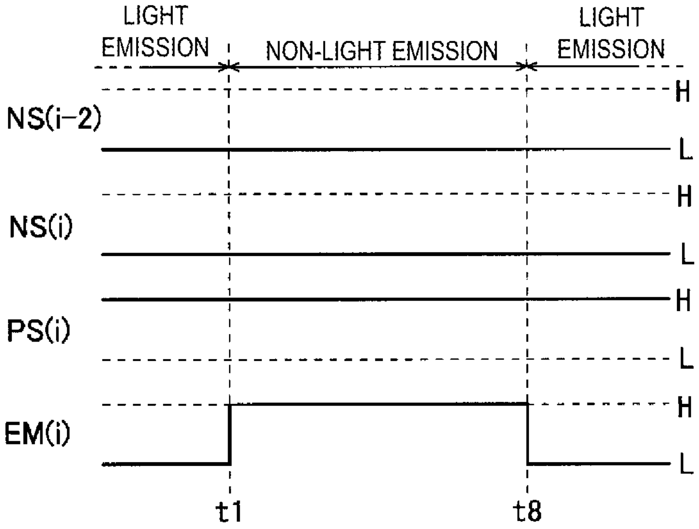
FIG. 6 is a timing chart for describing operations of the scanning-side drive circuit in a pause period (non-refresh frame period) according to a comparative example of the first embodiment.
Figure 7:
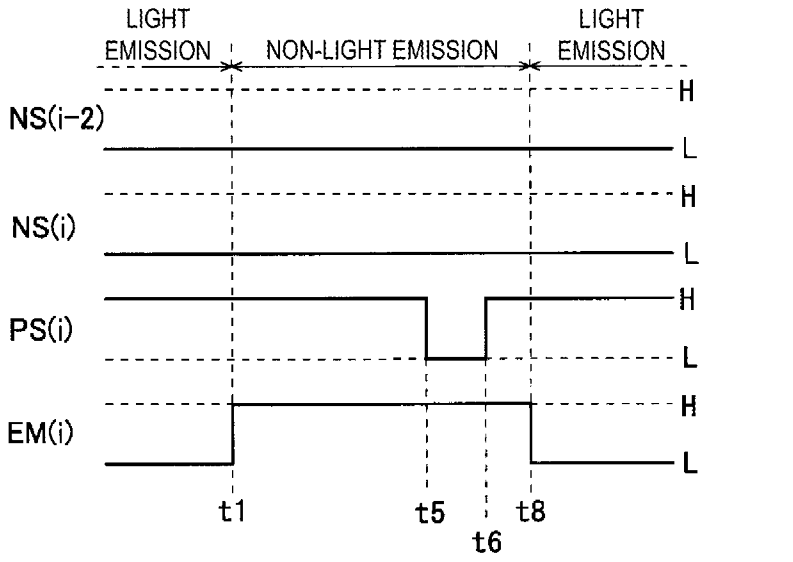
FIG. 7 is a timing chart for describing operations of the scanning-side drive circuit in a non-refresh frame period according to the first embodiment.
Figure 8:
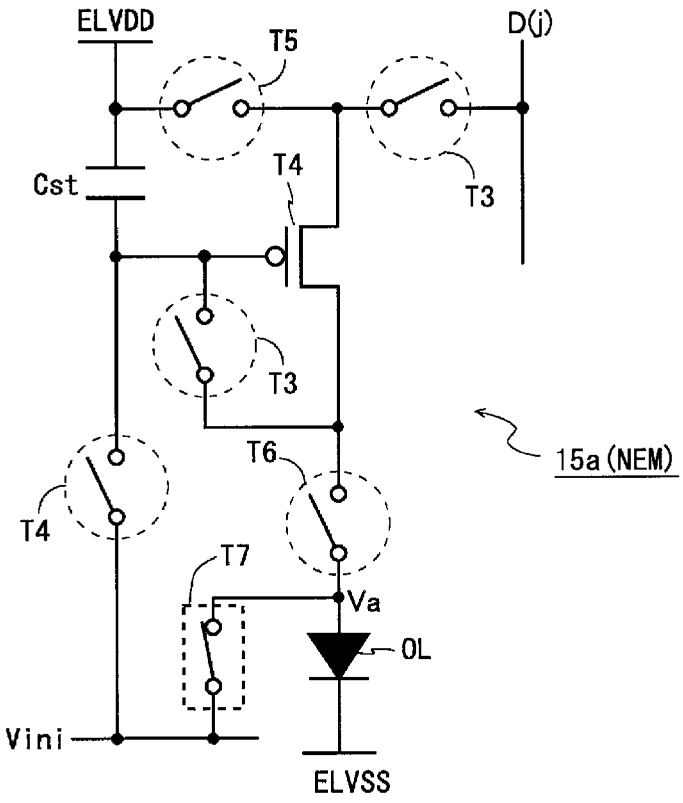
FIG. 8 is a circuit diagram for describing a turn-off operation of the pixel circuit in the non-refresh frame period according to the comparative example.
Figure 9:
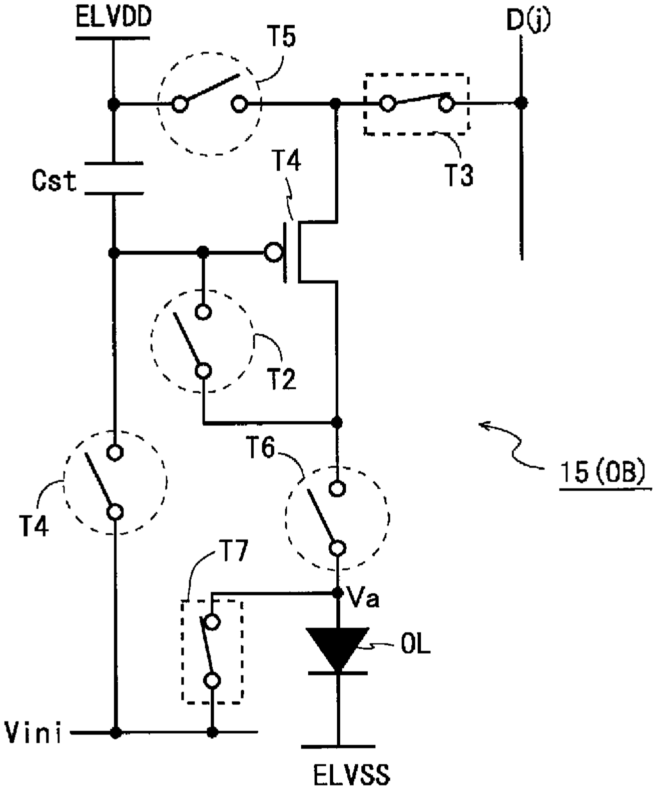
FIG. 9 is a circuit diagram for describing operations of the pixel circuit in the bias application period within the non-refresh frame period according to the first embodiment.

Next, the operations in the (NRF frame period Tnrf in the) pause period TP of the pixel circuit 15 illustrated in FIG. 3, that is the i-th row, j-th column pixel circuit Pix(i, j) according to the present embodiment, will be described while referencing FIGS. 3 and 6 to 9 and referencing the operations of a pixel circuit of a display device according to a comparative example. The comparative example has two operation modes, the normal driving mode and the pause driving mode, and the configuration for driving the second scanning signal lines PS1 to PSn and the data signal lines D1 to Dm in the pause period TP is different from the configuration of the present embodiment. However, the other configurations are similar to the configurations of the present embodiment, and thus portions that correspond between the two are given the same reference sign. FIG. 6 is a timing chart for describing the operations of the pixel circuit Pix(i, j) according to the comparative example in a non-light emission period included in the pause period TP. FIG. 7 is a timing chart for describing the operations of the pixel circuit Pix(i, j) according to the present embodiment in a non-light emission period included in the pause period TP. FIG. 8 is a circuit diagram for describing the operation (turn-off operation) of the pixel circuit Pix(i, j) according to the comparative example in a non-light emission period included in the pause period TP. FIG. 9 is a circuit diagram for describing the operation (turn-off operation) of the pixel circuit Pix(i, j) according to the present embodiment in a non-light emission period included in the pause period TP.

In the pause period TP according to the comparative example, the light emission control lines EM1 to EMn is driven as in the drive period TD (the same period and the same duty ratio), and the period in which the first and second light emission control transistors T5 and T6 turn to the off state and the duration of the off state are the same, irrespective of whether it is the drive period TD or the pause period TP. However, the driving of the first scanning signal lines NS−1 to NSn and the second scanning signal lines PS1 to PSn both will stop. Thus, as illustrated in FIG. 6, the light emission control signal EM(i) sent to the pixel circuit Pix(i, j) in FIG. 3 via the corresponding light emission control line EM1 changes from L level to H level at the start time t1 of the non-light emission period and changes from H level to L level at end time t8 of the non-light emission period. However, the preceding first scanning signal line NSi−2, the corresponding first scanning signal line NSi, and the corresponding second scanning signal line PS1 all maintain the non-select state, irrespective of whether it is the light emission period or the non-light emission period. That is, the preceding first scanning signal NS(i−2) and the corresponding first scanning signal NS(i) stay at the L level, and the corresponding second scanning signal PS(i) stays at the H level. FIG. 8 schematically illustrates a pixel circuit 15*a* (NEM) and the state of the pixel circuit Pix(i, j) in the non-light emission period included in the pause period TP according to the comparative example, that is the circuit state of the pixel during the turn-off operation.

In the pause period TP according to the present embodiment, the light emission control lines EM1 to EMn as well as the second scanning signal lines PS1 to PSn are driven as in the drive period TD (the same period and the same duty ratio), and the driving of the first scanning signal lines NS−1 to NSn is stopped. Thus, as illustrated in FIG. 7, the light emission control signal EM(i) sent to the pixel circuit Pix(i, j) in FIG. 3 via the corresponding light emission control line EM1 changes from L level to H level at the start time t1 of the non-light emission period and changes from H level to L level at end time t8 of the non-light emission period. Not only this, the corresponding second scanning signal PS(i) sent to the pixel circuit Pix(i, j) via the corresponding second scanning signal line PS1, in the non-light emission period, changes from the H level to the L level at time t5 and from the L level to the H level at time t6. Accordingly, in the pixel circuit Pix(i, j), in the period t5 to t6 in which the corresponding second scanning signal PS(i) is the L level (active), the write control transistor T3 is in the on state, and the voltage of the corresponding data signal line Dj is sent to the source terminal of the drive transistor T4 via the write control transistor T3.

In the present embodiment, in the pause period TP, an on-bias voltage Vob described below is applied to each data signal line Dj from the data-side drive circuit 30 as the data signal D(j). Thus, in the period (hereinafter referred to as the "bias application period") t5 to t6 in which the corresponding second scanning signal PS(i) is the L level, the on-bias voltage Vob is applied to the source terminal of the drive transistor T4. The on-bias voltage Vob applied at this time is held at the source terminal (by parasitic capacitance) of the drive transistor T4 until time t8 when the light emission control signal EM(i) changes to the L level (activated state). Thus, the period (hereinafter referred to as the "on-bias period") in which the on-bias voltage Vob is substantially sent to the source terminal of the drive transistor T4 is from time t5 to time t8 as illustrated in FIG. 7. FIG. 9 schematically illustrates a pixel circuit 15(OB) and the state of the pixel circuit Pix(i, j) in the bias application period within the non-light emission period included in the pause period TP according to the present embodiment, that is the circuit state of the pixel during bias application. Hereinafter, the reference sign "15(OB)" is also used as a reference sign indicating the circuit state of the pixel circuit 15 (Pix(i, j)).

1.6 Effects of Turn-Off Operation

The effects relating to the turn-off operation according to the present embodiment in the pause driving mode will be described below with reference to the turn-off operation according to the comparative example.

Figure 10:
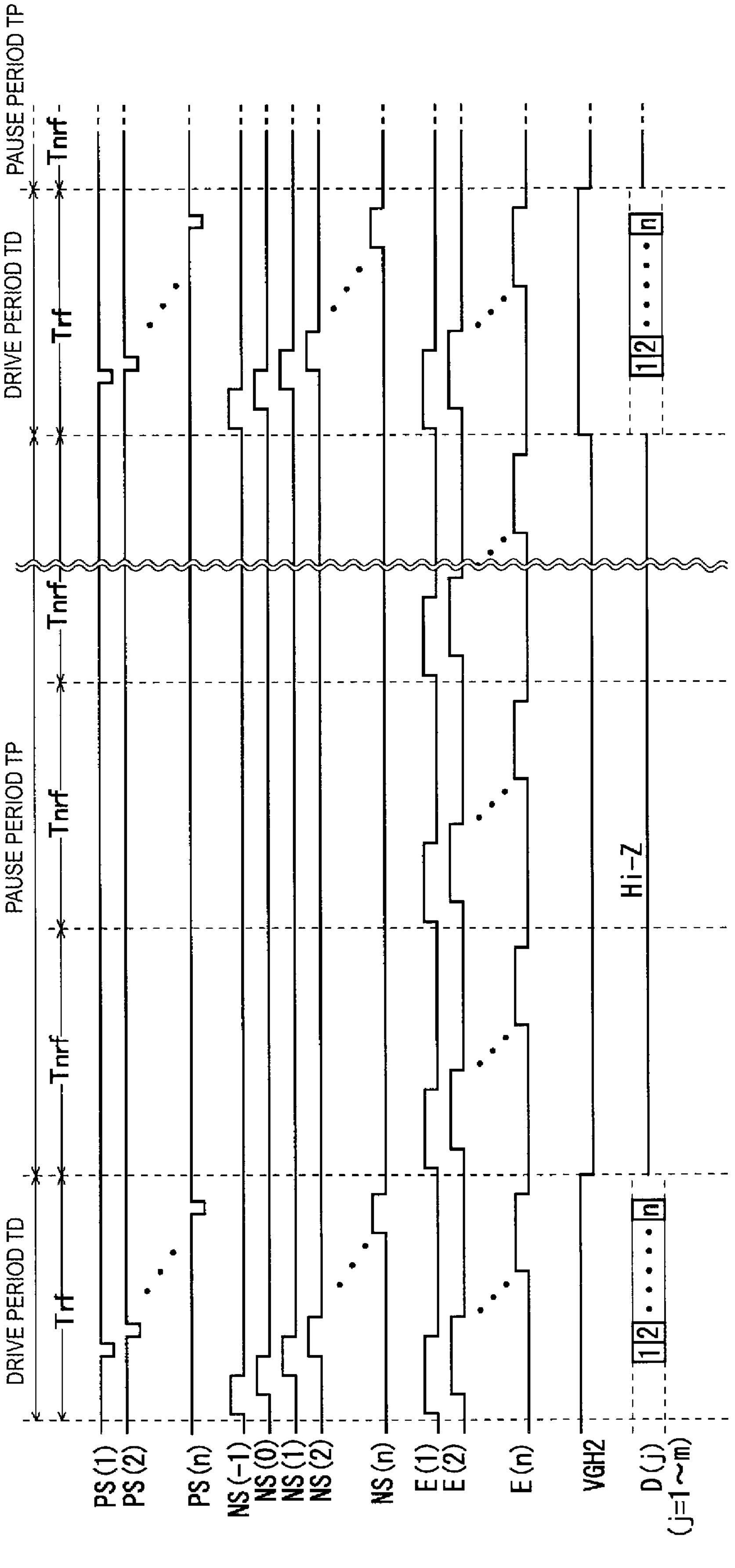
FIG. 10 is a timing chart for describing a driving method in a pause driving mode for the display device according to the comparative example.

In the comparative example, as can be seen from FIGS. 2, 4, and 6, the pixel circuits Pix(1, 1) to Pix(n, m) of the display portion 11 are driven by the first scanning signals NS(−1) to NS(n), the second scanning signals PS(1) to PS(n), the light emission control signals EM(1) to EM(n), and the data signals D(1) to D(m) as illustrated in FIG. 10. On the other hand, in the present embodiment, as can be seen from FIGS. 2, 4, and 7, the pixel circuits Pix(1, 1) to Pix(n, m) of the display portion 11 are driven by the first scanning signals NS(−1) to NS(n), the second scanning signals PS(1) to PS(n), the light emission control signals EM(1) to EM(n), and the data signals D(1) to D(m) as illustrated in FIG. 11.

Figure 12:
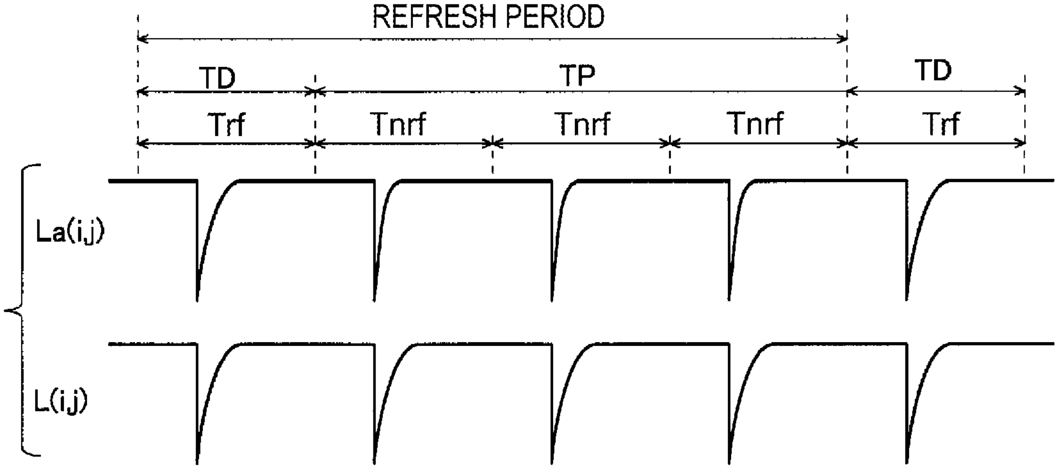
FIG. 12 is a waveform diagram for describing a turn-off operation according to the first embodiment and the comparative example.
Figure 13:
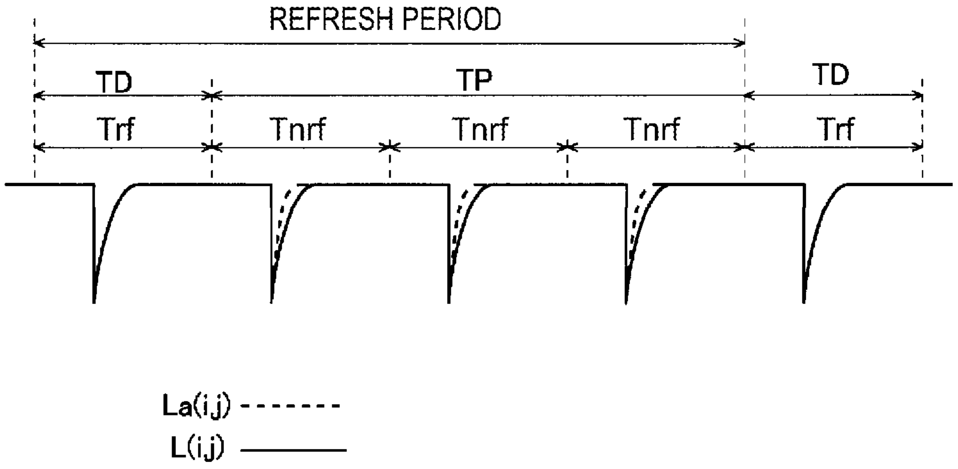
FIG. 13 is a waveform diagram for describing the difference in the turn-off waveform between the first embodiment and the comparative example.

FIG. 12 illustrates a luminance waveform La(i, j) of the pixel circuit Pix(i, j) according to the comparative example based on the driving method illustrated in FIG. 10 (hereinafter referred to as the "luminance waveform of the comparative example") and a luminance waveform L(i, j) of the pixel circuit Pix(i, j) according to the present embodiment based on the driving method illustrated in FIG. 11 (hereinafter referred to as the "luminance waveform of the present embodiment"). In FIG. 13, the luminance waveform La(i, j) of the comparative example and the luminance waveform L(i, j) of the present embodiment are superimposed on one another to make it easy to see the differences. The luminance waveform L(i, j) of the present embodiment is represented by a solid line, and the luminance waveform La(i, j) of the comparative example is represented by a broken line.

As can be seen from FIGS. 12 and 13, the difference in the luminance waveform La(i, j) of the comparative example is between the waveform (turn-off waveform) indicating the turn-off operation in the drive period TD (RF frame period Trf) and the waveform (turn-off waveform) indicating the turn-off operation in the pause period TP (NRF frame period Tnrf). More specifically, the difference is in the rise in the luminance waveform when the pixel circuit Pix(i, j) changes from the turn-off state to the turn-on state due to the light emission control signal EM(i) changes from the H level to the L level, and the rise of the luminance waveform in the NRF frame period Tnrf is steeper than the rise of the luminance waveform in the RF frame period Trf. This is considered to be due to the hysteresis characteristic of the drive transistor T4. Now, this point will be described with reference to FIGS. 14 and 15.

Figure 14:
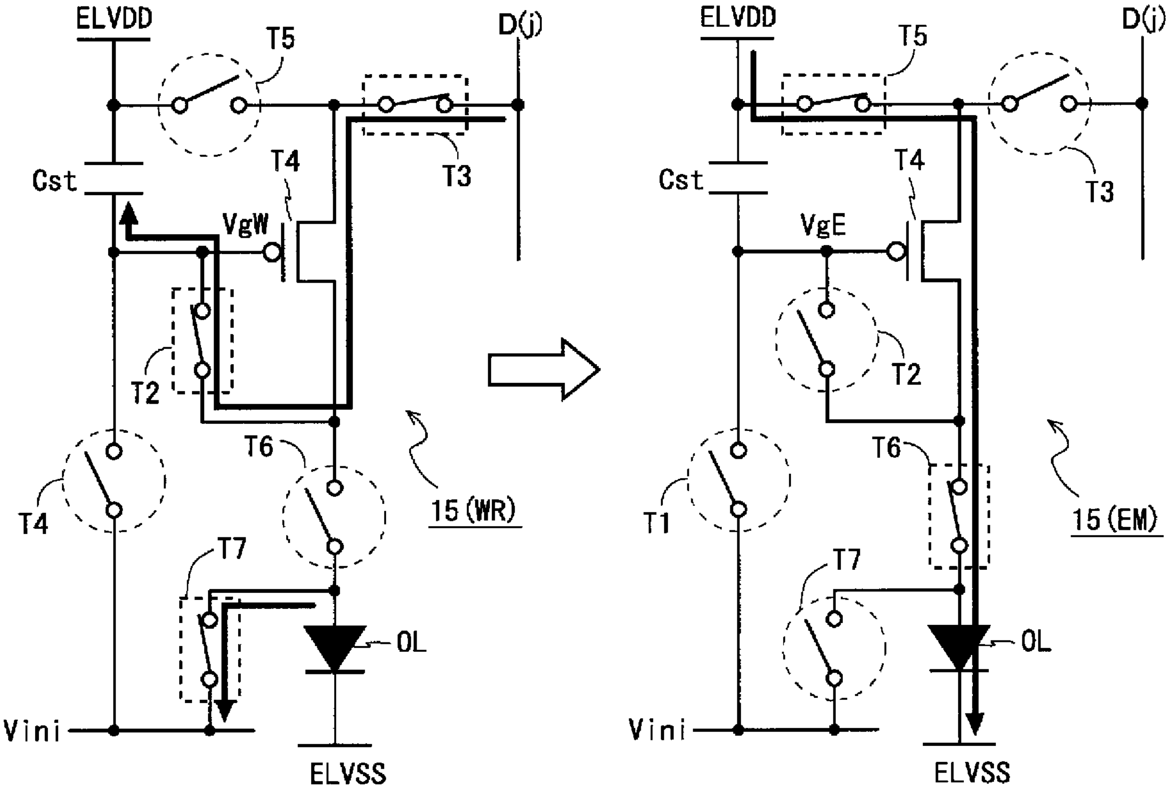
FIG. 14 is a diagram for describing a change in voltage stress on a drive transistor when the pixel circuit according to the first embodiment transitions from a non-light emission state to a light emission state in the drive period.

In the drive period TD (RF frame period Trf), when the light emission control signal EM(i) changes from the H level to the L level, the pixel circuit Pix(i, j), as illustrated in FIG. 14, changes from the state 15(WR) of the data write operation to the state 15(EM) of the lighting operation (see FIG. 4). In the state 15(WR) of the data write operation, the drive transistor T4 is in the diode-connected state. Thus, a gate-source voltage VgsW of the drive transistor T4 is $$VgsW=Vth \quad (2).$$

Note that a gate voltage VgW at this time is, as per Formula (1) described above, $$VgW=Vdata+Vth \quad (3).$$

When the data write operation state 15(WR) changes to the lighting operation state 15(EM), the threshold compensation transistor T2 changes from the on state to the off state, and a feed-through voltage ΔV (<0) caused by the parasitic capacitance of the threshold compensation transistor T2 occurs at the gate terminal of the drive transistor T4. For this reason, a gate voltage VgE of the drive transistor T4 in the lighting operation state 15(EM) is, as per Formula (3) described above, $$VgE=VgW+\Delta V=Vdata+Vth+\Delta V \quad (4).$$

The gate-source voltage VgsE of the drive transistor T4 at this time is $$VgsE=Vdata+Vth+\Delta V-ELVDD \quad (5).$$

Figure 15:
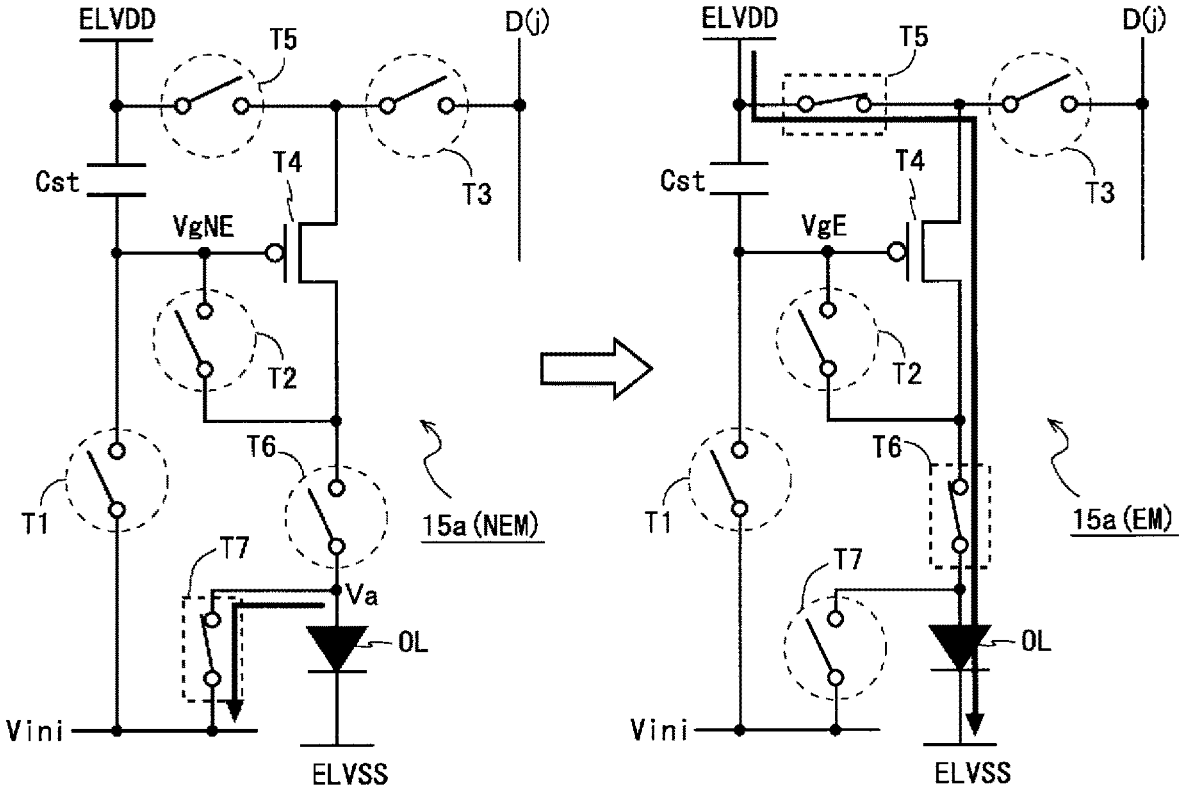
FIG. 15 is a diagram for describing a change in voltage stress on a drive transistor when the pixel circuit according to the comparative example transitions from a non-light emission state to a light emission state in the pause period.

In the pause period TP (NRF frame period Tnrf), when the light emission control signal EM(i) changes from the H level to the L level, the pixel circuit Pix(i, j), as illustrated in FIG. 15, changes from the state 15*a*(NEM) of the lighting operation to the state 15*a*(EM) of the lighting operation (see FIG. 6). In the turn-off operation status 15(NEM), gate voltage VgNE of the drive transistor T4 is similar to Formula (4) described above, that is $$VgNE=Vdata+Vth+\Delta V \quad (6)$$

(leakage current is ignored here). At this time, since the first light emission control transistor T5 is in the off state and the source terminal of the drive transistor T4 is in a floating state, the gate-source voltage Vgs of the drive transistor T4 is indefinite.

However, when the preceding source terminal voltage ELVDD for changing the first light emission control transistor T5 to the off state is held by the parasitic capacitance of the source terminal, a gate-source voltage VgsNE is $$VgsNE=Vdata+Vth+\Delta V-ELVDD \quad (7).$$

When the lighting operation state 15(NEM) changes to the lighting operation state 15*a*(EM), the first light emission control transistor T5 changes from the off state to the on state, and the high-level power supply voltage ELVDD is applied to the source terminal of the drive transistor T4. Accordingly, the gate voltage VgE and the gate-source voltage VgsE of the drive transistor T4 in the lighting operation state 15*a*(EM) is, as with the lighting operation state 15(EM) in the drive period TD, represented by Formulas (4) and (5) described above.

In the comparative example as described above, as is clear from Formulas (2) and (7) described above, the gate-source voltage VgsW of the drive transistor T4 in the write operation state 15(WR) before the start of the light emitting operation in the drive period TD and the gate-source voltage VgsNE of the drive transistor T4 in the turn-off operation state 15*a*(NEM) before the start of the light emitting operation in the pause period TP differ greatly. Thus, due to the hysteresis characteristic of the drive transistor T4, the absolute value of the threshold value Vth is less at the start time (time t8 in FIG. 6) of the lighting operation in the pause period TP than at the start time (time t8 in FIG. 4) of the lighting operation in the drive period TD. Accordingly, even when the holding voltage of the holding capacitor Cst is the same, the current I1 flowing through the organic EL element OL at the start time of the lighting operation in the pause period TP is larger than the current I1 flowing through the organic EL element OL at the start time of lighting operation in the drive period TD. As a result, as illustrated in FIG. 13, in the comparative example, the rise of the luminance waveform in the pause period TP (NRF frame period Tnrf) is steeper than the rise of the luminance waveform in the drive period TD (RF frame period Trf).

However, in the present embodiment, in the drive period TD (RF frame period Trf), though the state of the pixel circuit Pix(i, j) before and after the light emission control signal EM(i) changes from the H level to the L level is as illustrated in FIG. 14 and similar to that of the comparative example (see Formulas (2) and (5) described above regarding the gate-source voltages VgsW and VgsE at the drive transistor T4 at this time), in the pause period TP (NRF frame period Tnrf), the operation of the pixel circuit Pix(i, j) in the non-light emission period before the light emission control signal EM(i) changes from the H level to the L level is different from that of the comparative example.

Figure 16:
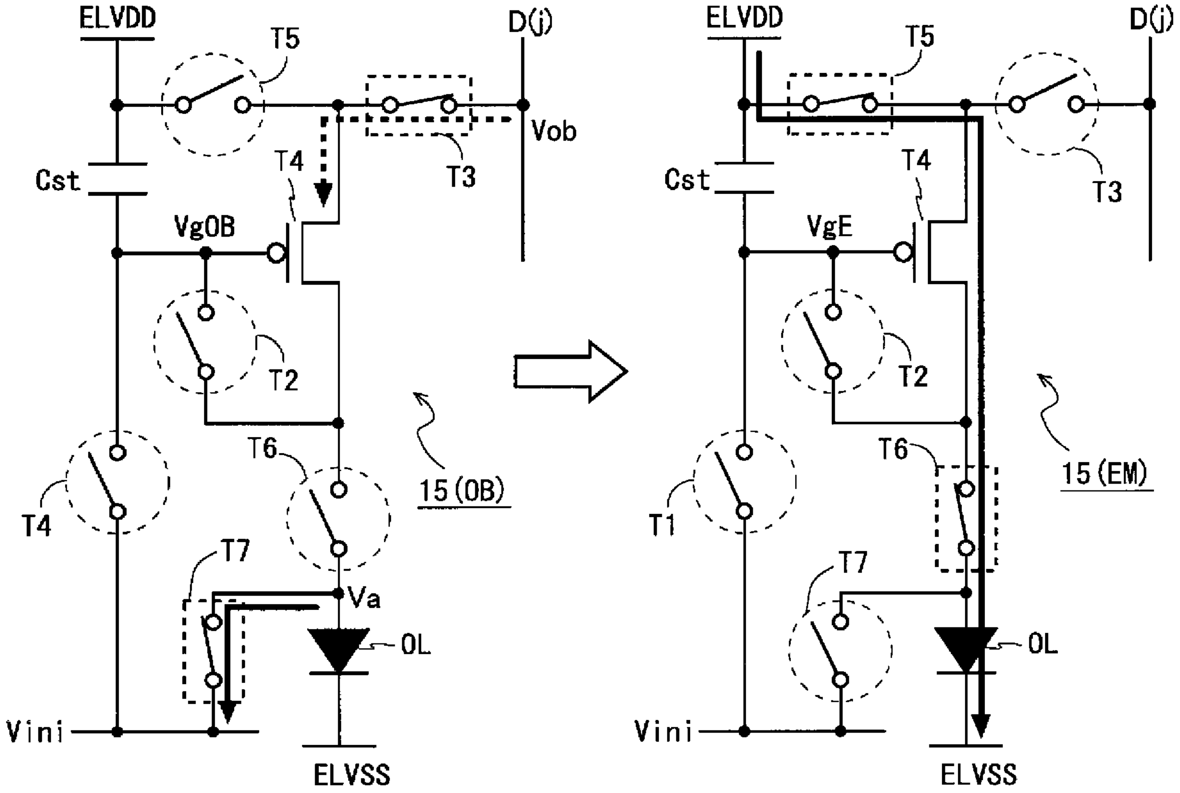
FIG. 16 is a diagram for describing a change in voltage stress on the drive transistor when the pixel circuit according to the first embodiment transitions from a non-light emission state to a light emission state in the pause period.

That is, in the pause period TP according to the present embodiment, in the non-light emission period before the light emission control signal EM(i) changes from the H level to the L level, the bias application period t5 to t6 in which the write control transistor T3 is turned to the on state is provided (see FIG. 7), and, in this period t5 to t6, the voltage of the corresponding data signal line Dj is applied to the source terminal of the drive transistor T4 as the on-bias voltage Vob. FIG. 16 illustrates the circuit state of the pixel circuit 15(OB) when the on-bias voltage Vob is applied. A gate voltage VgOB of the drive transistor T4 at this time is similar to the gate voltage VgE in the preceding light emission period (see Formula (6) described above) and is $$VgOB=Vdata+Vth+\Delta V \quad (8).$$

Thus, a gate-source voltage VgsOB of the drive transistor T4 in the bias application period t5 to t6 illustrated in FIG. 7 is $$VgsOB=Vdata+Vth+\Delta V-Vob \quad (9).$$

When the bias application state 15(OB) ends and the turn-off operation state transitions to the lighting operation state 15(EM), the first light emission control transistor T5 changes from the off state to the on state, and the high-level power supply voltage ELVDD is applied to the source terminal of the drive transistor T4. At this time, the pixel circuit Pix(i, j) changes from the bias application state 15(OB) illustrated in FIG. 16 to the lighting operation state 15(EM). The gate voltage VgE and the gate-source voltage VgsE of the drive transistor T4 in the lighting operation state 15(EM) is, as with the lighting operation state 15(EM) in the drive period TD, represented by Formulas (4) and (5) described above.

According to the present embodiment described above, as can be seen from Formulas (2) and (9) described above, in the pause period TP, the value of the on-bias voltage Vob to be output from the data-side drive circuit 30 is appropriately set. Thus, a threshold shift due to the hysteresis characteristic caused by a difference in the voltage stress on the drive transistor T4 in the non-light emission period can be suppressed. Thus, by appropriately setting the on-bias voltage Vob to suppress a threshold shift due to the hysteresis characteristic of the drive transistor T4, a difference between the threshold value Vth of the drive transistor T4 at the start time (time t8 in FIG. 4) of the lighting operation in the drive period TD and at the start time (time t8 in FIG. 7) of the lighting operation in the pause period TP is suppressed. Accordingly, when there is no change in the holding voltage of the holding capacitor Cst, the current I1 flowing through the organic EL element OL at the start time of the lighting operation in the pause period TP is the same as the current I1 flowing through the organic EL element OL at the start time of lighting operation in the drive period TD. As a result, as illustrated in FIG. 12, the luminance waveform La(i, j) according to the present embodiment is different from the luminance waveform La(i, j) according to the comparative example, with the rise in the pause period TP (NRF frame period Tnrf) being the same as the rise in the drive period TD (RF frame period Trf). That is, the waveform portion indicating the turn-off operation included in the luminance waveform L(i, j) is the same in the drive period TD and in the pause period TP. Thus, according to the present embodiment, flicker that occurs in examples like the comparative example with pause driving can be suppressed, and display quality can be improved.

1.7 Method of Setting On-Bias Voltage

As can be seen from the foregoing, to suppress flicker in pause driving, the on-bias voltage Vob for suppressing a threshold shift caused by the hysteresis characteristic of the drive transistor T4 must be appropriately set. Regarding the present embodiment configured as described above, the relationship between the various parameters indicating the operation conditions and the like (hereinafter collectively referred to as "operation condition parameters") and the appropriate on-bias voltage for suppressing a threshold shift caused by the hysteresis characteristic of the drive transistor T4 has been theoretically studied and computer simulations and experiment have been carried out to ascertain the following results.

Regarding the relationship between the light emission duty and an appropriate on-bias voltage Vob, the appropriate on-bias voltage Vob decreases when the light emission duty decreases. Here, light emission duty refers to the proportion of the period (light emission period) in which the light emission control signal EM(i) is the L level relative to one frame period. The magnitude of the on-bias voltage Vob depends on the magnitude of the voltage difference (absolute value) between the gate and source at the drive transistor T4.

Figure 17:
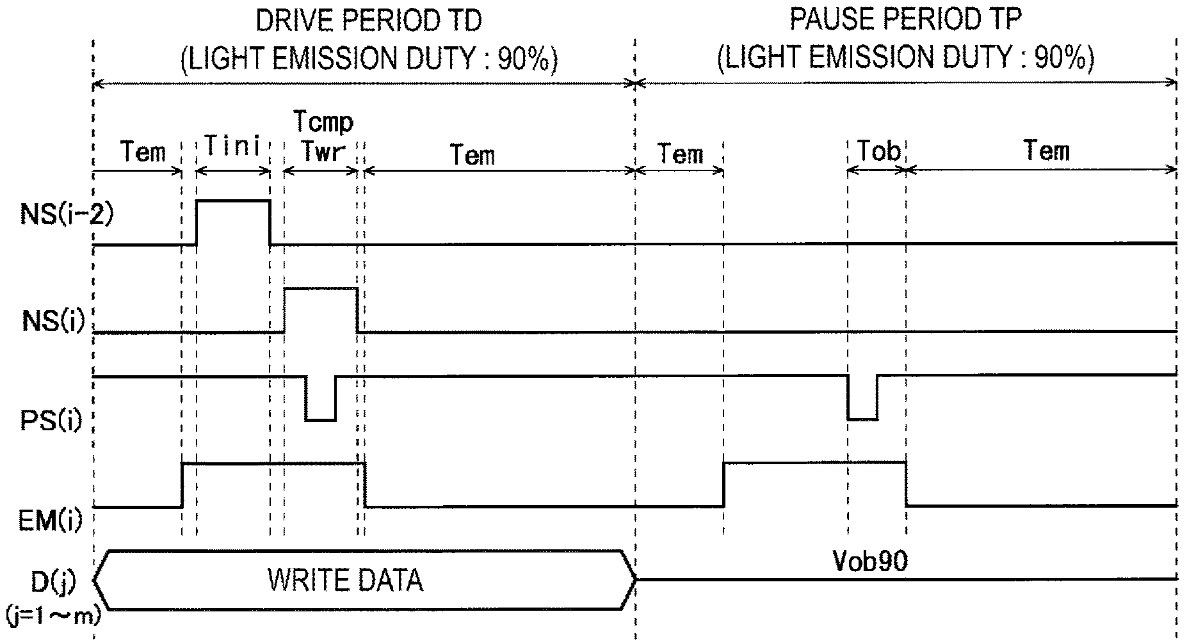
FIG. 17 is a timing chart for describing bias voltage application for controlling a threshold shift caused by the hysteresis characteristic of the drive transistor when the display device according to the first embodiment operates at a 90% light emission duty.
Figure 18:
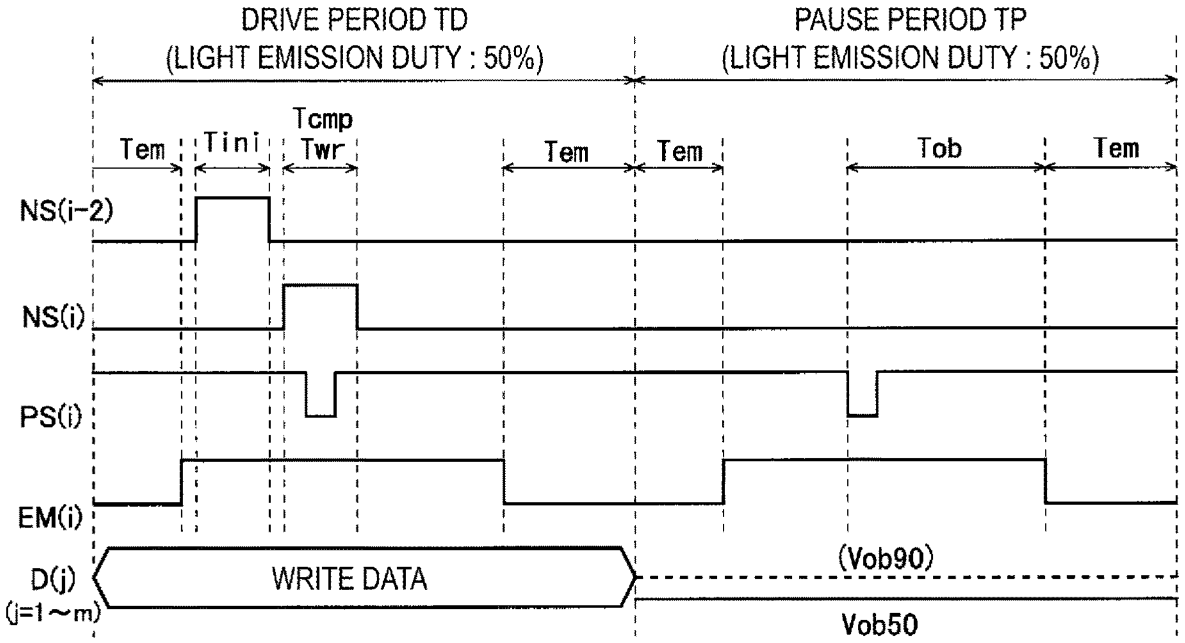
FIG. 18 is a timing chart for describing bias voltage application for controlling a threshold shift caused by the hysteresis characteristic of the drive transistor when the display device according to the first embodiment operates at a 50% light emission duty.

For example, FIG. 17 is a timing chart illustrating a driving method for the pixel circuit Pix(i, j) when the display device according to the present embodiment operates at a 90% light emission duty. In FIG. 17, the reference sign "Tem" denotes the light emission period, the reference sign "Tini" denotes the initialization period, the reference sign "Twr" denotes the data write period, the reference sign "Tcmp" denotes the period in which internal compensation is performed (this corresponds to data writing period Twr in the present embodiment), and the reference sign "Tob" denotes the on-bias period. The data signal D(j) sent to the pixel circuit Pix(i, j) via the corresponding data signal line Dj indicates, in the drive period TD, the data voltage (write data) to be written to the holding capacitor Cst of the pixel circuit Pix(i, j) and indicates, in the pause period TP, an on-bias voltage Vob90 to be applied to the source terminal of the drive transistor T4 of the pixel circuit Pix(i, j). On the other hand, FIG. 18 is a timing chart illustrating a driving method for the pixel circuit Pix(i, j) when the display device according to the present embodiment operates at a 50% light emission duty. In FIG. 18, periods corresponding to the periods illustrated in FIG. 17 are denoted by the same reference sign. As illustrated in FIG. 18, an on-bias voltage Vob50 applied to the source terminal of the drive transistor T4 as the data signal D(j) in the pause period TP when the light emission duty is 50% is less than the on-bias voltage Vob90 described above when the light emission duty is 90%.

The relationships between other operation condition parameters including display gray scale, refresh rate, environment temperature, on-bias time and an appropriate on-bias voltage Vob are as follows.

(1) The appropriate on-bias voltage Vob decreases when the display gray scale increases in brightness.

(2) The appropriate on-bias voltage Vob increases when the refresh rate decreases.

(3) The appropriate on-bias voltage Vob decreases when the environment temperature (the temperature of the periphery of the display device) increases.

(4) The appropriate on-bias voltage Vob decreases when the on-bias period Tob increases in duration.

Figure 19:
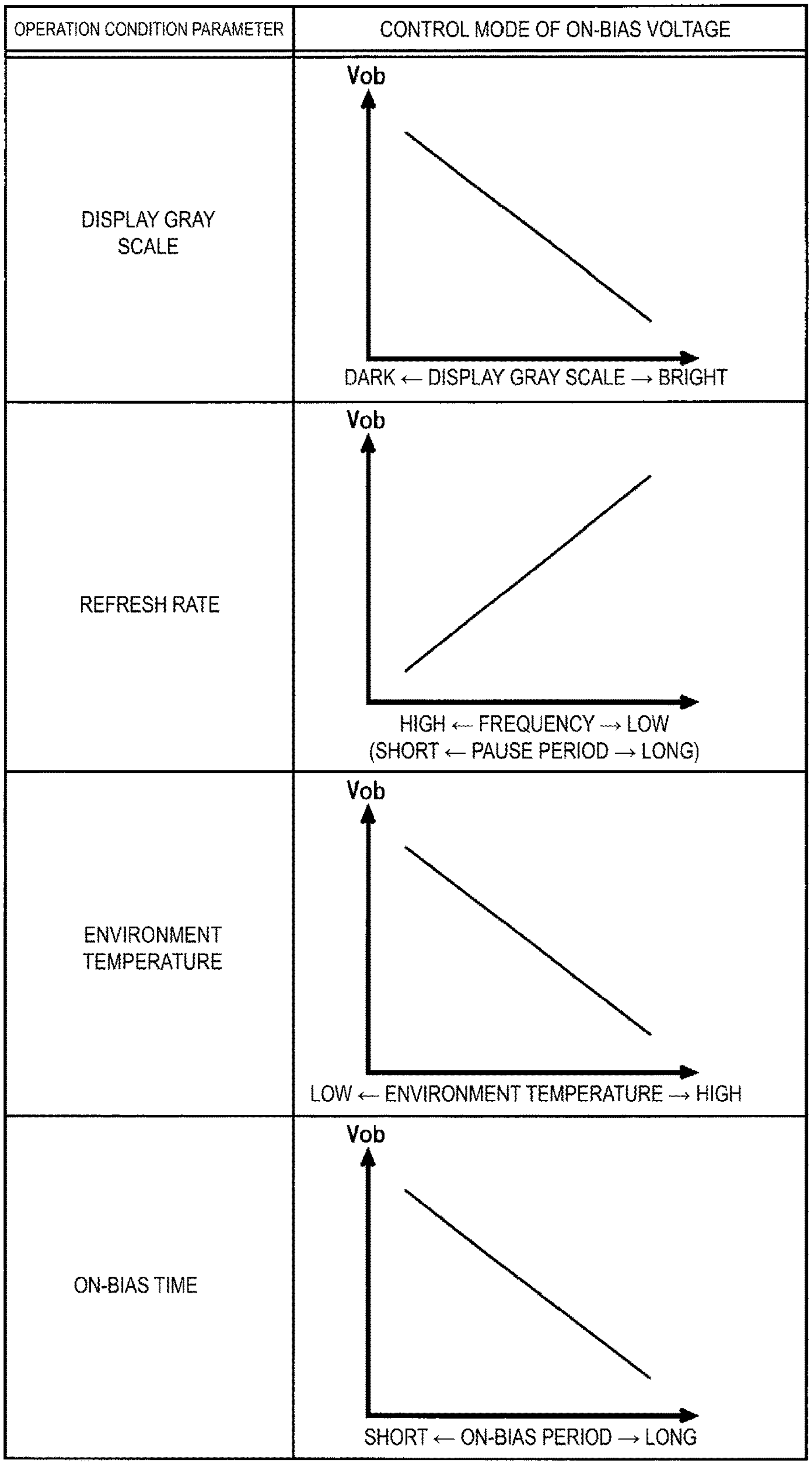
FIG. 19 is a diagram illustrating the relationship between a level of on-bias voltage to be applied to control a threshold shift caused by the hysteresis characteristic of the drive transistor in the display device according to the first embodiment and the various parameters indicating operation conditions.

As per (1) to (4) described above, the on-bias voltage should be set according to the display gray scale, the refresh rate, the environment temperature, and the length of the on-bias period Tob such that the relationship between the display device operation condition parameters including the display gray scale, the refresh rate, the environment temperature, and the on-bias time and the on-bias voltage Vob match the relationships illustrated in FIG. 19. For example, statistical processing is used to determine in advance a representative value, such as an average value, a median value, a modal value, or the like, of one or more of the operation condition parameters (including the light emission duty ratio), and according to these representative values, an appropriate on-bias voltage Vob should be determined to be a fixed value for each body or product of the display device. Alternatively, instead of this, an appropriate on-bias voltage Vob may be set as a variable based on one or more values of the operation condition parameters. In this case, for example, a configuration can be used in which the on-bias voltage Vob is updated as appropriate based on a representative value such as an average value for each predetermined period for one or more of the operation condition parameters.

Alternatively, instead of this, a configuration can be used in which the on-bias voltage Vob is changed in real time according to the value for one or more of the operation condition parameters.

1.8 Gate Driver

As described above, the scanning-side drive circuit 40 according to the present embodiment functions as a scanning signal line drive circuit and a light emission control circuit (see FIG. 1). Hereinafter, the configuration and operations of a portion (hereinafter referred to as the "gate driver") of the scanning-side drive circuit 40 that functions as a scanning signal line drive circuit will be described.

1.8.1 Configuration of Shift Register

In the present embodiment, as illustrated in FIG. 1, the display portion 11 is provided with m×n pixel circuits 15. Hereinafter, among the m×n pixel circuits 15, m pixel circuits Pix(i, 1) to Pix(i, m) arranged in the extending direction of the first and second scanning signal lines NSi and PS1 are referred to as the "pixel row" or simply as the "row" (i=1 to n). The gate driver in the present embodiment is constituted of a shift register including a plurality of stages, and the bistable circuit constituting each stage of the shift register is hereinafter referred to as the "unit circuit". A shift register 301 includes n unit circuits 3(1) to 3(*n*) in one to-one correspondence with the n pixel rows Pix(1, 1) to Pix(1, m), Pix(2, 1) to Pix(2, m) to Pix(n, 1) to Pix(n, m).

Figure 20:
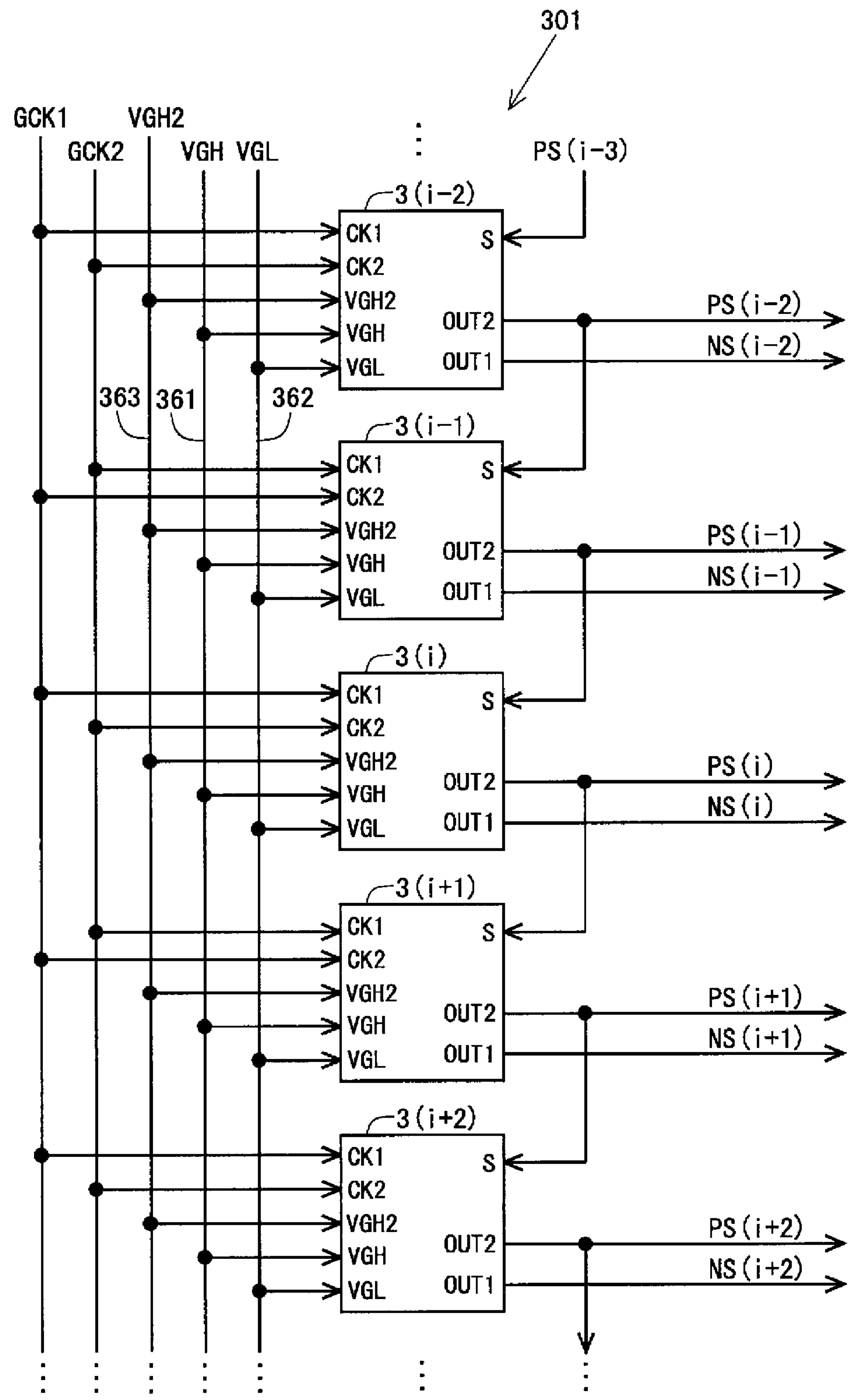
FIG. 20 is a circuit diagram for describing a schematic configuration of a shift register constituting a gate driver functioning as the scanning signal line drive circuit according to the first embodiment.

FIG. 20 is a circuit diagram for describing the schematic configuration of the shift register 301 constituting the scanning signal line drive circuit (gate driver) according to the present embodiment and illustrates the 5-stage configuration of the shift register 301. Here, it is assumed that i is an even number, and attention is focused on the unit circuits 3(*i*−2), 3(*i*−1), 3(*i*), 3(*i*+1), and 3(*i*+2) respectively provided at the (i−2)-th stage, the (i−1)-th stage, the i-th stage, the (i+1)-th stage, and the (i+2)-th stage. A gate start pulse signal, a first gate clock signal GCK1, and a second gate clock signal GCK2 are sent to the shift register 301 as signals (hereinafter also referred to as "gate control signals GCTL"), from among the scanning-side control signals Scs from the display control circuit 20, for controlling the gate driver. A gate low voltage VGL as a first constant voltage and a gate high voltage VGH as a second constant voltage are also applied to the shift register 301. Furthermore, a drive-time gate high signal VGH2, which is the H level (same level as the gate high voltage VGH) in the drive period TD and the L level (same level as the gate low voltage VGL) in the pause period TP, is also sent from the display control circuit 20 to the shift register 301. The drive-time gate high signal VGH2 functions as a mode signal indicating whether the period for operating the shift register 301 is the drive period TD or the pause period TP. The gate high voltage VGH is a voltage with a level for putting the N-type transistor in the pixel circuit 15 in the on state and the P-type transistor inside the pixel circuit 15 in the off state. The gate low voltage VGL is a voltage with a level for putting the N-type transistor in the pixel circuit 15 in the off state and the P-type transistor inside the pixel circuit 15 in the on state. The gate low voltage VGL is supplied to a first constant voltage line 362, the gate high voltage VGH is supplied to a second constant voltage line 361, and the drive-time gate high signal VGH2 is supplied to a voltage signal line 363. The gate start pulse signal is a signal provided to the unit circuit 3(1) at the first stage as a set signal S, and is omitted in FIG. 20.

Each unit circuit 3 includes input terminals for receiving the first control clock signal CK1, the second control clock signal CK2, the set signal S, the gate high voltage VGH, and the gate low voltage VGL and output terminals for outputting a first output signal OUT1 and a second output signal OUT2. The first output signal OUT1 is an N-type control signal, and the second output signal OUT2 is a P-type control signal. That is, at each unit circuit 3, an N-type control signal and a P-type control signal is generated.

The unit circuits 3 at even-numbered stages are sent the first gate clock signal GCK1 as the first control clock signal CK1 and are sent the second gate clock signal GCK2 as the second control clock signal CK2. The unit circuits 3 at odd-numbered stages are sent the second gate clock signal GCK2 as the first control clock signal CK1 and are sent the first gate clock signal GCK1 as the second control clock signal CK2. The gate high voltage VGH and the gate low voltage VGL are sent in common to all of the unit circuits 3. Also, the unit circuit 3 at each stage is sent the second output signal OUT2 from the unit circuits 3 of the preceding stages as the set signal S. The first output signal OUT1 from the unit circuit 3 at each stage is sent to the corresponding first scanning signal line NS as the first scanning signal. The second output signal OUT2 from the unit circuit 3 at each stage is sent to the following unit circuit 3 as the set signal S and sent to the corresponding second scanning signal line PS as the second scanning signal. Note that as illustrated in FIG. 3, focusing on the i-th pixel circuit Pix(i, j) (j=1 to m), the first scanning signal line NSi is connected to the gate terminal functioning as the control terminal of the threshold compensation transistor T2, the first scanning signal line NSi−2 is connected to the gate terminal functioning as the control terminal of the first initialization transistor T1, and the second scanning signal line PS1 is connected to the gate terminal functioning as the control terminal of the write control transistor T3.

The first gate clock signal GCK1 and the second gate clock signal GCK2 are periodically repeated two-phase clock signals of a first period in which the gate low voltage VGL (first level voltage) is maintained and a second period in which the gate high voltage VGH (second level voltage) is maintained. Typically, a length P1 of the first period is shorter than a length P2 of the second period. Note that the first gate clock signal GCK1 and the second gate clock signal GCK2 are output from a clock signal output circuit provided inside the display control circuit 20.

1.8.2 Unit Circuit

Figure 21:
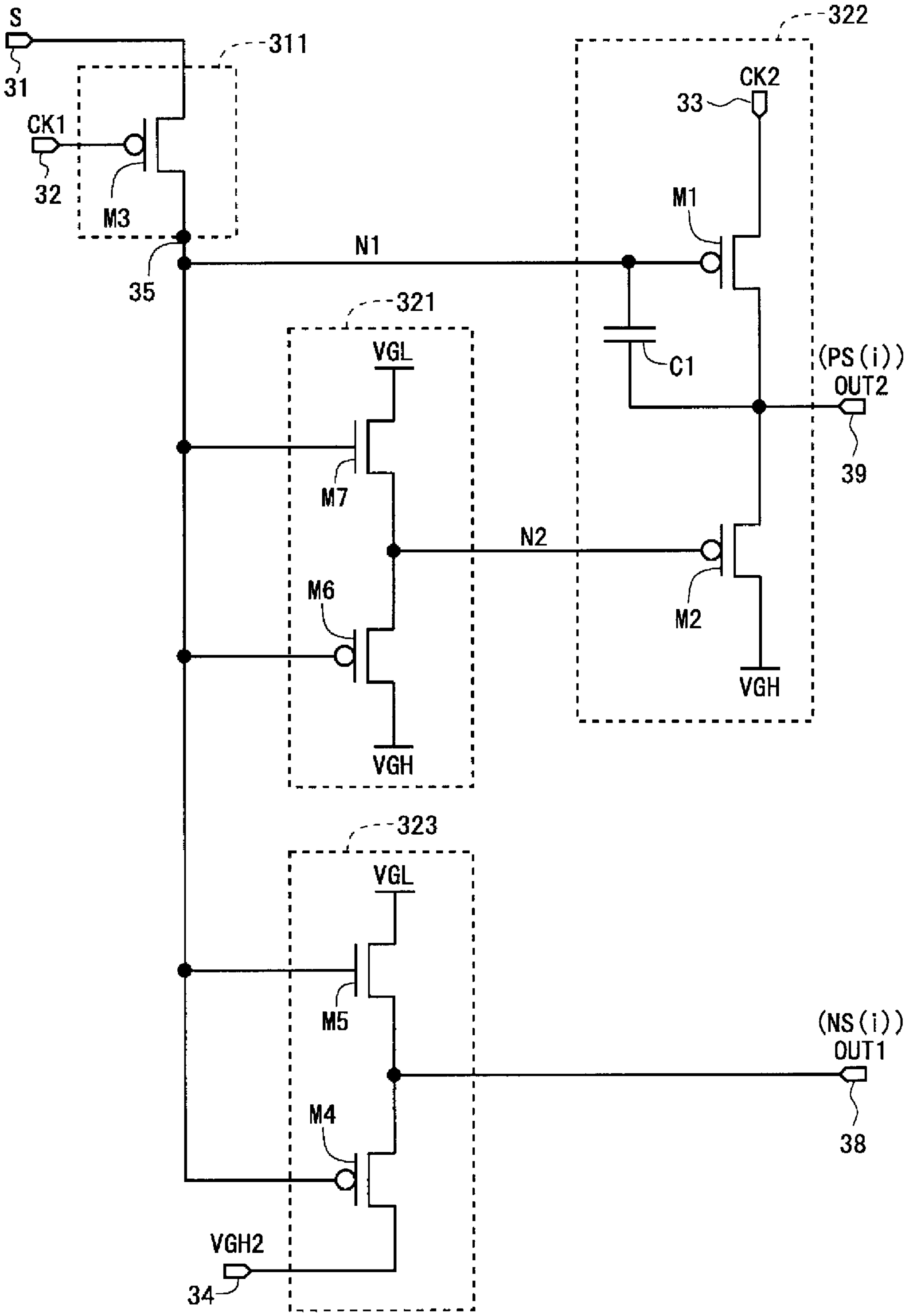
FIG. 21 is a circuit diagram illustrating a configuration of a unit circuit in the shift register constituting the gate driver according to the first embodiment.

FIG. 21 is a circuit diagram illustrating a configuration of the unit circuit 3 according to the present embodiment. As illustrated in FIG. 21, the unit circuit 3 includes seven transistors M1 to M7 and a single capacitor C1. The transistors M1 to M4 and M6 are P-type transistors, and the transistors M5 and M7 are N-type transistors. The unit circuit 3 includes four input terminals 31 to 34 and two output terminals 38 and 39 in addition to the input terminal connected to the first constant voltage line 362 for supplying the gate low voltage VGL and the input terminal connected to the second constant voltage line 361 for supplying the gate high voltage VGH. In FIG. 21, the input terminal for receiving the set signal S is denoted by the reference sign 31, the input terminal for receiving the first control clock signal CK1 is denoted by the reference sign 32, the input terminal for receiving the second control clock signal CK2 is denoted by the reference sign 33, the input terminal (input terminal for receiving the drive-time gate high signal VGH2) connected to the voltage signal line 363 for supplying the drive-time gate high signal VGH2 is denoted by the reference sign 34, the output terminal for outputting the first output signal OUT1 is denoted by the reference sign 38, and the output terminal for outputting the second output signal OUT2 is denoted by the reference sign 39. Hereinafter, the output terminal for outputting the first output signal OUT1 is referred to as the "first output terminal", and the output terminal for outputting the second output signal OUT2 is referred to as the "second output terminal".

The second conduction terminal (source terminal) of the transistor M3 and the control terminal (gate terminal) of the transistors M4 to M7 are connected to one another, and the node where each are connected is referred to as the "first internal node". The first internal node is denoted by the reference sign N1. The voltage of the first internal node N1 indicates the logical value to be transferred in the shift register 301. The control terminal (gate terminal) of the transistor M1 and one end of the capacitor C1 are connected to one another. As illustrated in FIG. 21, in the present embodiment, the first internal node N1 and the control terminal of the transistor M1 are directly connected to one another. Also, the second conduction terminal (source terminal) of the transistor M6, the first conduction terminal (drain terminal) of the transistor M7, and the control terminal (gate terminal) of the transistor M2 are connected to one another, and the node where each are connected is referred to as the "second internal node". The second internal node is denoted by the reference sign N2.

The unit circuit 3 includes a first control circuit 311 configured to control the voltage of the first internal node N1, a first output circuit 323 configured to control the output of the first output signal OUT1, a second control circuit 321 configured to control the voltage of the second internal node N2, and a second output circuit 322 configured to control the output of the second output signal OUT2. The first control circuit 311 includes the transistor M3. An output terminal 35 of the first control circuit 311 is connected to the first internal node N1. The second control circuit 321 includes the transistor M6 and the transistor M7. The first output circuit 323 includes the transistor M4 and the transistor M5. The second output circuit 322 includes the transistor M1, the transistor M2, and the capacitor C1. Note that the unit circuit 3 is configured such that a threshold voltage Vtn (>0) of the N-type transistor M5 in the first output circuit 323 is greater than the absolute value of a threshold voltage Vtp (<0) of the P-type transistor M3 in the first control circuit 311. The same applies to other embodiments described later (see FIGS. 24, 27, and 29).

Regarding the transistor M1, the control terminal (gate terminal) is connected to the first internal node N1, the first conduction terminal (drain terminal) is connected to the input terminal 33, and the second conduction terminal (source terminal) is connected to the second output terminal 39. Regarding the transistor M2, the control terminal (gate terminal) is connected to the second internal node N2, the first conduction terminal (source terminal) is connected to the second constant voltage line, and the second conduction terminal (drain terminal) is connected to the second output terminal 39. Regarding the transistor M3, the control terminal (gate terminal) is connected to the input terminal 32, the first conduction terminal (drain terminal) is connected to the input terminal 31, and the second conduction terminal (source terminal) is connected to the first internal node N1. Regarding the transistor M4, the control terminal (gate terminal) is connected to the first internal node N1, the first conduction terminal (source terminal) is connected to the input terminal 34, that is the input terminal for receiving the drive-time gate high signal VGH2, and the second conduction terminal (drain terminal) is connected to the first output terminal 38. Regarding the transistor M5, the control terminal (gate terminal) is connected to the first internal node N1, the first conduction terminal (drain terminal) is connected to the first output terminal 38, and the second conduction terminal (source terminal) is connected to the first constant voltage line. Regarding the transistor M6, the control terminal (gate terminal) is connected to the first internal node N1, the first conduction terminal (source terminal) is connected to the second constant voltage line, and the second conduction terminal (drain terminal) is connected to the second internal node N2. Regarding the transistor M7, the control terminal (gate terminal) is connected to the first internal node N1, the first conduction terminal (drain terminal) is connected to the second internal node N2, and the second conduction terminal (source terminal) is connected to the first constant voltage line. One end of the capacitor C1 is connected to the control terminal (gate terminal) of the transistor M1 and the other end is connected to the second output terminal 39.

1.8.3 Operation of Shift Register

Figure 22:
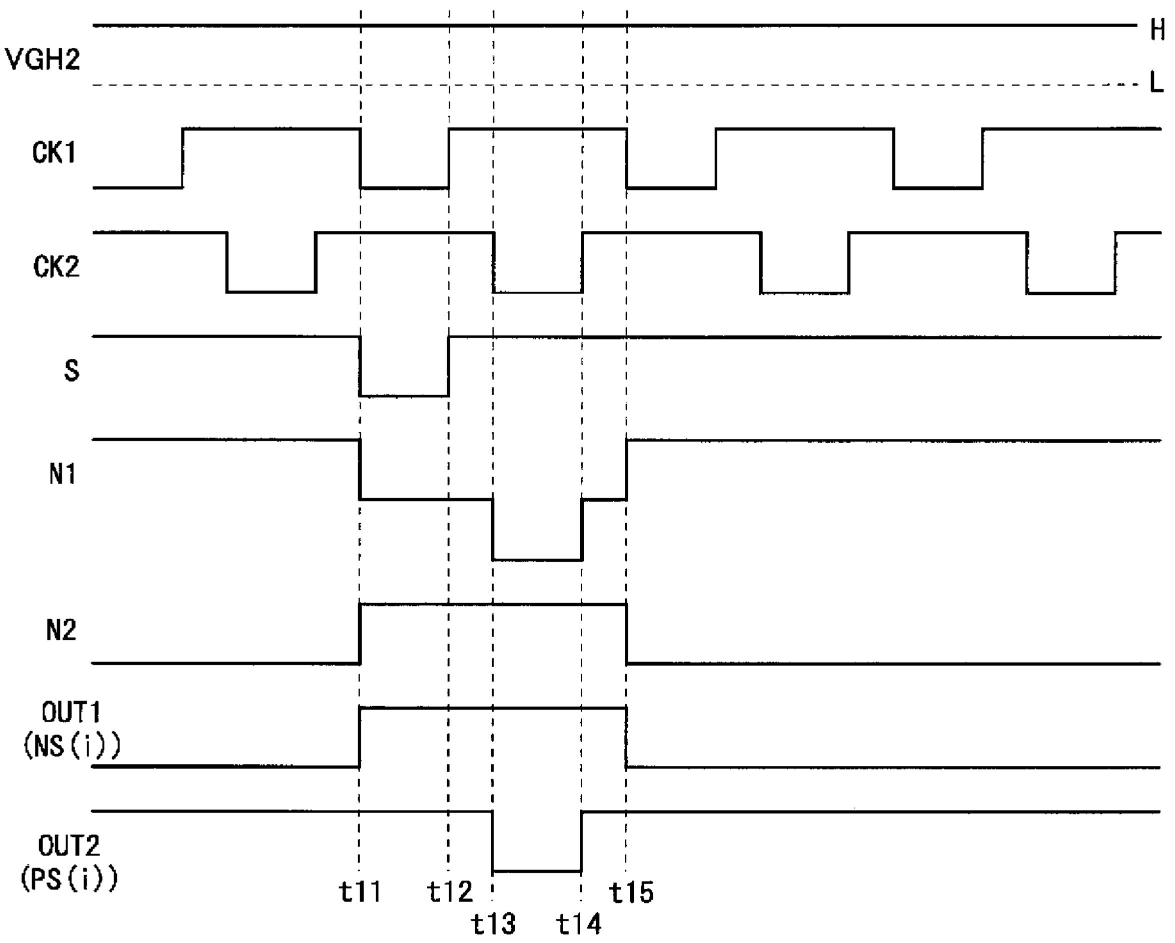
FIG. 22 is a signal waveform diagram for describing operations in the drive period (refresh frame period) of the unit circuit according to the first embodiment.
Figure 23:
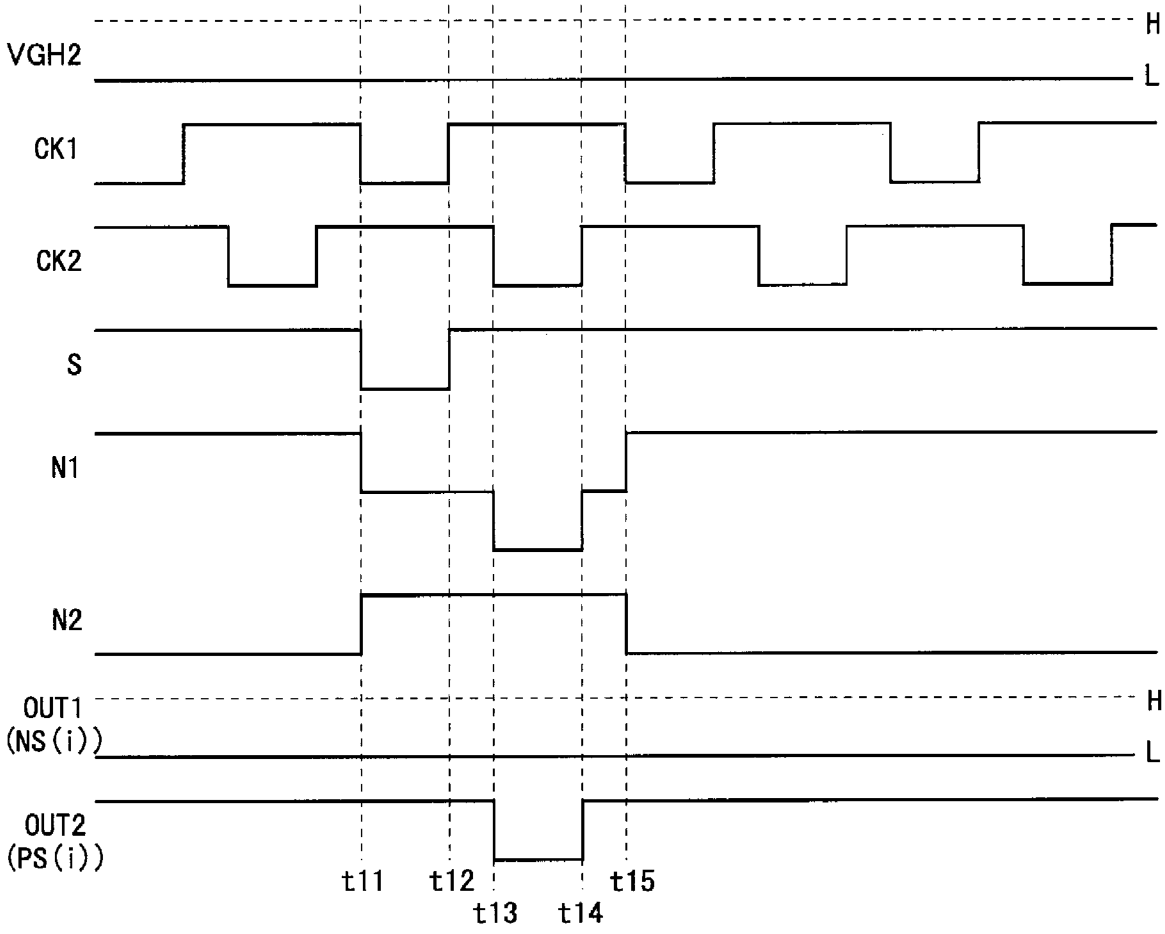
FIG. 23 is a signal waveform diagram for describing operations in the pause period (non-refresh frame period) of the unit circuit according to the first embodiment.

The operations of the shift register 301 configured as described above will be described below with reference to FIGS. 22 and 23 and the above-described 11. FIG. 22 is a signal waveform diagram for describing the operations in the drive period TD (RF frame period Trf) of the unit circuit 3 in the shift register 301. FIG. 23 is a signal waveform diagram for describing the operations in the pause period TP (NRF frame period Tnrf) of the unit circuit 3 in the shift register 301.

First, the operations of the unit circuit 3 in the drive period TD (RF frame period) will be described with reference to FIG. 22. For a period before time t11, the voltage of the first internal node N1 is maintained at the H level, the voltage of the second internal node N2 is maintained at the L level, the first output signal OUT1 is maintained at the L level, and the second output signal OUT2 is maintained at the H level. Note that since the second internal node N2 is maintained at the L level, the transistor M2 is kept in the on state.

At time t11, the first control clock signal CK1 changes from the H level to the L level, putting the transistor M3 in the on state. Also, at time t11, the set signal S changes from the H level to the L level. Accordingly, the voltage of the first internal node N1 decreases to the L level, the transistor M1 and the transistor M6 are turned to the on state, and the transistor M5 and transistor M7 are turned to the off state. As a result, the voltage of the second internal node N2 changes from the L level to the H level. Also, since the drive-time gate high signal VGH2 in the drive period TD is maintained at the H level, the transistor M4 is turned to the on state. This causes the first output signal OUT1 to change from the L level to the H level. Note that the L level voltage of the first internal node N1 is, more precisely, set to higher level than the gate low voltage VGL functioning as the first constant voltage by an amount equal to the absolute value of the threshold voltage Vtp of the transistor T3. However, as described above, the threshold voltage Vtn (>0) of the N-type transistor M5 in the first output circuit 323 is greater than the absolute value of the threshold voltage Vtp (<0) of the P-type transistor M3 in the first control circuit 311. Thus, the transistor M5 is reliably turned the off state even in the case of a L level voltage of the first internal node N1. The same applies to other embodiments described later (see FIGS. 24, 27, and 29).

At time t12, the first control clock signal CK1 changes from the L level to the H level. This turns the transistor M3 to the off state. Also, at time t12, the set signal S changes from the L level to the H level.

At time t13, the second control clock signal CK2 changes from the H level to the L level. At this time, since the transistor M1 is in the on state, the voltage of the input terminal 33 decreases and the voltage (voltage of the second output signal OUT2) of the second output terminal 39 decreases. Here, since the capacitor C1 is provided between the second internal node N2 and the second output terminal 39, the voltage of the second output terminal 39 decreases and the voltage of the first internal node N1 decreases (the first internal node N1 is put in a boost state). As a result, a high negative voltage is applied to the control terminal of the transistor M1. Via such a bootstrap operation, the voltage of the second output signal OUT2 decreases to a level sufficient to cause the write control transistor T3, which is the connection destination of the second output terminal 39, to be turned to the on state.

At time t14, the second control clock signal CK2 changes from the L level to the H level. Accordingly, the voltage of the input terminal 33 increases and the voltage (voltage of the second output signal OUT2) of the second output terminal 39 increases. When the voltage of the second output terminal 39 increases, the voltage of the first internal node N1 also increases via the capacitor C1.

At time t15, the first control clock signal CK1 changes from the H level to the L level. This turns the transistor M3 to the on state. At this time, the set signal S is maintained at the H level. Accordingly, the voltage of the first internal node N1 increases to the H level, the transistor M1, the transistor M4, and the transistor M6 are turned to the off state, and the transistor M5 and transistor M7 are turned to the on state. This causes the first output signal OUT1 to change from the H level to the L level and the voltage of the second internal node N2 to also change from the H level to the L level. By the voltage of the second internal node N2 changing to the L level, the transistor M2 is turned to the on state.

As for a period before time t11, for a period after time t15, the voltage of the first internal node N1 is maintained at the H level, the voltage of the second internal node N2 is maintained at the L level, the first output signal OUT1 is maintained at the L level, and the second output signal OUT2 is maintained at the H level.

Next, the operations of the unit circuit 3 in the pause period TP (NRF frame period) will be described with reference to FIG. 23. For a period before time t11, the voltage of the first internal node N1 is maintained at the H level, the voltage of the second internal node N2 is maintained at the L level, the first output signal OUT1 is maintained at the L level, and the second output signal OUT2 is maintained at the H level. Note that since the second internal node N2 is maintained at the L level, the transistor M2 is kept in the on state.

At time t11, the first control clock signal CK1 changes from the H level to the L level, putting the transistor M3 in the on state. Also, at time t11, the set signal S changes from the H level to the L level. Accordingly, as in the drive period TD, the voltage of the first internal node N1 decreases to the L level, the transistor M1 and the transistor M6 are turned to the on state, and the transistor M7 is turned to the off state. At this time, in the output circuit 1, the transistor M5 is turned to the off state, and in the pause period TP, the drive-time gate high signal VGH2 is the L level. Thus, irrespective of the state of the transistor M4, the first output signal OUT1 is maintained at the L level.

At time t12, the first control clock signal CK1 changes from the L level to the H level. This turns the transistor M3 to the off state. Also, at time t12, the set signal S changes from the L level to the H level.

At time t13, the second control clock signal CK2 changes from the H level to the L level. At this time, since the transistor M1 is in the on state, the voltage of the input terminal 33 decreases and the voltage (voltage of the second output signal OUT2) of the second output terminal 39 decreases. Since the capacitor C1 is provided between the second internal node N2 and the second output terminal 39, at this time in the second output circuit 322, a bootstrap operation is performed as in the drive period TD. In other words, the voltage of the second output terminal 39 decreases and the voltage of the first internal node N1 also decreases. As a result, a large negative voltage is applied to the control terminal of the transistor M1, and the voltage of the second output signal OUT2 decreases to a level sufficient to cause the write control transistor T3, which is the connection destination of the second output terminal 39, to be in an on state. At this time, in the output circuit 1, the transistor M4 is turned to the on state and the transistor M5 is in the off state, and in the pause period TP, the drive-time gate high signal VGH2 is the L level. Thus, the first output signal OUT1 is maintained at the L level.

At time t14, the second control clock signal CK2 changes from the L level to the H level. Accordingly, the voltage of the input terminal 33 increases and the voltage (voltage of the second output signal OUT2) of the second output terminal 39 increases. When the voltage of the second output terminal 39 increases, the voltage of the first internal node N1 also increases via the capacitor C1.

At time t15, the first control clock signal CK1 changes from the H level to the L level. This turns the transistor M3 to the on state. At this time, the set signal S is maintained at the H level. Accordingly, the voltage of the first internal node N1 increases to the H level, the transistor M1, the transistor M4, and the transistor M6 are turned to the off state, and the transistor M5 and transistor M7 are turned to the on state. Thus, as for the drive period TD, the voltage of the second internal node N2 also changes from the H level to the L level and the transistor M2 is turned to the on state. In addition, since the transistor M4 is turned to the off state and the transistor M5 is turned to the on state, the first output signal OUT1 is maintained at the L level.

As for a period before time t11, for a period after time t15, the voltage of the first internal node N1 is maintained at the H level, the voltage of the second internal node N2 is maintained at the L level, the first output signal OUT1 is maintained at the L level, and the second output signal OUT2 is maintained at the H level.

As described above, in the pause period TP, the first control circuit 311, the second control circuit 321, and the second output circuit 322 operate as in the drive period TD (see FIG. 23). As a result, the second output signal OUT2 that changes as in the drive period TD is applied to the corresponding second scanning signal line PS1 as the second scanning signal PS(i). However, since the drive-time gate high signal VGH2 is the L level in the pause period TP, the first output signal OUT1 generated at the first output circuit 323 is maintained at the L level during the pause period TP (see FIG. 23).

In the shift register 301 constituting the gate driver (scanning signal line drive circuit) according to the present embodiment, the unit circuits 3 that operate as described above in the drive period TD and the pause period TP are connected in cascade as illustrated in FIG. 20, and the gate start pulse signal included in the scanning-side control signal Scs is input in the first stage. In this manner, the first scanning signals NS(−1) to NS(n) and the second scanning signals PS(1) to PS(n) as illustrated in FIG. 11 functioning as a drive signal for sequentially selecting the first scanning signal lines NS−1 to NSn and a drive signal for sequentially selecting the second scanning signal lines PS1 to PSn are generated and the first scanning signals NS(−1) to NS(n) are applied to the first scanning signal lines NS−1 to NSn and the second scanning signals PS(1) to PS(n) are applied to the second scanning signal lines PS1 to PSn.

1.9 Effect

According to the present embodiment as described above, when the display device using the pixel circuits 15(Pix(i, j)) of the internal compensation method as illustrated in FIG. 3 performs pause driving, as illustrated in FIG. 11, the first scanning signal lines NSi and NSi−2 for controlling the threshold compensation transistor T2 and the first initialization transistor T1 are stopped from driving in the pause period TP, and the second scanning signal line PS1 for controlling the write control transistor T3 are driven in the pause period TP (NRF frame period Tnrf) as in the drive period TD (RF frame period Trf). Also, the light emission control lines EM1 to EMn for controlling the first and second light emission control transistors T5 and T6 and the second initialization transistor T7 for initializing the anode electrode of the organic EL element OL are also driven in the pause period TP as in the drive period TD. As described above, according to the present embodiment, in the pause period TP, the on-bias voltage Vob for controlling the threshold shift caused by the hysteresis characteristic of the drive transistor T4 is applied as the data signals D(1) to D(m) to the data signal lines D1 to Dm (see FIG. 11).

Accordingly, in each pixel circuit Pix(i, j), in each non-light emission period within the pause period TP, the on-bias voltage Vob is applied to the source terminal of the drive transistor T4 via the corresponding data signal line Dj and the write control transistor T3 (see pixel circuit 15(OB) illustrated in FIG. 16).

According to the pause driving of the present embodiment described above, a turn-off operation is performed not only in the RF frame period Trf of the drive period TD but a similar (the same period and the same duty ratio) turn-off operation is also performed in each NRF frame period Tnrf of the pause period TP (see FIGS. 11 and 12). In addition, as described above, in the luminance waveform L(i, j) of each pixel circuit Pix(i, j), the waveform (turn-off waveform) indicating the turn-off operation in the drive period TD (RF frame period Trf) and the waveform (turn-off waveform) indicating the turn-off operation in the pause period TP (NRF frame period Tnrf) are set to the same shape by setting an appropriate on-bias voltage Vob. Thus, by reliably suppressing flicker in the pause driving, good display quality with low power consumption can be achieved.

Also, according to the present embodiment, by using the configuration of the unit circuit 3 constituting the stages of the shift register 301 in the scanning-side drive circuit 40 as illustrated in FIG. 21, circuits for driving the first and second scanning signal lines so that the on-bias voltage Vob is applied in the pause driving as described above can be achieved while suppressing an increase in the amount of circuits. This is effective in achieving frame narrowing of the display device. Furthermore, according to the unit circuit 3 with such a configuration, the first output signal OUT1 to be applied to the first scanning signal line NSi as the first scanning signal NS(i) to control the N-type transistor and the second output signal OUT2 to be applied to the second scanning signal line PS1 as the second scanning signal PS(i) to control the P-type transistor can be output at full swing with respect to the power supply voltage (VGH and VGL).

Also, in the present embodiment, in the pixel circuit 15, LTPS-TFTs are used in the drive transistor T4, the first and second light emission control transistors T5 and T6, and the write control transistor T3, and an oxide TFT such as IGZO-TFT is used in the threshold compensation transistor T2, the first initialization transistor T1, and the second initialization transistor T7 (see FIG. 3). Accordingly, the pixel circuit 15 is configured to have both the advantage of the high mobility of the LTPS-TFT and the good off-leakage characteristic of the oxide TFT. Thus, the configuration of the pixel circuit 15 according to the present embodiment is effective in realizing a high-performance display device with low power consumption.

2. Second Embodiment

Figure 24:
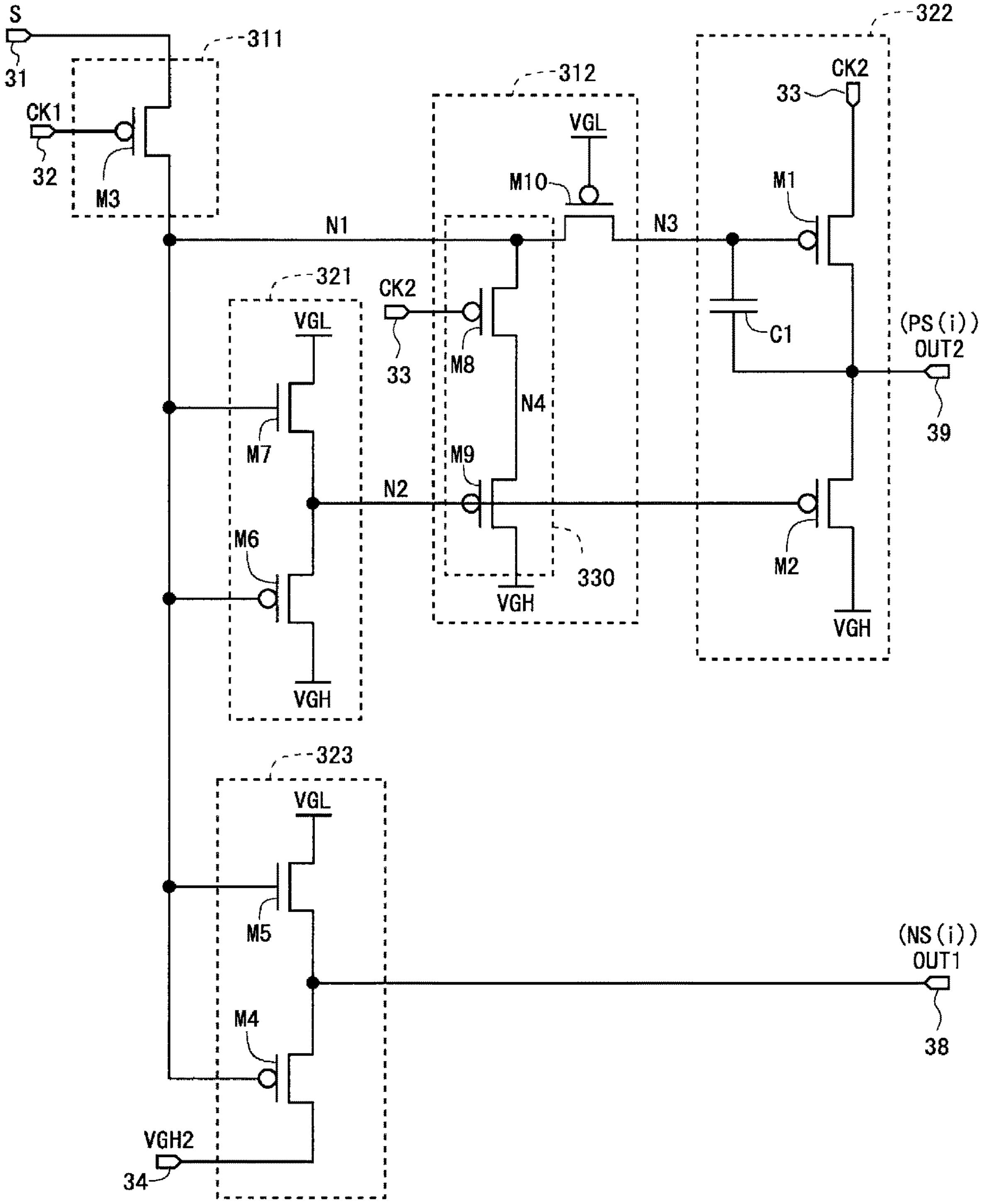
FIG. 24 is a circuit diagram illustrating the configuration of a unit circuit in a shift register constituting a gate driver functioning as a scanning signal line drive circuit in a display device according to a second embodiment.
Figure 25:
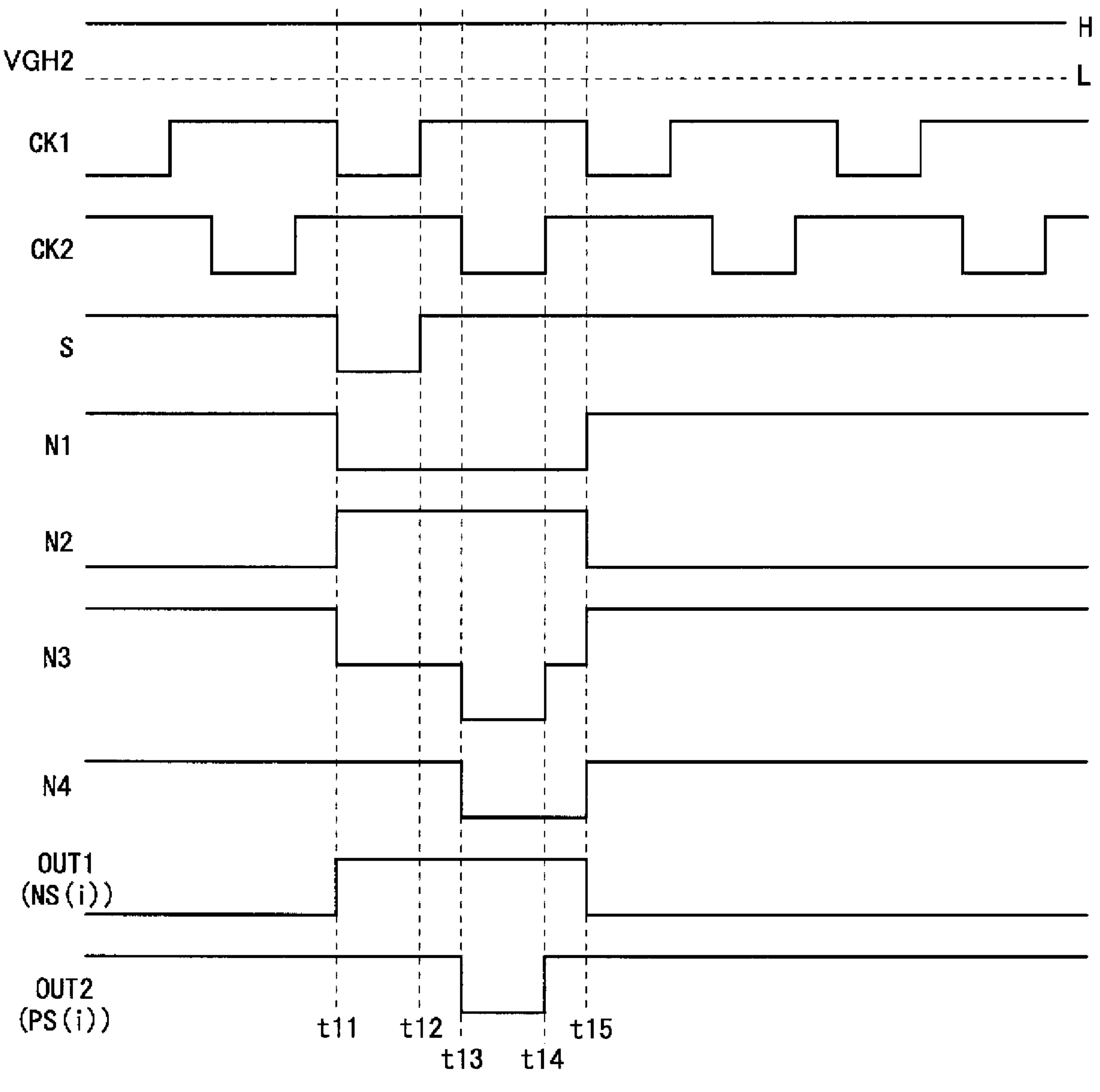
FIG. 25 is a signal waveform diagram for describing operations in the drive period (refresh frame period) of the unit circuit according to the second embodiment.
Figure 26:
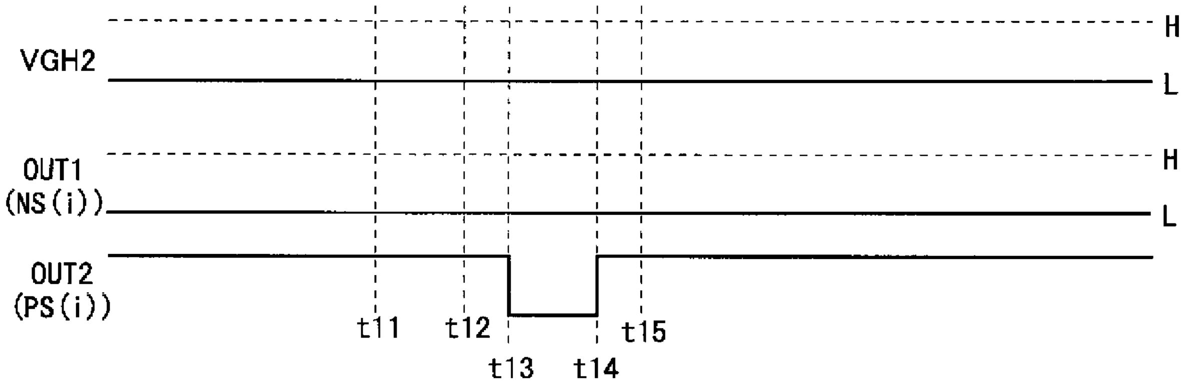
FIG. 26 is a signal waveform diagram for describing operations in the pause period (non-refresh frame period) of the unit circuit according to the second embodiment.

Next, an organic EL display device according to the second embodiment will be described with reference to FIGS. 24 to 26. FIG. 24 is a circuit diagram illustrating the configuration of a unit circuit in a shift register constituting a gate driver functioning as a scanning signal line drive circuit according to the present embodiment. FIG. 25 is a signal waveform diagram for describing the operations in a drive period of the unit circuit in the shift register. FIG. 26 is a signal waveform diagram for describing the operations in a pause period of the unit circuit in the shift register.

As in the first embodiment, the display device according to the present embodiment is an organic EL display device configured to perform internal compensation and has two operation modes, the normal driving mode and the pause driving mode. In the present embodiment, the configuration of the unit circuit in the shift register constituting the gate driver functioning as a scanning signal line drive circuit is different from that in the first embodiment described above. However, other configurations are the same as those in the first embodiment (FIGS. 1, 3, and 20), and the driving method of the display device is also the same as in the first embodiment described above (FIG. 11). Configurations of the display device according to the present embodiment that are the same as configurations of the first embodiment or including corresponding portions are assigned the same reference sign and detailed descriptions of those components are omitted. The present embodiment will be described below with a focus on the configuration and operations of the unit circuit in the shift register 301.

2.1 Shift Register

The schematic configuration of the shift register 301 constituting a scanning signal line drive circuit (gate driver) according to the present embodiment is similar to that of the first embodiment described above and as illustrated in FIG. 20. However, the configuration of the unit circuit 3 in the shift register 301 is different from that in the first embodiment described above (see FIG. 21).

2.2 Configuration of Unit Circuit

As illustrated in FIG. 24, the unit circuit 3 according to the present embodiment includes the first control circuit 311, the second control circuit 321, the first output circuit 323, and the second output circuit 322 with a similar configuration to those in the first embodiment described above. The unit circuit 3 also includes a third control circuit 312 configured to control the voltage of the first internal node N1. The third control circuit 312 includes a stabilization circuit 330 and a transistor M10. The stabilization circuit 330 includes a transistor M8 and a transistor M9. The transistors M8 to M10 are P-type transistors. Note that the output circuit control transistor is implemented via the transistor M10.

As illustrated in FIG. 24, the first conduction terminal (drain terminal) of the transistor M10 and the control terminal (gate terminal) of the transistor M1 are connected to one another. The node where they are connected to one another is referred to as the "third internal node". The third internal node is denoted by the reference sign N3. Also, the first conduction terminal (source terminal) of the transistor M8 and the second conduction terminal (drain terminal) of the transistor M9 are connected to one another. The node where they are connected to one another is referred to as the "fourth internal node". The fourth internal node is denoted by the reference sign N4.

Regarding the transistor M8, the control terminal (gate terminal) is connected to the input terminal 33, the first conduction terminal (source terminal) is connected to the fourth internal node N4, and the second conduction terminal (drain terminal) is connected to the first internal node N1. Regarding the transistor M9, the control terminal (gate terminal) is connected to the second internal node N2, the first conduction terminal (source terminal) is connected to the second constant voltage line, and the second conduction terminal (drain terminal) is connected to the fourth internal node N4. Accordingly, the transistor M8 and the transistor M9 are connected in series between the first internal node N1 and the second constant voltage line. Regarding the transistor M10, the control terminal (gate terminal) is connected to the first constant voltage line, the first conduction terminal (drain terminal) is connected to the third internal node N3, and the second conduction terminal (source terminal) is connected to the first internal node N1.

2.3 Operations of Unit Circuit

First, the operations of the unit circuit 3 in the drive period TD (RF frame period Trf) will be described with reference to FIG. 25. For a period before time t11, the voltage of the first internal node N1 and the third internal node N3 is maintained at the H level, the voltage of the second internal node N2 is maintained at the L level, the first output signal OUT1 is maintained at the L level, and the second output signal OUT2 is maintained at the H level. Note that since the second internal node N2 is maintained at the L level, the transistors M2 and M9 are kept in the on state.

At time t11, the first control clock signal CK1 changes from the H level to the L level, putting the transistor M3 in the on state. Also, at time t11, the set signal S changes from the H level to the L level. Accordingly, the voltage of the first internal node N1 decreases to the L level, the transistor M6 is turned to the on state, and the transistor M5 and transistor M7 are turned to the off state. As a result, the voltage of the second internal node N2 changes from the L level to the H level. Also, since the drive-time gate high signal VGH2 in the drive period TD is the H level, the transistor M4 is turned to the on state. This causes the first output signal OUT1 to change from the L level to the H level. Since the transistor M10 is maintained in the on state even when the voltage of the first internal node N1 decreases to the L level, the voltage of the third internal node N3 also decreases to the L level. This turns the transistor M1 to the on state.

At time t12, the first control clock signal CK1 changes from the L level to the H level. This turns the transistor M3 to the off state. Also, at time t12, the set signal S changes from the L level to the H level.

At time t13, the second control clock signal CK2 changes from the H level to the L level. At this time, since the transistor M1 is in the on state, the voltage of the input terminal 33 decreases and the voltage (voltage of the second output signal OUT2) of the second output terminal 39 decreases. Here, since the capacitor C1 is provided between the third internal node N3 and the second output terminal 39, the voltage of the second output terminal 39 decreases and the voltage of the third internal node N3 decreases (the third internal node N3 is put in a boost state). As a result, a high negative voltage is applied to the control terminal of the transistor M1. Via such a bootstrap operation, the voltage of the second output signal OUT2 decreases to a level sufficient to cause the write control transistor T3, which is the connection destination of the second output terminal 39, to be turned to the on state. When the voltage of the third internal node N3 decreases at time t13, the voltage of the first conduction terminal (drain terminal) at the transistor M10 becomes less than the voltage of the control terminal (gate terminal). This turns the transistor M10 to the off state. Thus, the voltage of the first internal node N1 does not change at time t13.

At time t14, the second control clock signal CK2 changes from the L level to the H level. Accordingly, the voltage of the input terminal 33 increases and the voltage (voltage of the second output signal OUT2) of the second output terminal 39 increases. When the voltage of the second output terminal 39 increases, the voltage of the third internal node N3 also increases via the capacitor C1. This turns the transistor M10 to the on state.

At time t15, the first control clock signal CK1 changes from the H level to the L level. This turns the transistor M3 to the on state. At this time, the set signal S is maintained at the H level. Accordingly, the voltage of the first internal node N1 increases to the H level, the transistor M4 and the transistor M6 are turned to the off state, and the transistor M5 and transistor M7 are turned to the on state. This causes the first output signal OUT1 to change from the H level to the L level. Also, the voltage of the second internal node N2 also changes from the H level to the L level. This turns the transistors M2 and M9 to the on state. Since the transistor M10 is maintained in the on state, the voltage of the third internal node N3 also increases to the H level at time t15. This turns the transistor M1 to the off state.

As for a period before time t11, for a period after time t15, the voltage of the first internal node N1 and the voltage of the third internal node N3 is maintained at the H level, the voltage of the second internal node N2 is maintained at the L level, the first output signal OUT1 is maintained at the L level, and the second output signal OUT2 is maintained at the H level.

When the unit circuit 3 operates as described above, the pixel circuit 15 operates as in the first embodiment. That is, the N-type transistor and the P-type transistor in the pixel circuit 15 are reliably turned on and off.

The transistors in the unit circuit 3 have a parasitic capacitance. Thus, in the period before time t11 and in the period after time t15, a variation in the voltage of the first internal node N1 and the third internal node N3 may occur due to a clock operation of the second control clock signal CK2 and the presence of the parasitic capacitance of the transistor M1. Thus, a variation in the voltage of the first output signal OUT1 and the second output signal OUT2 may occur. However, in a period before time t11 and a period after time t15, the transistor M9 is maintained in the on state and the transistor M8 turns to the on state each time the second control clock signal CK2 turns to the L level. When both the transistor M8 and the transistor M9 are in the on state, the first internal node N1 is connected to the second constant voltage line for supplying the gate high voltage VGH. Thus, in the period before time t11 and in the period after time t15, the voltage of the first internal node N1 and the third internal node N3 is reliably maintained at the H level even when noise is caused by the clock operation of the second control clock signal CK2.

Note that since the second control clock signal CK2 is the H level in the period from time t11 to time t13, the transistor M8 is maintained in the off state. Accordingly, maintaining the voltage of the fourth internal node N4 at the H level does not affect the voltage of the first internal node N1 and the third internal node N3. Also, since the transistor M9 is in the off state at time t13, the voltage of the fourth internal node N4 changes from the H level to the L level due to the second control clock signal CK2 changing from the H level to the L level. Thereafter, when the transistor M9 turns to the on state at time t15 as described above, the voltage of the fourth internal node N4 changes from the L level to the H level.

Next, the operations of the unit circuit 3 in the pause period TP (NRF frame period) will be described with reference to FIG. 26. For a period before time t11, the voltage of the first internal node N1 and the third internal node N3 is maintained at the H level, the voltage of the second internal node N2 is maintained at the L level, the first output signal OUT1 is maintained at the L level, and the second output signal OUT2 is maintained at the H level. Note that since the second internal node N2 is maintained at the L level, the transistor M2 is kept in the on state.

The drive-time gate high signal VGH2 is the L level in the pause period TP while in the H level in the drive period TD (see FIG. 11). However, of the signals input to the unit circuit 3 and the voltage supplied to the unit circuit 3, the signals and voltage other than the drive-time gate high signal VGH2 change in a similar manner in the drive period TD as in the pause period TP or are maintained at the same level. Thus, in the unit circuit 3, the portions other than the first output circuit 323 where the drive-time gate high signal VGH2 is input, that is the first control circuit 311, the second control circuit 321, the third control circuit 312, and the second output circuit 322 operate in a similar manner in the drive period TD as in the pause period TP. As a result, the second output signal OUT2 generated as the second scanning signal PS(i) is the same as the second output signal OUT2 generated in the drive period TD as in the pause period TP (see FIGS. 25 and 26). On the other hand, in the pause period TP, the drive-time gate high signal VGH2 input to the first output circuit 323 is maintained at the L level. Thus, irrespective of the voltage of the first internal node N1 connected to the control terminal of the transistors M4 and M5, the voltage of the connection point between the transistor M4 and the transistor M5 is maintained at the L level. Accordingly, the first output signal OUT1 generated as the first scanning signal NS(i) is maintained at the L level in the pause period TP as illustrated in FIG. 26.

2.4 Effects

According to the present embodiment, since the transistor M10 is provided in the unit circuit 3 as illustrated in FIG. 24, the voltage of the first internal node N1 is maintained when the voltage of the third internal node N3 is decreased by the bootstrap operation. Thus, compared to a configuration without the transistor M10, the amplitude of the voltage of the first internal node N1 is smaller. Accordingly, the voltage stress applied to the control terminal of the transistors M4, M5, M6, and M7 and the voltage stress applied to the second conduction terminal of the transistors M3 and M8 is reduced. As a result, reliability is improved. In addition, since the stabilization circuit 330 is provided in the unit circuit 3, during the period in which the first output signal OUT1 is to be maintained in the L level, even if noise is caused by the clock operation of the second control clock signal CK2, the voltage of the first internal node N1 and the third internal node N3 is reliably maintained at the H level. As a result, occurrence of failure such as display failure and the like caused by the clock operation of the second control clock signal CK2 is prevented. Note that compared to the unit circuit 3 according to the first embodiment described above, the unit circuit 3 according to the present embodiment further includes the third control circuit 312 but can generate both the first scanning signal NS(i) and the second scanning signal PS(i) with relatively fewer elements.

3. Third Embodiment

Figure 27:
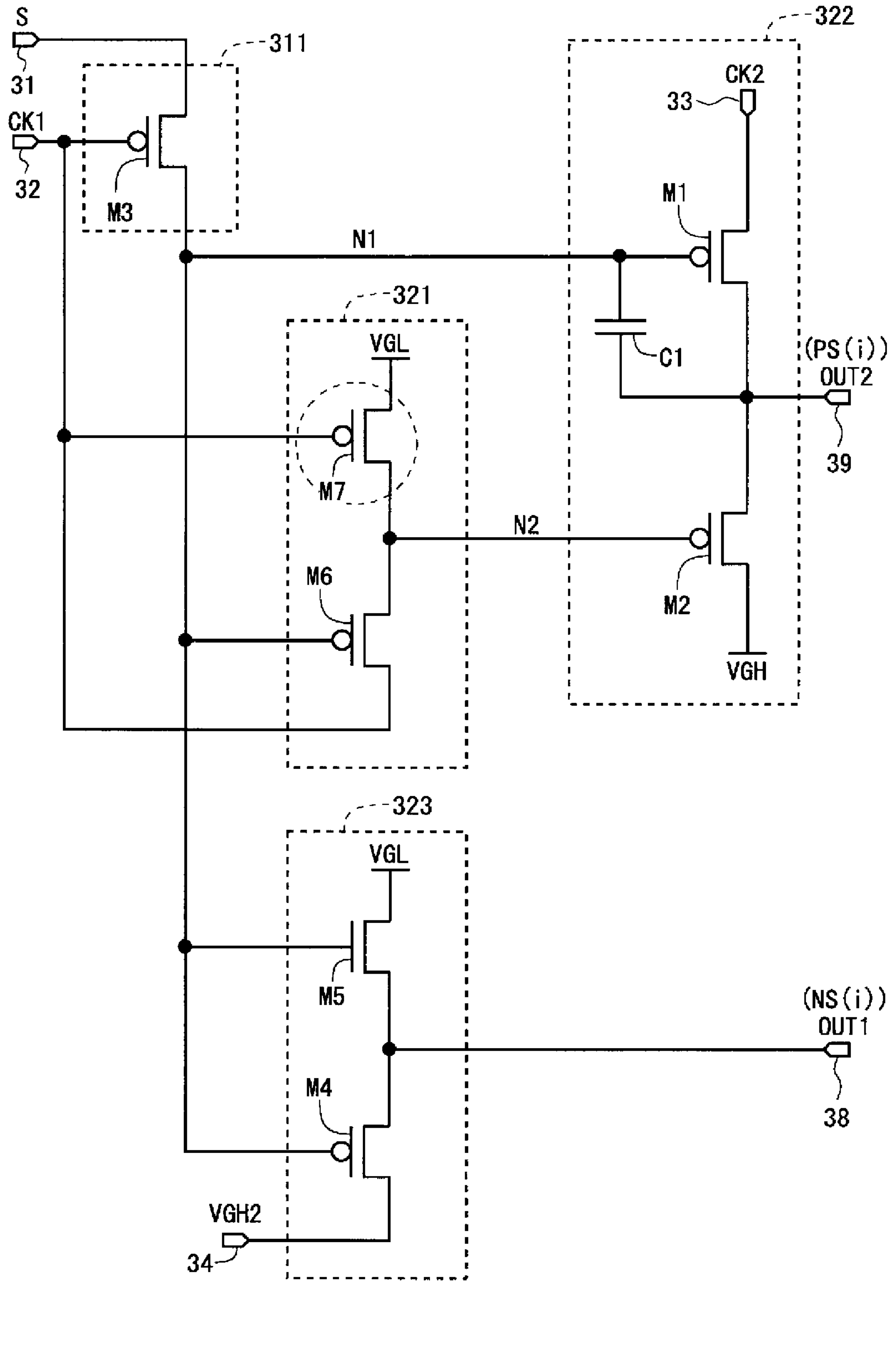
FIG. 27 is a circuit diagram illustrating the configuration of a unit circuit in a shift register constituting a gate driver functioning as a scanning signal line drive circuit in a display device according to a third embodiment.
Figure 28:
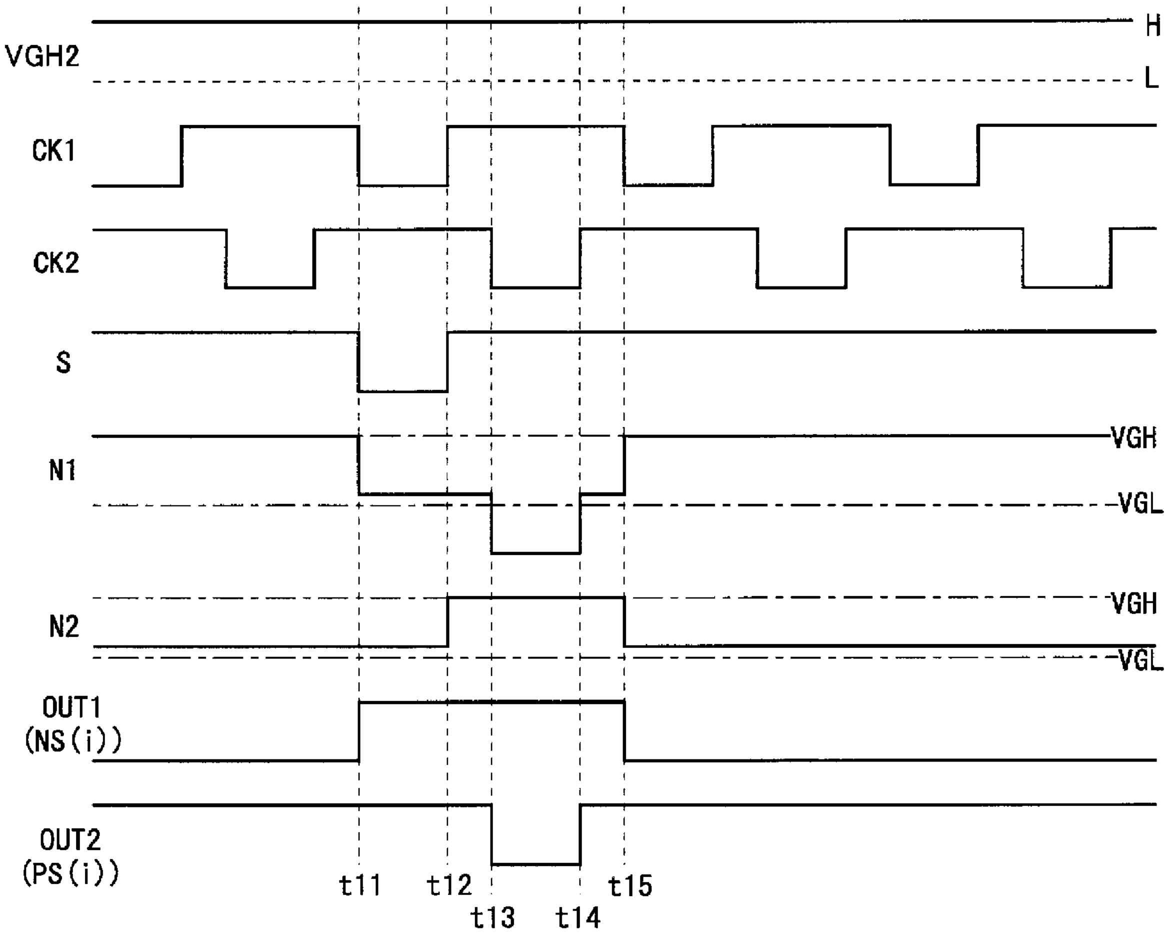
FIG. 28 is a signal waveform diagram for describing operations in the drive period (refresh frame period) of the unit circuit according to the third embodiment.

Next, an organic EL display device according to the third embodiment will be described with reference to FIGS. 27 and 28. FIG. 27 is a circuit diagram illustrating the configuration of a unit circuit in a shift register constituting a gate driver functioning as a scanning signal line drive circuit according to the present embodiment. FIG. 28 is a signal waveform diagram for describing the operations in a drive period of the unit circuit in the shift register.

As in the first embodiment, the display device according to the present embodiment is an organic EL display device configured to perform internal compensation and has two operation modes, the normal driving mode and the pause driving mode. In the present embodiment, the configuration of the unit circuit in the shift register constituting the gate driver functioning as a scanning signal line drive circuit is different from that in the first embodiment described above. However, other configurations are the same as those in the first embodiment (FIGS. 1, 3, and 20), and the driving method of the display device is also the same as in the first embodiment described above (FIG. 11). Configurations of the display device according to the present embodiment that are the same as configurations of the first embodiment or including corresponding portions are assigned the same reference sign and detailed descriptions of those components are omitted. The present embodiment will be described below with a focus on the configuration and operations of the unit circuit in the shift register 301.

3.1 Shift Register

The schematic configuration of the shift register 301 constituting a scanning signal line drive circuit (gate driver) according to the present embodiment is also similar to that of the first embodiment described above and as illustrated in FIG. 20. However, the configuration of the unit circuit 3 in the shift register 301 is different from that in the first embodiment described above (see FIG. 21).

3.2 Configuration of Unit Circuit

As illustrated in FIG. 27, the unit circuit 3 according to the present embodiment includes, as in the first embodiment described above, the first control circuit 311, the second control circuit 321, the first output circuit 323, and the second output circuit 322. Of these, the first control circuit 311, the first output circuit 323, and the second output circuit 322 has the same configuration as in the first embodiment (see FIG. 21).

The second control circuit 321 according to the present embodiment includes as a component a P-type transistor (more specifically, a P-type LTPS-TFT) as the transistor M7. This is different from the second control circuit 321 according to the first embodiment described above that includes an N-type transistor (more specifically, an N-type oxide TFT) as the transistor M7. Also, as illustrated in FIG. 27, in the second control circuit 321 according to the present embodiment, the control terminal (gate terminal) of the transistor M6 is connected to the first internal node N1, the first conduction terminal (source terminal) is connected to the input terminal 32, and the second conduction terminal (drain terminal) is connected to the second internal node N2. Regarding the transistor M7, the control terminal (gate terminal) is connected to the input terminal 32, the first conduction terminal (source terminal) is connected to the second internal node N2, and the second conduction terminal (drain terminal) is connected to the first constant voltage line.

3.3 Operations of Unit Circuit

First, the operations of the unit circuit 3 in the drive period TD (RF frame period Trf) will be described with reference to FIG. 28. For a period before time t11, the voltage of the first internal node N1 is maintained at the H level, the voltage of the second internal node N2 is maintained at the L level, the first output signal OUT1 is maintained at the L level, and the second output signal OUT2 is maintained at the H level. Note that since the second internal node N2 is maintained at the L level, the transistor M2 is kept in the on state.

At time t11, the first control clock signal CK1 changes from the H level to the L level, putting the transistor M3 in the on state. Also, at time t11, the set signal S changes from the H level to the L level. Accordingly, the voltage of the first internal node N1 decreases to the L level, the transistor M1 is turned to the on state, and the transistor M5 is turned to the off state. However, the L level voltage of the first internal node N1 at this time is, more precisely, set to higher level than the gate low voltage VGL functioning as the first constant voltage by an amount equal to the absolute value of the threshold voltage Vtp (<0) of the transistor T3 (see FIG. 28). Also, since the drive-time gate high signal VGH2 in the drive period TD is the H level, the transistor M4 is turned to the on state. This causes the first output signal OUT1 to change from the L level to the H level.

At time t12, the first control clock signal CK1 changes from the L level to the H level. This turns the transistor M3 to the off state. Also, at time t12, the set signal S changes from the L level to the H level, but since the transistor M3 turns to the off state, the voltage of the first internal node N1 is maintained at the L level. Thus, the transistor M6 turns to the on state, and the voltage of the second internal node N2 changes from the L level to the H level.

At time t13, the second control clock signal CK2 changes from the H level to the L level. At this time, since the transistor M1 is in the on state, the voltage of the input terminal 33 decreases and the voltage (voltage of the second output signal OUT2) of the second output terminal 39 decreases. Accordingly, the voltage of the first internal node N1 also decreases (the first internal node N1 is put in a boost state) via the capacitor C1 between the second internal node N2 and the second output terminal 39. As a result, a high negative voltage is applied to the control terminal of the transistor M1. Via such a bootstrap operation, the voltage of the second output signal OUT2 decreases to a level sufficient to cause the write control transistor T3, which is the connection destination of the second output terminal 39, to be turned to the on state.

At time t14, the second control clock signal CK2 changes from the L level to the H level. Accordingly, the voltage of the input terminal 33 increases and the voltage (voltage of the second output signal OUT2) of the second output terminal 39 increases. When the voltage of the second output terminal 39 increases, the voltage of the first internal node N1 also increases via the capacitor C1.

At time t15, the first control clock signal CK1 changes from the H level to the L level. This turns the transistor M3 to the on state. At this time, the set signal S is maintained at the H level. Accordingly, the voltage of the first internal node N1 increases to the H level, the transistor M1, the transistor M4, and the transistor M6 are turned to the off state, and the transistor M5 and transistor M7 are turned to the on state. This causes the first output signal OUT1 to change from the H level to the L level and the voltage of the second internal node N2 to also change from the H level to the L level. This turns the transistor M2 to the on state. Note that, the L level voltage of the second internal node N2 at this time is, more precisely, a higher voltage than the gate low voltage VGL functioning as the first constant voltage by an amount equal to the threshold voltage (absolute value) of the transistor M6 (see FIG. 28) and a sufficiently low enough voltage to turn the transistor M2 to the on state.

As for a period before time t11, for a period after time t15, the voltage of the first internal node N1 is maintained at the H level, the voltage of the second internal node N2 is maintained at the L level, the first output signal OUT1 is maintained at the L level, and the second output signal OUT2 is maintained at the H level.

As can be seen from the foregoing, the operations (see FIG. 28) in the drive period TD of the unit circuit 3 according to the present embodiment are essentially the same as the operations (see FIG. 22) in the drive period TD of the unit circuit 3 according to the first embodiment described above, with a small difference in the internal operations, and the first and second output signals generated by both are the same.

Next, the operations in the pause period TP (NRF frame period) of the unit circuit 3 according to the present embodiment will be described.

In the present embodiment also, the drive-time gate high signal VGH2 is the L level in the pause period TP while in the H level in the drive period TD (see FIG. 11). However, of the signals input to the unit circuit 3 and the voltage supplied to the unit circuit 3, the signals and voltage other than the drive-time gate high signal VGH2 change in a similar manner in the drive period TD as in the pause period TP or are maintained at the same level. Thus, in the unit circuit 3, the portions other than the first output circuit 323 where the drive-time gate high signal VGH2 is input, that is the first control circuit 311, the second control circuit 321, and the second output circuit 322 operate in a similar manner in the drive period TD as in the pause period TP. As a result, the second output signal OUT2 generated as the second scanning signal PS(i) is the same as the second output signal OUT2 generated in the drive period TD as in the pause period TP. On the other hand, in the pause period TP, the drive-time gate high signal VGH2 input to the first output circuit 323 is maintained at the L level. Thus, irrespective of the voltage of the first internal node N1 connected to the control terminal of the transistors M4 and M5, the voltage of the connection point between the transistor M4 and the transistor M5 is maintained at the L level. Accordingly, the first output signal OUT1 generated as the first scanning signal NS(i) is maintained at the L level in the pause period TP.

As can be seen from the foregoing, the operations in the pause period TP of the unit circuit 3 according to the present embodiment are essentially the same as the operations in the pause period TP of the unit circuit 3 according to the first embodiment described above, and the first and second output signals generated in both embodiments are the same (see FIG. 23).

3.4 Effects

As described above, the display device according to the present embodiment using the unit circuit 3 as described above also operates substantially in the same manner as the display device according to the first embodiment described above. Accordingly, the present embodiment and the first embodiment described above obtained similar effects.

Also, as illustrated in FIG. 27, among the transistors included in the unit circuit 3 according to the present embodiment, only the transistor M5 is an N-type (N-channel) transistor, and the other transistors M1 to M2 and M4 to M7 are P-type (P-channel) transistors. Thus, an oxide TFT such as IGZO-TFT can be used for the transistor M5, and LTPS-TFT can be used for the other transistors M1 to M2 and M4 to M7. In general, LTPS-TFT has higher voltage stress tolerability than oxide TFT. Thus, according to the present embodiment, effects similar to those of the first embodiment described above are obtained, as well as the effect of having high voltage stress tolerability and improved reliability.

4. Fourth Embodiment

Figure 29:
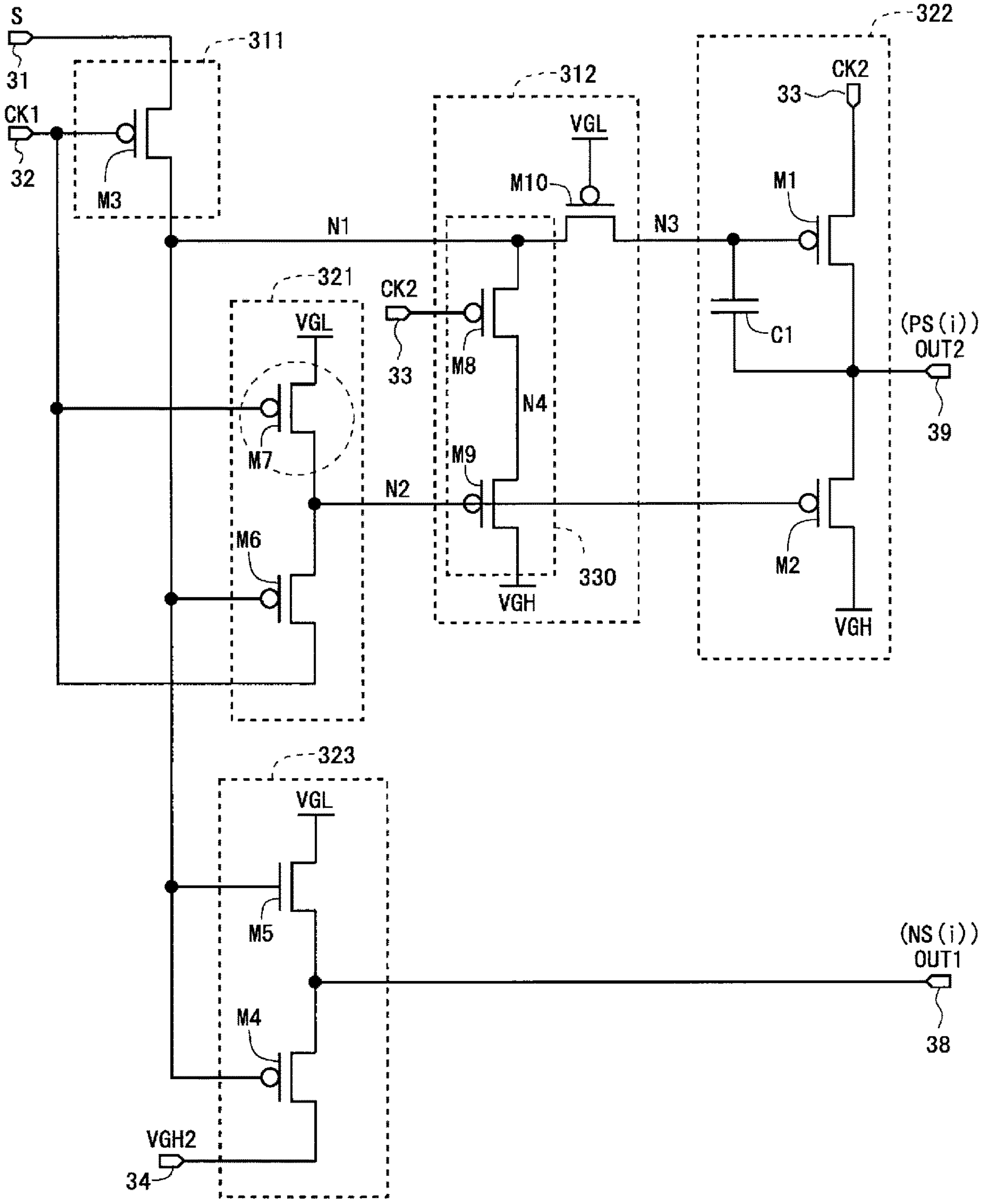
FIG. 29 is a circuit diagram illustrating the configuration of a unit circuit in a shift register constituting a gate driver functioning as a scanning signal line drive circuit in a display device according to a fourth embodiment.
Figure 30:
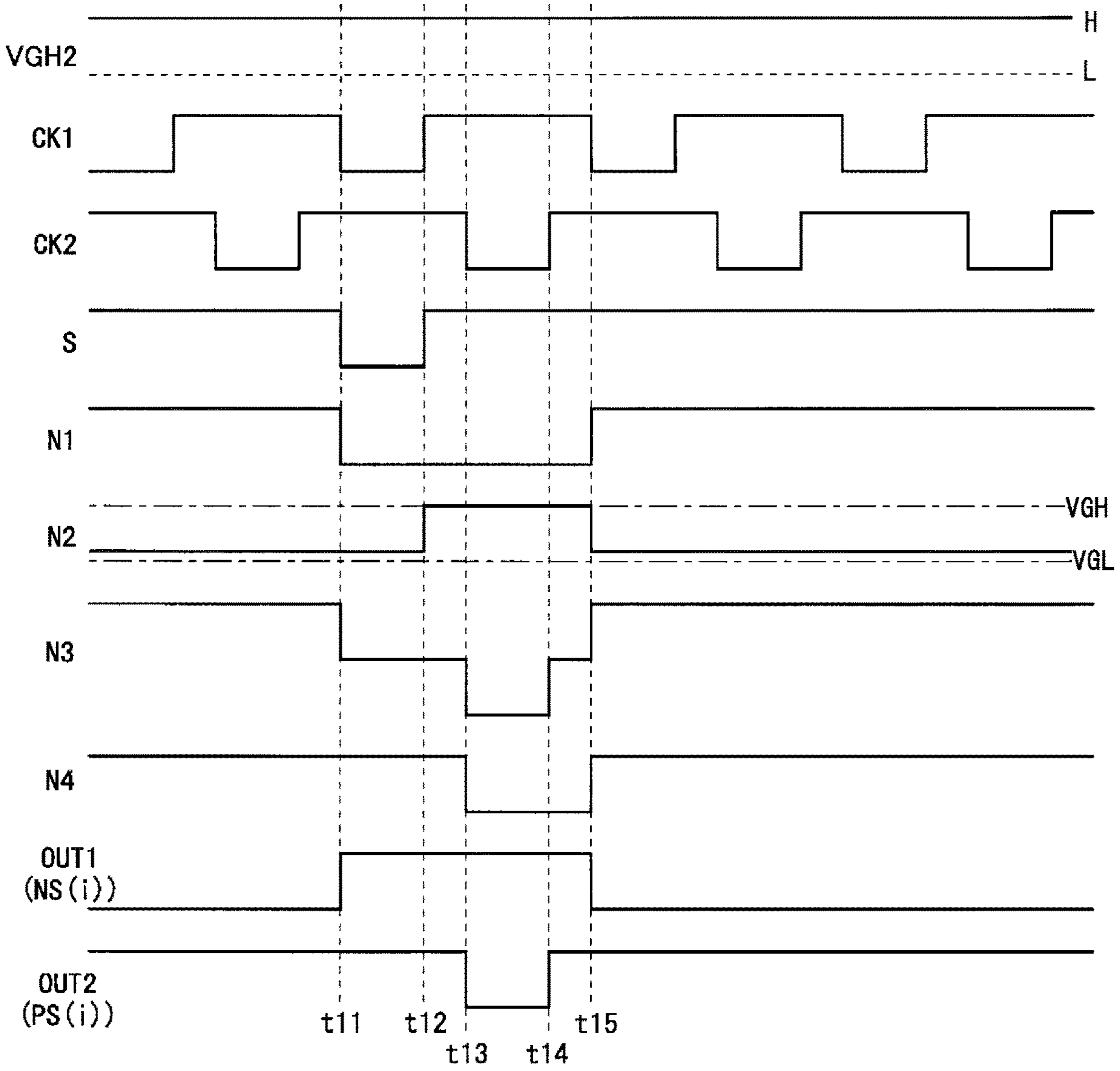
FIG. 30 is a signal waveform diagram for describing operations in the drive period (refresh frame period) of the unit circuit according to the fourth embodiment.

Next, an organic EL display device according to the fourth embodiment will be described with reference to FIGS. 29 and 30. FIG. 29 is a circuit diagram illustrating the configuration of a unit circuit in a shift register constituting a gate driver functioning as a scanning signal line drive circuit according to the present embodiment. FIG. 30 is a signal waveform diagram for describing the operations in a drive period of the unit circuit in the shift register.

As in the first embodiment, the display device according to the present embodiment is an organic EL display device configured to perform internal compensation and has two operation modes, the normal driving mode and the pause driving mode. In the present embodiment, the configuration of the unit circuit in the shift register constituting the gate driver functioning as a scanning signal line drive circuit is different from that in the first embodiment described above. However, other configurations are the same as those in the first embodiment (FIGS. 1, 3, and 20), and the driving method of the display device is also the same as in the first embodiment described above (FIG. 11).

Configurations of the display device according to the present embodiment that are the same as configurations of the first embodiment or including corresponding portions are assigned the same reference sign and detailed descriptions of those components are omitted. The present embodiment will be described below with a focus on the configuration and operations of the unit circuit in the shift register 301.

4.1 Shift Register

The schematic configuration of the shift register 301 constituting a scanning signal line drive circuit (gate driver) according to the present embodiment is also similar to that of the first embodiment described above and as illustrated in FIG. 20. However, the configuration of the unit circuit 3 in the shift register 301 is different from that in the first embodiment described above (see FIG. 21).

4.2 Configuration of Unit Circuit

As illustrated in FIG. 29, the unit circuit 3 according to the present embodiment includes, as in the first embodiment described above, the first control circuit 311, the second control circuit 321, the first output circuit 323, and the second output circuit 322. Of these, the first control circuit 311, the first output circuit 323, and the second output circuit 322 have the same configuration as in the first embodiment (see FIG. 21). The second control circuit 321 according to the present embodiment includes as a component a P-type transistor (more specifically, a P-type LTPS-TFT) as the transistor M7 and has the same configuration as the second control circuit 321 in the third embodiment described above (see FIG. 27). In addition, the unit circuit 3 according to the present embodiment includes the third control circuit 312 configured to control the voltage of the first internal node N1. The third control circuit 312 has the same configuration as the third control circuit 312 according to the second embodiment (see FIG. 24).

Thus, the unit circuit 3 according to the present embodiment has the configuration of the unit circuit 3 according to the first embodiment, includes the third control circuit 312 according to the second embodiment, and includes the second control circuit 321 according to the third embodiment in place of the second control circuit 321. Herein, portions of the configuration relating to the third control circuit 312 according to the present embodiment that are the same as that in the second control circuit 321 according to the second embodiment described above are given the same reference signs and descriptions thereof are omitted. Also, portions of the configuration relating to the second control circuit 321 according to the present embodiment that are the same as that in the second control circuit 321 according to the third embodiment described above are given the same reference signs and descriptions thereof are omitted (see FIGS. 24, 27, and 29).

4.3 Operations of Unit Circuit

First, the operations of the unit circuit 3 in the drive period TD (RF frame period Trf) will be described with reference to FIG. 30. For a period before time t11, the voltage of the first internal node N1 and the third internal node N3 is maintained at the H level, the voltage of the second internal node N2 is maintained at the L level, the first output signal OUT1 is maintained at the L level, and the second output signal OUT2 is maintained at the H level. Note that since the second internal node N2 is maintained at the L level, the transistors M2 and M9 are kept in the on state.

When signals CK1, CK2, S, and VGH2 that change in a similar manner as in the unit circuit 3 according to the first to third embodiments from time t11 to time t15 in the drive period TD are input to the unit circuit 3 according to the present embodiment (FIGS. 22, 25, and 28), the voltage of the first to fourth internal nodes N1 to N4 change as illustrated in FIG. 30. That is, the first control circuit 311, the third control circuit 312, and the second output circuit 322 according to the present embodiment essentially operate the same as the first control circuit 311, the third control circuit 312, and the second output circuit 322 according to the second embodiment. Thus, the voltage of the first internal node N1, the third internal node N3, and the fourth internal node N4 change as in the second embodiment described above (FIG. 25). The second control circuit 321 according to the present embodiment operates in a similar manner to the second control circuit 321 according to the third embodiment. Thus, the voltage of the second internal node N2 changes as in the third embodiment described above (see FIG. 28). Based on the voltage of the first to fourth internal nodes N1 to N4, in the unit circuit 3 according to the present embodiment also, the first and second output signals OUT1 and OUT2 generated as the same as the first and second output signals OUT1 and OUT2 generated in the unit circuit 3 according to the first to third embodiments described above.

In the present embodiment also, the drive-time gate high signal VGH2 is the L level in the pause period TP while in the H level in the drive period TD (see FIG. 11). However, of the signals input to the unit circuit 3 and the voltage supplied to the unit circuit 3, the signals and voltage other than the drive-time gate high signal VGH2 change in a similar manner in the drive period TD as in the pause period TP or are maintained at the same level. Thus, the second output signal OUT2 generated as the second scanning signal PS(i) as in the unit circuit 3 according to the first to third embodiments described above is the same as the second output signal OUT2 generated in the pause period TP as in the drive period TD, and the first output signal OUT1 generated as the first scanning signal NS(i) is maintained at the L level in the pause period TP.

4.4 Effects

As described above, the display device according to the present embodiment using the unit circuit 3 as described above also operates substantially in the same manner as the display device according to the first embodiment described above. Accordingly, the present embodiment and the first embodiment described above obtained similar effects.

As described above, the unit circuit (FIG. 29) according to the present embodiment includes the third control circuit 312 (FIG. 24) similar to that in the second embodiment described above. Accordingly, the amplitude of the voltage of the first internal node N1 is reduced, reducing the voltage stress applied to the transistors inside the unit circuit 3 and preventing the occurrence of failure such as display failure and the like caused by the clock operation of the second control clock signal CK2 via the stabilization circuit 330.

Furthermore, the second control circuit 321 provided in the unit circuit (FIG. 29) according to the present embodiment has the same configuration as the second control circuit 321 according to the third embodiment described above (FIG. 27). Accordingly, in the unit circuit 3, oxide TFT is only used in the transistor M5, and LTPS-TFT is used in the other transistors M1 and M2 and M4 to M10. This allows the voltage stress tolerability to be increased and the reliability to be improved.

5. Modified Examples

The disclosure is not limited to each of the embodiments described above, and various modifications may be made without departing from the scope of the disclosure. For example, the following modified example can be considered.

In each of the embodiments described above, the pixel circuit 15 and the unit circuit in the scanning-side drive circuit 40 include both a P-type transistor and an N-type transistor. Typically, LTPS-TFT with high mobility is used for a P-type transistor, and an oxide TFT such as IGZO-TFT with good off-leakage characteristics is used for an N-type transistor. However, the disclosure is not limited to these TFTs, and the channel of the transistor to be used may be changed as appropriate between the P-type and the N-type, with the transistors being configured to operate in a similar manner. For example, in each embodiment, a configuration in which an N-type LTPS-TFT is used instead of the P-type LTPS-TFT may be employed.

In each embodiment described above, the pixel circuit 15 configured as illustrated in FIG. 3 is used. However, the configuration of the pixel circuit is not limited to this. It is sufficient that the pixel circuit of the internal compensation method including a threshold compensation transistor is configured so that a data voltage written to a holding capacitor is held and a bias voltage can be applied for controlling a threshold shift caused by the hysteresis characteristic of a drive transistor.

In the above description, an organic EL display device has been described as an example and embodiments have been given. However, the disclosure is not limited to an organic EL display device and may be applied to any display device that employs an internal compensation method using a display element driven by a current and that performs pause driving. The display element that can be used in such a configuration includes, for example, an organic EL element, that is, an organic light-emitting diode (OLED), or an inorganic light-emitting diode, a quantum dot light-emitting diode (QLED) or the like.

The invention claimed is:

1. A display device comprising:
a plurality of data signal lines;
a plurality of first scanning signal lines;
a plurality of second scanning signal lines;
a plurality of light emission control lines;
a plurality of pixel circuits;
a data-side drive circuit configured to generate a plurality of data signals and apply the plurality of data signals respectively to the plurality of data signal lines;
a scanning-side drive circuit configured to selectively drive the plurality of first scanning signal lines, the plurality of second scanning signal line, and the plurality of light emission control lines; and
a display control circuit configured to control the data-side drive circuit and the scanning-side drive circuit such that a drive period and a pause period alternate between one another, the drive period including a refresh frame period in which a voltage of the plurality of data signals is written to the plurality of pixel circuits as a data voltage, and the pause period including a non-refresh frame period in which the writing of the data voltage to the plurality of pixel circuits is stopped,
wherein each one of the plurality of pixel circuits corresponds to one of the plurality of data signal lines, one of the plurality of first scanning signal lines, one of the plurality of second scanning signal lines, and one of the plurality of light emission control lines,
each one of the plurality of pixel circuits includes:
a display element configured to be driven by a current,
a drive transistor including a control terminal, a first conduction terminal, and a second conduction terminal, the drive transistor being provided in series with the display element,
a holding capacitor connected at one end to the control terminal of the drive transistor, the holding capacitor being configured to hold a voltage of the control terminal of the drive transistor,
a write control transistor, configured to function as a switching element, including a control terminal connected to a corresponding second scanning signal line of the plurality of second scanning signal lines, a first conduction terminal connected to a corresponding data signal line of the plurality of data signal lines, and a second conduction terminal connected to the first conduction terminal of the drive transistor,
a threshold compensation transistor, configured to function as a switching element, including a control terminal connected to a corresponding first scanning signal line of the plurality of first scanning signal lines, a first conduction terminal connected to the second conduction terminal of the drive transistor, and a second conduction terminal connected to the control terminal of the drive transistor, and
at least one light emission control transistor, configured to function as a switching element, including a control terminal connected to a corresponding light emission control line of the plurality of light emission control lines, the at least one light emission control transistor being provided in series with the display element and the drive transistor,
the display control circuit, configured to:
cause, in the drive period, the data-side drive circuit to apply the plurality of data signals to the plurality of data signal lines and cause the scanning-side drive circuit to selectively drive the plurality of first scanning signal lines and the plurality of second scanning signal lines and selectively make the plurality of light emission control lines inactive, such that a voltage of the corresponding data signal line is written to the holding capacitor as the data voltage when the at least one light emission control transistor is in an off state and a current corresponding to a holding voltage of the holding capacitor flows through the display element when the at least one light emission control transistor is in an on state, and
cause, in the pause period, the data-side drive circuit to output a bias voltage and apply the bias voltage to the plurality of data signal lines and cause the scanning-side drive circuit to stop driving the plurality of first scanning signal lines, selectively drive the plurality of second scanning signal lines, and selectively make the plurality of light emission control lines inactive, such that the voltage of the corresponding data signal line is applied to the first conduction terminal of the drive transistor as the bias voltage when the at least one light emission control transistor is in the off state and the current corresponding to the holding voltage of the holding capacitor flows through the display element when the at least one light emission control transistor is in the on state, and
the data-side drive circuit generates the bias voltage such that when a duration for applying the bias voltage to the first conduction terminal of the drive transistor increases, a voltage difference between the first conduction terminal and the control terminal of the drive transistor in a period in which the bias voltage is applied to the first conduction terminal of the drive transistor decreases.

2. The display device according to claim 1,
wherein the display control circuit is further configured to:
cause, in the drive period, the scanning-side drive circuit to drive the plurality of first scanning signal lines, the plurality of second scanning signal lines, and the plurality of light emission control lines, such that, when the at least one light emission control transistor is in the off state, the write control transistor and the threshold compensation transistor turn to an on state, and a period in which the write control transistor is in the on state is included in a period in which the threshold compensation transistor is in the on state,
cause, in the pause period, the scanning-side drive circuit to drive the plurality of first scanning signal lines, the plurality of second scanning signal lines, and the plurality of light emission control lines, such that, when the at least one light emission control transistor is in the off state, the write control transistor turns to the on state and the threshold compensation transistor is in an off state, and
cause, in the drive period and the pause period, the scanning-side drive circuit to drive the plurality of first scanning signal lines, the plurality of second scanning signal lines, and the plurality of light emission control lines, such that, when the at least one light emission control transistor is in the on state, the write control transistor and the threshold compensation transistor are in an off state.

3. The display device according to claim 2, further comprising:

a first power source line and a second power source line, wherein each of the plurality of pixel circuits includes, as the at least one light emission control transistor, a first light emission control transistor and a second light emission control transistor, the first conduction terminal of the drive transistor is connected to the first power source line via the first light emission control transistor, the second conduction terminal of the drive transistor is connected to the second power source line via the second light emission control transistor and the display element, and a control terminal of the first light emission control transistor and a control terminal of the second light emission control transistor are connected to the corresponding light emission control line.

4. The display device according to claim 1, wherein the display control circuit is further configured to cause the scanning-side drive circuit to drive the plurality of light emission control lines such that the at least one light emission control transistor turns to the off state in an identical period and for an identical duration in the drive period and the pause period.

5. The display device according to claim 4, wherein the data-side drive circuit generates the bias voltage such that when a proportion of a period in which the corresponding light emission control line is in an activated state relative to one frame period decreases, the voltage difference between the first conduction terminal and the control terminal of the drive transistor in the period in which the bias voltage is applied to the first conduction terminal of the drive transistor decreases.

6. The display device according to claim 1, wherein the threshold compensation transistor is a thin film transistor including a channel layer formed of an oxide semiconductor, and the drive transistor, the write control transistor, and the at least one light emission control transistor are thin film transistors including a channel layer formed of low-temperature polysilicon.

7. A display device comprising:

a plurality of data signal lines;

a plurality of first scanning signal lines;

a plurality of second scanning signal lines;

a plurality of light emission control lines;

a plurality of pixel circuits;

a data-side drive circuit configured to generate a plurality of data signals and apply the plurality of data signals respectively to the plurality of data signal lines;

a scanning-side drive circuit configured to selectively drive the plurality of first scanning signal lines, the plurality of second scanning signal line, and the plurality of light emission control lines; and a display control circuit configured to control the data-side drive circuit and the scanning-side drive circuit such that a drive period and a pause period alternate between one another, the drive period including a refresh frame period in which a voltage of the plurality of data signals is written to the plurality of pixel circuits as data voltage and the pause period including a non-refresh frame period in which the writing of the data voltage to the plurality of pixel circuits is stopped, wherein each one of the plurality of pixel circuits corresponds to one of the plurality of data signal lines, one of the plurality of first scanning signal lines, one of the plurality of second scanning signal lines, and one of the plurality of light emission control lines, each one of the plurality of pixel circuits includes:

a display element configured to be driven by a current, a drive transistor including a control terminal, a first conduction terminal, and a second conduction terminal, the drive transistor being provided in series with the display element, a holding capacitor connected at one end to the control terminal of the drive transistor, the holding capacitor being configured to hold a voltage of the control terminal of the drive transistor, a write control transistor, configured to function as a switching element, including a control terminal connected to a corresponding second scanning signal line of the plurality of second scanning signal lines, a first conduction terminal connected to a corresponding data signal line of the plurality of data signal lines, and a second conduction terminal connected to the first conduction terminal of the drive transistor, a threshold compensation transistor, configured to function as a switching element, including a control terminal connected to a corresponding first scanning signal line of the plurality of first scanning signal lines, a first conduction terminal connected to the second conduction terminal of the drive transistor, and a second conduction terminal connected to the control terminal of the drive transistor, and at least one light emission control transistor, configured to function as a switching element, including a control terminal connected to a corresponding light emission control line of the plurality of light emission control lines, the at least one light emission control transistor being provided in series with the display element and the drive transistor, the display control circuit, configured to:

cause, in the drive period, the data-side drive circuit to apply the plurality of data signals to the plurality of data signal lines and causes the scanning-side drive circuit to selectively drive the plurality of first scanning signal lines and the plurality of second scanning signal lines and selectively make the plurality of light emission control lines inactive, such that a voltage of the corresponding data signal line is written to the holding capacitor as the data voltage when the at least one light emission control transistor is in an off state and a current corresponding to a holding voltage of the holding capacitor flows through the display element when the at least one light emission control transistor is in an on state, and cause, in the pause period, the data-side drive circuit to output a bias voltage and apply the bias voltage to the plurality of data signal lines and cause the scanning-side drive circuit to stop driving the plurality of first scanning signal lines, selectively drive the plurality of second scanning signal lines, and selectively make the plurality of light emission control lines inactive, such that the voltage of the corresponding data signal line is applied to the first conduction terminal of the drive transistor as the bias voltage when the at least one light emission control transistor is in the off state and the current corresponding to the holding voltage of the holding capacitor flows through the display element when the at least one light emission control transistor is in the on state, the scanning-side drive circuit includes a plurality of unit circuits connected in cascade operating as a shift register based on a two phase clock signal, even-numbered unit circuits of the plurality of unit circuits are input with a first clock signal as a first control clock signal and a second clock signal as a second control clock signal, the first clock signal and the second clock signal forming the two phase clock signal, odd-numbered unit circuits of the plurality of unit circuits are input with the second clock signal as the first control clock signal and the first clock signal as the second control clock signal, and each of the plurality of unit circuits is a bistable circuit corresponding to one of the plurality of first scanning signal lines and one of the plurality of second scanning signal lines, is configured to receive an input signal of a logic level sent from a unit circuit of a preceding stage of the plurality of unit circuits or outside and to receive a mode signal indicating whether a period in which the shift register is operated is the drive period or the pause period, and includes:

a first internal node configured to selectively hold two logic levels, a second internal node, a first control circuit configured to receive the input signal and send the input signal to the first internal node at a timing according to the first control clock signal, a first output circuit configured to output a signal with a logic level changing according to a logic level of the first internal node to the corresponding first scanning signal line of the plurality of first scanning signal lines when the mode signal indicates the drive period and to output a non-active signal to the corresponding first scanning signal line when the mode signal indicates the pause period, a second control circuit configured to generate a signal of a logic level inverted to the logic level of the first internal node and to send the signal of the logic level inverted to the logic level of the first internal node to the second internal node, and a second output circuit configured to output a signal of a logic level identical to a logic level of the second control clock signal to the corresponding second scanning signal line of the plurality of second scanning signal lines when the first internal node is a first logic level of the two logic levels and to output a signal of a logic level inverted to a logic level of the second internal node to the corresponding second scanning signal line when the first internal node is a second logic level of the two logic levels.

8. The display device according to claim 7, further comprising:

a first constant voltage line configured to supply a first constant voltage; and a second constant voltage line configured to supply a second constant voltage higher than the first constant voltage, wherein the write control transistor is a P-type thin film transistor, the threshold compensation transistor is an N-type thin film transistor, the first control circuit includes:

a P-type transistor including a first conduction terminal configured to receive the input signal, a second conduction terminal connected to the first internal node, and a control terminal configured to receive the first control clock signal, the first output circuit includes:

an N-type transistor including a first conduction terminal connected to the corresponding first scanning signal line, a second conduction terminal connected to the first constant voltage line, and a control terminal connected to the first internal node, and a P-type transistor including a control terminal connected to the first internal node, a first conduction terminal configured to receive the mode signal, and a second conduction terminal connected to the corresponding first scanning signal line, the second control circuit includes two transistors connected in series, and is configured to receive the logic level of the first internal node and output a signal of a logic level inverted to the logic level received from a connection point of the two transistors to the second internal node, and the second output circuit includes:

a first P-type transistor including a control terminal connected to the first internal node, a first conduction terminal configured to receive the second control clock signal, and a second conduction terminal connected to the corresponding second scanning signal line, a second P-type transistor including a control terminal connected to the second internal node, a first conduction terminal connected to the second constant voltage line, and a second conduction terminal connected to the corresponding second scanning signal line, and a capacitor including a first terminal connected to the control terminal of the first P-type transistor and a second terminal connected to the second conduction terminal of the first P-type transistor.

9. The display device according to claim 8, wherein a threshold voltage of the N-type transistor in the first output circuit is greater than an absolute value of a threshold voltage of the P-type transistor in the first control circuit.

10. The display device according to claim 8, wherein the second control circuit further includes:

a P-type transistor including a control terminal connected to the first internal node, a first conduction terminal connected to the second constant voltage line, and a second conduction terminal connected to the second internal node, and an N-type transistor including a control terminal connected to the first internal node, a first conduction terminal connected to the second internal node, and a second conduction terminal connected to the first constant voltage line.

11. The display device according to claim 8, wherein the second control circuit further includes:

a P-type transistor including a control terminal connected to the first internal node, a first conduction terminal configured to receive the first control clock signal, and a second conduction terminal connected to the second internal node, and a P-type transistor including a control terminal configured to receive the first control clock signal, a first conduction terminal connected to the second internal node, and a second conduction terminal connected to the first constant voltage line.

12. The display device according to claim 8, wherein each of the plurality of unit circuits further includes a third control circuit, the third control circuit includes:

a stabilization circuit including a P-type transistor on a constant voltage line side including a control terminal connected to the second internal node and a first conduction terminal connected to the second constant voltage line and a P-type transistor on an internal node side including a control terminal configured to receive the second control clock signal, a first conduction terminal connected to a second conduction terminal of the P-type transistor on the constant voltage line side, and a second conduction terminal connected to the first internal node, and a P-type transistor for a voltage adjustment including a control terminal connected to the first constant voltage line, and the first internal node is connected to the control terminal of the first P-type transistor at the second output circuit via the P-type transistor for the voltage adjustment.

13. The display device according to claim 8, wherein, of transistors included in each of the plurality of unit circuits, each N-type transistor is a thin film transistor including a channel layer formed of an oxide semiconductor, and each P-type transistor is a thin film transistor including a channel layer formed of low-temperature polysilicon.

14. A driving method for a display device, the display device including a plurality of data signal lines, a plurality of first scanning signal lines, a plurality of second scanning signal lines, a plurality of light emission control lines, and a plurality of pixel circuits, wherein each one of the plurality of pixel circuits corresponds to one of the plurality of data signal lines, one of the plurality of first scanning signal lines, t-e-one of the plurality of second scanning signal lines, and one of the plurality of light emission control lines, and each one of the plurality of pixel circuits includes:

a display element configured to be driven by a current, a drive transistor including a control terminal, a first conduction terminal, and a second conduction terminal, the drive transistor being provided in series with the display element, a holding capacitor connected at one end to the control terminal of the drive transistor, the holding capacitor being configured to hold a voltage of the control terminal of the drive transistor, a write control transistor, configured to function as a switching element, including a control terminal connected to a corresponding second scanning signal line of the plurality of second scanning signal lines, a first conduction terminal connected to a corresponding data signal line of the plurality of data signal lines, and a second conduction terminal connected to the first conduction terminal of the drive transistor, a threshold compensation transistor, configured to function as a switching element, including a control terminal connected to a corresponding first scanning signal line of the plurality of first scanning signal lines, a first conduction terminal connected to the second conduction terminal of the drive transistor, and a second conduction terminal connected to the control terminal of the drive transistor, and at least one light emission control transistor, configured to function as a switching element, including a control terminal connected to a corresponding light emission control line of the plurality of light emission control lines, the at least one light emission control transistor being provided in series with the display element and the drive transistor, the driving method comprising:

performing pause driving on the plurality of data signal lines, the plurality of first scanning signal lines, and the plurality of second scanning signal lines such that a drive period and a pause period alternate between one another, the drive period including a refresh frame period in which a voltage of the plurality of data signals is written to the plurality of pixel circuits as a data voltage and the pause period including a non-refresh frame period in which the writing of the data voltage to the plurality of pixel circuits is stopped, wherein the performing of the pause driving includes:

applying, in the drive period, the plurality of data signals to the plurality of data signal lines, selectively driving the plurality of first scanning signal lines and the plurality of second scanning signal lines, and selectively making the plurality of light emission control lines inactive, such that a voltage of the corresponding data signal line is written to the holding capacitor as the data voltage when the at least one light emission control transistor is in an off state and a current corresponding to a holding voltage of the holding capacitor flows through the display element when the at least one light emission control transistor is in an on state, generating, in the pause period, a bias voltage and applying the bias voltage to the plurality of data signal lines, stopping driving of the plurality of first scanning signal lines, selectively driving the plurality of second scanning signal lines, and selectively making the plurality of light emission control lines inactive, such that the voltage of the corresponding data signal line is applied to the first conduction terminal of the drive transistor as the bias voltage when the at least one light emission control transistor is in the off state and the current corresponding to the holding voltage of the holding capacitor flows through the display element when the at least one light emission control transistor is in the on state, and changing a level of the bias voltage according to at least one parameter indicating an operation condition of the display device.

15. The driving method according to claim 14, wherein, in the performing of the pause driving, the plurality of light emission control lines is driven such that the at least one light emission control transistor turns to the off state in an identical period and for an identical duration in the drive period and the pause period.

16. The driving method according to claim 14, wherein the threshold compensation transistor is a thin film transistor including a channel layer formed of an oxide semiconductor, and the drive transistor, the write control transistor, and the at least one light emission control transistor are thin film transistors including a channel layer formed of low-temperature polysilicon.

* * * * *